(12) United States Patent
Bhamri et al.

(10) Patent No.: US 11,943,764 B2
(45) Date of Patent: Mar. 26, 2024

(54) USER EQUIPMENT AND SYSTEM PERFORMING TRANSMISSION AND RECEPTION OPERATIONS

(71) Applicant: Panasonic Intellectual Property Corporation of America, Torrance, CA (US)

(72) Inventors: Ankit Bhamri, Rödermark (DE); Hidetoshi Suzuki, Kanagawa (JP); Naoya Shibaike, Kanagawa (JP); Tetsuya Yamamoto, Kanagawa (JP); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 315 days.

(21) Appl. No.: 17/398,855

(22) Filed: Aug. 10, 2021

(65) Prior Publication Data
US 2022/0014333 A1 Jan. 13, 2022

Related U.S. Application Data

(63) Continuation of application No. PCT/EP2020/050219, filed on Jan. 7, 2020.

(30) Foreign Application Priority Data

Feb. 14, 2019 (EP) .................................... 19000087
Apr. 5, 2019 (EP) .................................... 19167701

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0053* (2013.01); *H04W 72/0446* (2013.01);
(Continued)

(58) Field of Classification Search
CPC ....... H04L 5/003; H04L 5/0053; H04L 41/08; H04L 41/0803; H04L 12/5602;
(Continued)

(56) References Cited

U.S. PATENT DOCUMENTS

2020/0146032 A1 5/2020 Bae et al.
2022/0279551 A1* 9/2022 Liu ................... H04W 72/0446
(Continued)

FOREIGN PATENT DOCUMENTS

JP 2016519538 A 6/2016
RU 2669917 C1 10/2018
(Continued)

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)," Mar. 2017, 91 pages.
(Continued)

*Primary Examiner* — Warner Wong
(74) *Attorney, Agent, or Firm* — Seed IP Law Group LLP

(57) ABSTRACT

A user equipment, a base station and respective methods are provided. The user equipment receives a physical uplink shared channel (PUSCH) config information element (IE) in form of radio resource control (RRC) signaling, the PUSCH config IE being applicable to a particular bandwidth part. The user equipment configures a table which is defined by a PUSCH time domain resource allocation list IE carried in the received PUSCH config IE, the table comprising rows, at least one row comprising a first set of values related to
(Continued)

allocated time-domain resources for a plurality of PUSCH transmissions. The user equipment receives downlink control information (DCI) signaling carrying a time-domain resource assignment filed with value m, wherein the value m provides a row index m+1 to the RRC configured table. The user equipment determines allocated time-domain resources for the plurality of PUSCH transmissions based on the index of the slot carrying the received DCI.

19 Claims, 17 Drawing Sheets

(51) Int. Cl.
- *H04W 72/0446* (2023.01)
- *H04W 72/0453* (2023.01)
- *H04W 72/23* (2023.01)
- *H04W 80/02* (2009.01)

(52) U.S. Cl.
CPC ....... *H04W 72/0453* (2013.01); *H04W 72/23* (2023.01); *H04W 80/02* (2013.01)

(58) Field of Classification Search
CPC ........ H04L 47/70; H04L 47/78; H04W 72/04; H04W 72/044; H04W 72/0446; H04W 72/042; H04W 72/50
See application file for complete search history.

(56) References Cited

U.S. PATENT DOCUMENTS

| | | | | |
|---|---|---|---|---|
| 2022/0353698 | A1* | 11/2022 | Jang | H04L 1/189 |
| 2023/0300827 | A1* | 9/2023 | Ying | H04L 5/0051 370/329 |

FOREIGN PATENT DOCUMENTS

| | | | | |
|---|---|---|---|---|
| WO | WO 2016161618 | A1 | 10/2016 | |
| WO | WO 2018212628 | A1 | 11/2018 | |
| WO | WO-2020170972 | A1 * | 8/2020 | ............ H04W 72/12 |
| WO | WO-2020200176 | A1 * | 10/2020 | ............ H04W 72/04 |

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 56 pages.
3GPP TR 38.913 V15.0.0, "3rd Generation Partnership Project; Technical Specification Group Radio Access Network; Study on Scenarios and Requirements for Next Generation Access Technologies; (Release 15)," Jun. 2018, 39 pages.
3GPP TS 22.261 V16.4.0, "3rd Generation Partnership Project; Technical Specification Group Services and System Aspects; Service requirements for the 5G system; Stage 1 (Release 16)," Jun. 2018, 55 pages.
3GPP TS 38.211 V15.4.0, "3rd Generation Partnership Project; Technical Specification Group Radio Access Network; NR; Physical channels and modulation (Release 15)," Dec. 2018, 96 pages.
3GPP TS 38.212 V15.4.0, "3rd Generation Partnership Project; Technical Specification Group Radio Access Network; NR; Multiplexing and channel coding (Release 15)," Dec. 2018, 100 pages.
3GPP TS 38.213 V15.4.0, "3rd Generation Partnership Project; Technical Specification Group Radio Access Network; NR; Physical layer procedures for control (Release 15)," Dec. 2018, 104 pages.
3GPP TS 38.214 V15.4.0, "3rd Generation Partnership Project; Technical Specification Group Radio Access Network; NR; Physical layer procedures for data (Release 15)," Dec. 2018, 103 pages.
3GPP TS 38.300 V15.0.0, "3rd Generation Partnership Project; Technical Specification Group Radio Access Network; NR; NR and NG-RAN Overall Description; Stage 2 (Release 15)," Dec. 2017, 68 pages.
Extended European Search Report, dated Aug. 9, 2019, for corresponding European Application No. 19000087.7-1219, 7 pages.
Extended European Search Report, dated Aug. 9, 2019, for corresponding European Application No. 19167701.2-1219, 6 pages.
Huawei, HiSilicon, Nokia, Nokia Shanghai Bell, "New SID on Physical Layer Enhancements for NR URLLC," RP-181477, Agenda Item: 9.1.9, 3GPP TSG-RAN#80, La Jolla, US, Jun. 11-14, 2018, 5 pages.
International Search Report, dated Apr. 15, 2020, for corresponding International Application No. PCT/EP2019/086671, 14 pages.
International Search Report, dated Apr. 20, 2020, for corresponding International Application No. PCT/EP2020/050219, 2 pages.
ITU-R, "IMT Vision—Framework and overall objectives of the future development of IMT for 2020 and beyond," Recommendation ITU-R M.2083-0, M Series, Sep. 2015, 21 pages.
NEC, "Remaining details of the DL/UL Resource allocation schemes," R1-1800537, Agenda Item: 7.3.3.1, 3GPP TSG RAN WG1 Meeting AH 1801, Vancouver, Canada, Jan. 22-26, 2018, 4 pages.
NTT Docomo, Inc., "Offline summary for AI 7.1.3.3.4 UL data transmission procedure," R1-1803295, Agenda Item: 7.1.3.3.4, 3GPP TSG RAN WG1 Meeting #92, Athens, Greece, Feb. 26-Mar. 2, 2018, 22 pages.
NTT Docomo, Inc., "Revised WID on New Radio Access Technology," RP-172115 (revision of RP-172109), Agenda Item: 9.2.1, 3GPP TSG RAN Meeting #77, Sapporo, Japan, Sep. 11-14, 2017, 11 pages.
English Translation of Russian Office Action, dated Jan. 23, 2023, for Russian Patent Application No. 2021112813. (6 pages).
NEC, "PUCCH resource allocation prior to RRC configuration," R1-1800536, Agenda Item: 7.3.2.4, 3GPP TSG RAN WG1 Meeting AH 1801, Vancouver, Canada, Jan. 22-26, 2018. (5 pages).
Office Action, dated Jan. 19, 2023, for Indian Patent Application No. 202147036076. (5 pages).
Ericsson, "NR High-Reliability URLLC scope for RAN1/RAN2," RP-172817, Agenda Item: 9.2.1, Dec. 2017, URL=https://www.3gpp.org/ftp/tsg_ran/TSG_RAN/TSGR_78/Docs/RP-172817.zip, download date Nov. 2, 2023. (6 pages).
Japanese Notice of Reasons for Rejection, dated Jan. 9, 2024, for Japanese Patent Application No. 2021-547297. (6 pages).
Panasonic, "On PUSCH enhancements for NR URLLC," R1-1904188, Agenda Item: 7.2.6.3, 3GPP TSG RAN WG1 #96bis, Xi'an, China, Apr. 8-12, 2019. (6 pages).
Qualcomm Incorporated, "Text Proposals for DL/UL scheduling and HARQ management," R1-1801265, Agenda Item: 7.3.3.2, 3GPP TSG RAN WG1 Meeting AH 1801, Vancouver, Canada, Jan. 22-26, 2018. (3 pages).

* cited by examiner

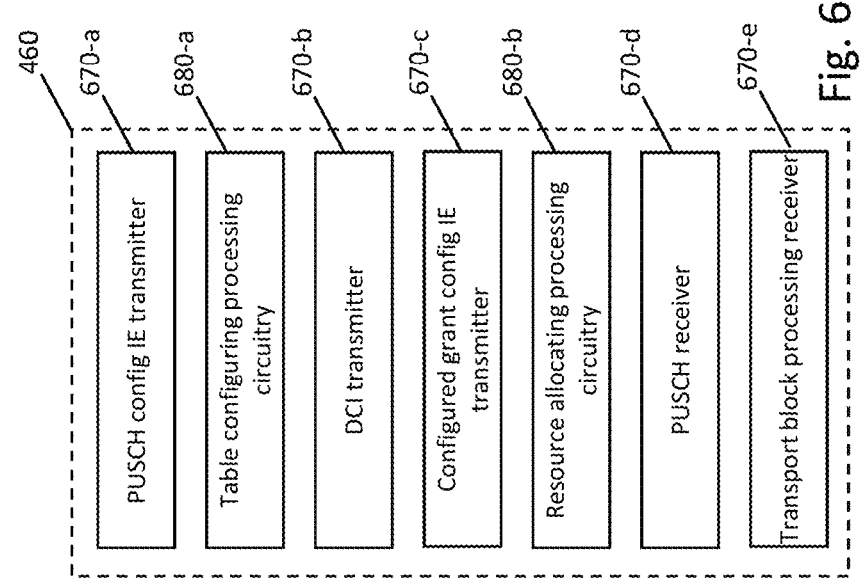
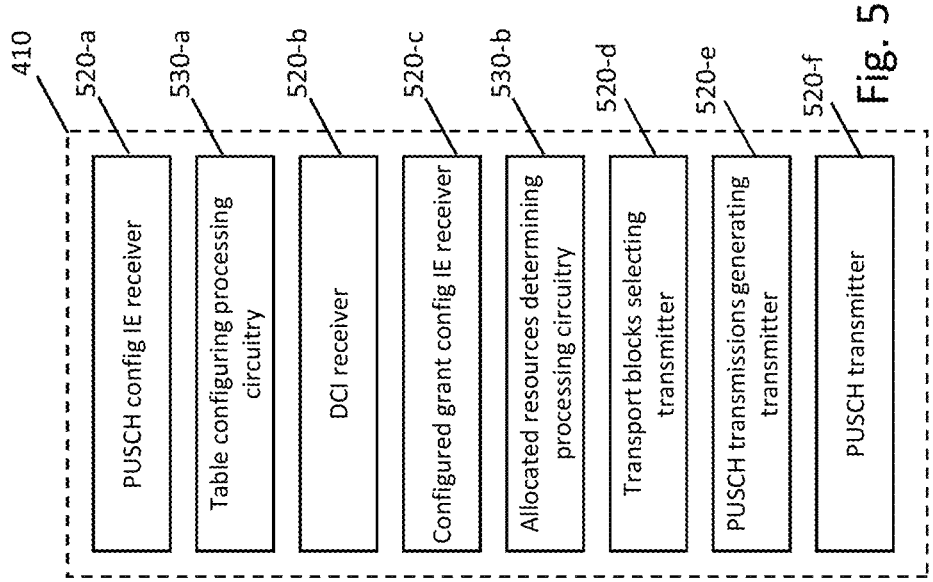

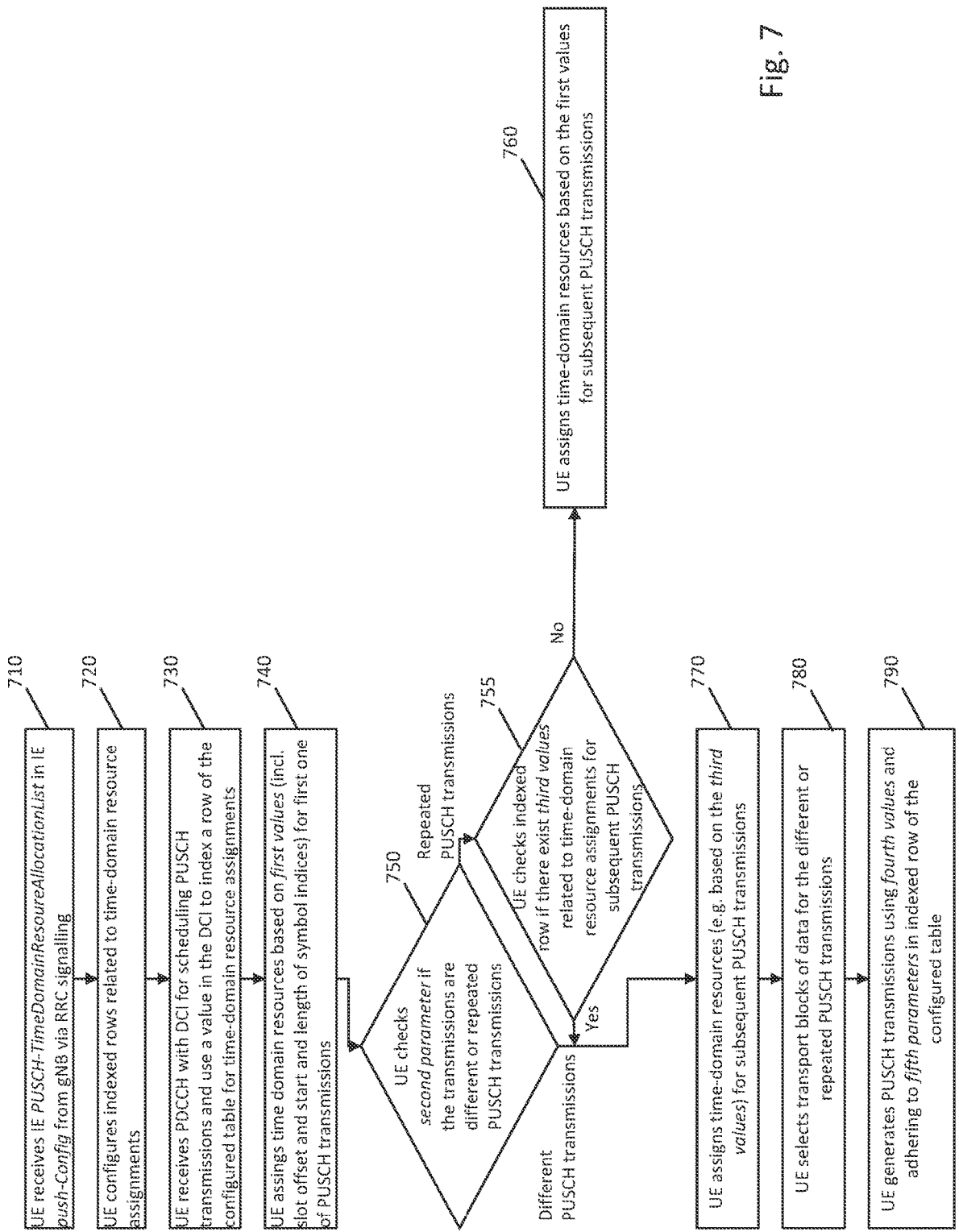

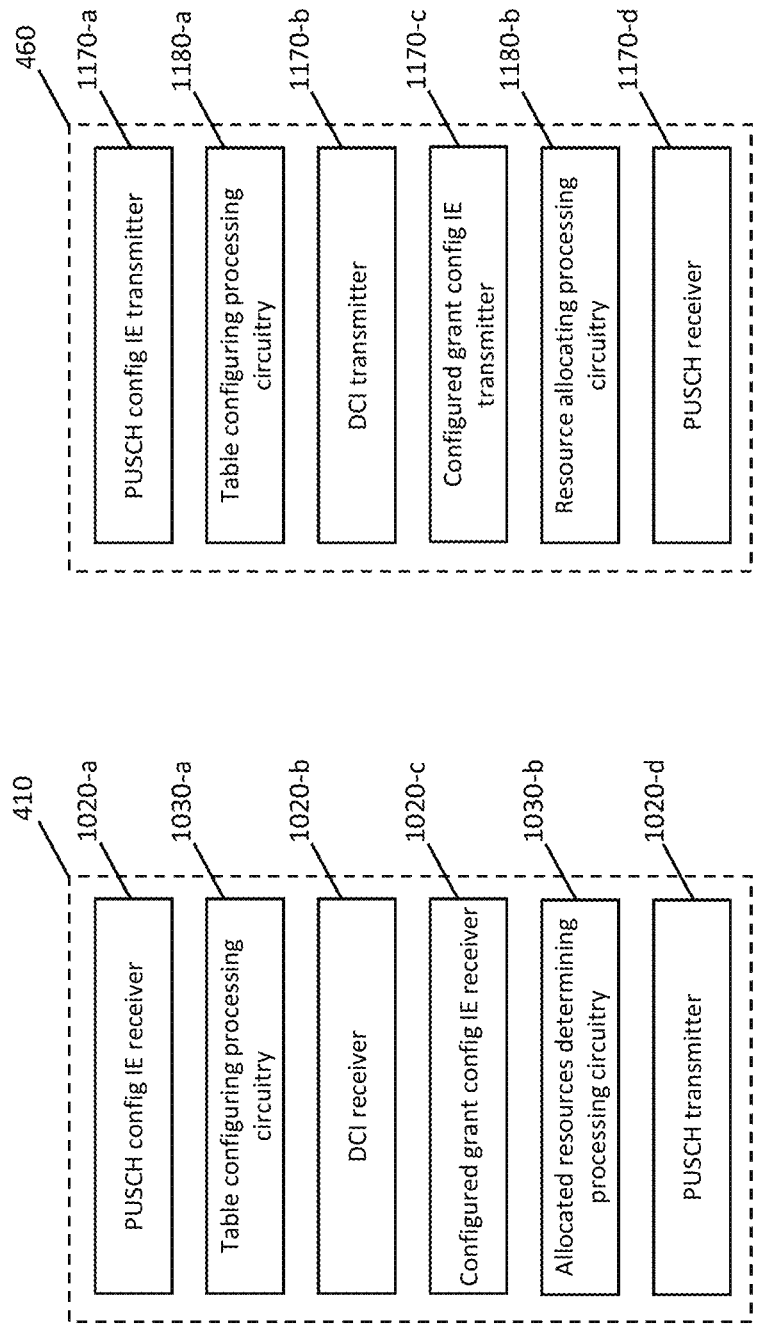

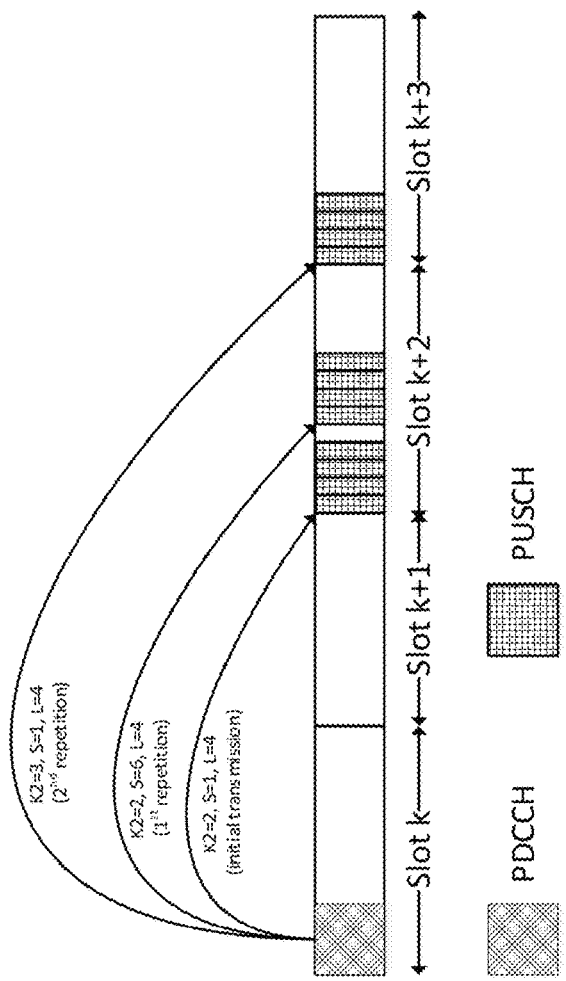

USER EQUIPMENT AND SYSTEM PERFORMING TRANSMISSION AND RECEPTION OPERATIONS

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz.

The NR is a follower of the technology represented by Long Term Evolution (LTE) and LTE Advanced (LTE-A). The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like.

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks.

The services eMBB and URLLC are similar in that they both demand a very broad bandwidth, however are different in that the URLLC service requires ultra-low latencies and very high reliability. In NR, the Physical layer is based on time-frequency resources (such as Orthogonal Frequency Division Multiplexing, OFDM in LTE) and supports multiple antenna operation.

For systems like LTE and NR, further improvements and options may facilitating efficient operation of the communication system as well as particular devices pertaining to the system.

BRIEF SUMMARY

One non-limiting and exemplary embodiment facilitates improving the flexibility in the support of transport block repetitions without additional signaling overhead.

In an embodiment, the techniques disclosed herein feature a user equipment, UE, comprising a receiver, a processor and a transmitter. The receiver, in operation, receives a physical uplink shared channel, PUSCH, config information element, IE, in form of radio resource control, RRC, signaling, the PUSCH config IE being applicable to a particular bandwidth part.

The processor, in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions.

The receiver, in operation, receives downlink control information, DCI, signaling carrying a time-domain resource assignment filed with value m, wherein the value m provides a row index m+1 to the RRC configured table.

The processor, in operation, determines allocated time-domain resources for the plurality of PUSCH transmissions based on the index of the slot carrying the received DCI, and the first set of values related to allocated time-domain resources comprised in the indexed row of the RRC configured table.

The transmitter, which in operation, selects transport blocks of data to be carried in the plurality of PUSCH transmissions, and transmits the plurality of PUSCH transmissions using the respectively determined allocated time-domain resources; and wherein the transport blocks of data are selected based on at least one second parameter comprised in the indexed row of the RRC configured table which is indicating whether the plurality of PUSCH transmissions are either different PUSCH transmissions or repeated PUSCH transmissions.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

FIGS. 5-6 depict block diagrams of an exemplary implementation of the user equipment (UE) and of the base station (BS);

FIG. 7 illustrates a sequence diagram of a user equipment performing plural PUSCH transmissions according to an exemplary mechanism;

FIGS. 10-11 depict block diagrams of another exemplary implementation of the user equipment (UE) and of the base station (BS);

FIGS. 13-14 show a schematic illustration of a RRC configured table for PUSCH repetitions and corresponding resource allocations in time domain according to a usage of a first exemplary implementation.

DETAILED DESCRIPTION

As presented in the background section, 3GPP is working at the next releases for the 5th generation cellular technology, simply called 5G, including the development of a new radio (NR) access technology operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figure 1:
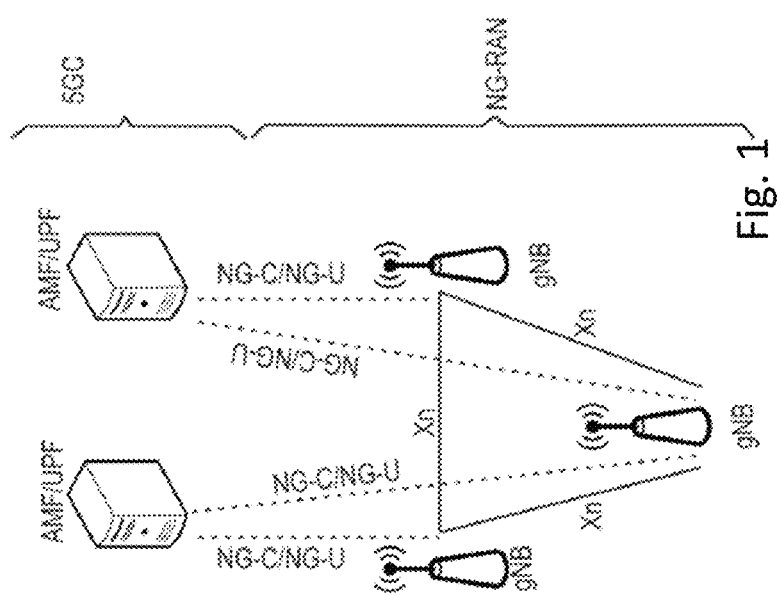
FIG. 1 illustrates a schematic drawing of an exemplary architecture for a 3GPP NR system.

Among other things, there has been a provisional agreement on the overall system architecture. The NG-RAN (Next Generation-Radio Access Network) consists of gNBs, providing the NG-radio access user plane, SDAP/PDCP/RLC/MAC/PHY (Service Data Adaptation Protocol/Packet Data Convergence Protocol/Radio Link Control/Medium Access Control/Physical) and control plane, RRC (Radio Resource Control) protocol terminations towards the UE. The NG-RAN architecture is illustrated in FIG. 1, based on TS 38.300 v.15.0.0, section 4 incorporated herein by reference. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface.

Figure 2:
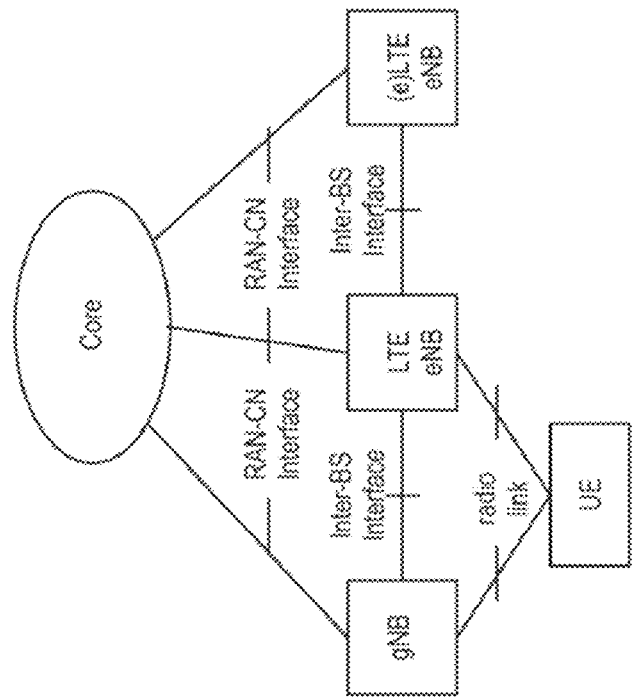
FIG. 2 shows a block diagram of an exemplary user and control plane architecture for the LTE eNB, NR gNB, and UE.

Various different deployment scenarios are currently being discussed for being supported, as reflected, e.g., in 3GPP TR 38.801 v14.0.0, "Study on new radio access technology: Radio access architecture and interfaces." For instance, a non-centralized deployment scenario (section 5.2 of TR 38.801; a centralized deployment is illustrated in section 5.4 incorporated herein by reference) is presented therein, where base stations supporting the 5G NR can be deployed. FIG. 2 illustrates an exemplary non-centralized deployment scenario and is based on FIG. 5.2.-1 of said TR 38.801, while additionally illustrating an LTE eNB as well as a user equipment (UE) that is connected to both a gNB and an LTE eNB. As mentioned before, the new eNB for NR 5G may be exemplarily called gNB.

Figure 3:
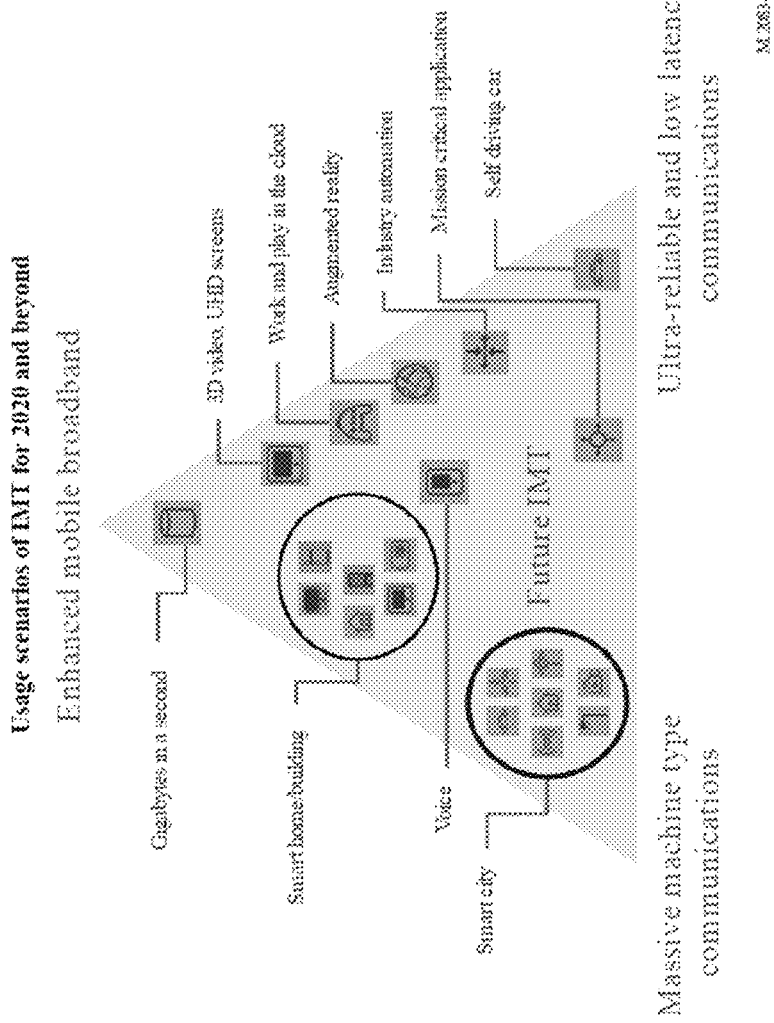
FIG. 3 is a schematic drawing showing usage scenarios of Massive Machine Type Communications (mMTC) and Ultra Reliable and Low Latency Communications (URLLC)

As also mentioned above, in 3rd generation partnership project new radio (3GPP NR), three use cases are being considered that have been envisaged to support wide variety of services and applications by IMT-2020 (see Recommendation ITU-R M.2083: IMT Vision—"Framework and overall objectives of the future development of IMT for 2020 and beyond," September 2015). The specification for the phase 1 of enhanced mobile-broadband (eMBB) has been concluded by 3GPP in December 2017. In addition to further extending the eMBB support, the current and future work would involve the standardization for ultra-reliable and low-latency communications (URLLC) and massive machine-type communications. FIG. 3 (from the Recommendation ITU-R M.2083) illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. In the current WID (work item description) RP-172115, it is agreed to support the ultra-reliability for URLLC by identifying the techniques to meet the requirements set by TR 38.913. For NR URLCC in Release 15, key requirements include a target user plane latency of 0.5 ms for UL (uplink) and 0.5 ms for DL (downlink). The general URLLC requirement for one transmission of a packet is a BLER (block error rate) 1E-5 for a packet size of 32 bytes with a user plane of 1 ms.

From RAN 1 perspective, reliability can be improved in a number of possible ways. The current scope for improving the reliability is captured in RP-172817 that includes defining of separate CQI tables for URLLC, more compact DCI formats, repetition of PDCCH, etc. However, the scope may widen for achieving ultra-reliability as the NR becomes more stable and developed (for NR URLCC key requirements, see also 3GPP TR 38.913 V15.0.0, "Study on Scenarios and Requirements for Next Generation Access Technologies"incorporated herein by reference). Accordingly, NR URLLC in Rel. 15 should be capable of transmitting 32 bytes of data packet within a user-plane latency of 1 ms at the success probability corresponding to a BLER of 1E-5. Particular use cases of NR URLCC in Rel. 15 include Augmented Reality/Virtual Reality (AR/VR), e-health, e-safety, and mission-critical applications (see also ITU-R M.2083-0).

Moreover, technology enhancements targeted by NR URLCC in Release 15 aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5 (for the technology enhancements, see also 3GPP TS 38.211"NR; Physical channels and modulation," TS 38.212"NR; Multiplexing and channel coding," TS 38.213"NR; Physical layer procedures for control," and TS 38.214"NR; Physical layer procedures for data," respective versions V15.4.0, all incorporated herein by reference).

The use case of mMTC is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases and especially necessary for URLLC and mMTC is high reliability or ultra-reliability. Several mechanisms can be considered to improve the reliability from radio perspective and network perspective. In general, there are few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC Rel. 16, further use cases with tighter requirements have been identified such as factory automation, transport industry and electrical power distribution, including factory automation, transport industry, and electrical power distribution (see RP-181477, "New SID on Physical Layer Enhancements for NR URLLC," Huawei, HiSilicon, Nokia, Nokia Shanghai Bell, incorporated herein by reference). The tighter requirements are higher reliability (up to 10-6 level), higher availability, packet sizes of up to 256 bytes, time synchronization down to the order of a few ns where the value can be one or a few ns depending on frequency range and short latency in the order of 0.5 to 1 ms in particular a target user plane latency of 0.5 ms, depending on the use cases (see also 3GPP TS 22.261"Service requirements for next generation new services and markets" V16.4.0, incorporated herein by reference and RP-181477).

Moreover, for NR URLCC in Rel. 16, several technology enhancements from RANI perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

In general, TTI determines the timing granularity for scheduling assignment. One TTI is the time interval in which given signals is mapped to the physical layer. Conventionally, the TTI length can vary from 14-symbols (slot-based scheduling) to 2-symbols (non-slot based scheduling). Downlink and uplink transmissions are specified to be organized into frames (10 ms duration) consisting of 10 subframes (1 ms duration). In slot-based transmission, a subframe, in return, is divided into slots, the number of slots being defined by the numerology/subcarrier spacing and the specified values range between 10 slots for a subcarrier spacing of 15 kHz to 320 slots for a subcarrier spacing of 240 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.4.0, incorporated herein by reference). However, assignment of time resources for transmission may also be non-slot based. In particular, the TTIs in non slot-based assignment may correspond to mini-slots rather than slots. E.g., one or more mini-slots may be assign to a requested transmission of data/control signaling. In non slot-based assignment, the minimum length of a TTI may conventionally be 2 OFDM symbols.

Other identified enhancements are related to scheduling/HARQ/CSI processing timeline and to UL inter-UE Tx prioritization/multiplexing. Further identified are UL configured grant (grant free) transmissions, with focus on improved configured grant operation, example methods such as explicit HARQ-ACK, ensuring K repetitions and mini-slot repetitions within a slot, and other MIMO (Multiple Input, Multiple Output) related enhancements (see also 3GPP TS 22.261 V16.4.0).

The present disclosure is related to the potential layer 1 enhancements for further improved reliability/latency and for other requirements related to the use cases identified in (RP-181477, "New SID on Physical Layer Enhancements for NR URLLC," Huawei, HiSilicon, Nokia, Nokia Shanghai Bell). Specifically, enhancements for PUSCH (Physical Uplink Shared CHannel) repetition are discussed. The impact of the proposed ideas in this disclosure is expected to be on PUSCH repetition enhancements which is within the main scope of new SI (study items)/WI (work items) on NR URLLC in Rel. 16.

PUSCH Repetition

One of the scopes for potential enhancements is related to mini-slot repetition of PUSCH within a slot. In the following, a motivation for supporting repetition of PUSCH within a slot is provided which may allow for potential enhancements to the repetition mechanism for further improving the reliability and/or latency to satisfy the new requirements of NR URLLC.

To achieve the latency requirement for URLLC PUSCH transmission, one-shot transmission (e.g., single (TTI) assignment) is ideal, provided the reliability requirement is satisfied. However, it is not always the case that the target BLER of 1E-6 is achieved with one-shot transmission. Therefore, retransmission or repetition mechanisms are required.

In NR Rel.15, both retransmissions and repetitions are supported to achieve the target BLER, when one-shot transmission is not enough. HARQ-based retransmission is well known to improve the overall reliability, by using the feedback information and improving the subsequent retransmissions according to the channel conditions. However, they suffer from additional delay due to feedback processing timeline. Therefore, repetitions are useful for highly delay-tolerant services, as they do subsequent transmission of the same transport blocks without waiting for any feedback.

A PUSCH repetition can be defined as "transmitting a same transport block more than once, without waiting for any feedback of previous transmission(s) of the same transport block." Advantages of PUSCH retransmissions are an improvement in the overall reliability and a reduction in latency in comparison with HARQ, as no feedback is required. However, in general, no link adaptation is possible, and resource usage may be inefficient.

In NR Rel. 15, limited support for repetitions is introduced. Only semi-static configurations of repetitions are allowed. Moreover, repetitions are allowed only between slots (slot level PUSCH repetition). A repetition is only possible in the slot following the slot of the previous transmission. Depending up on the numerology and service type (e.g., URLCC, eMBB), latency between the repetitions can be too long for inter-slot repetition.

Such limited support of repetition is mainly useful for PUSCH mapping type A. This PUSCH mapping type A only allow PUSCH transmissions starting from the beginning of the slot. With repetitions, this would result in an initial PUSCH transmission and each repetition stating at the beginning of plural consecutive slots.

Less useful is the limited support of repetition for a PUSCH mapping type B. PUSCH mapping type B allows PUSCH transmissions to start at any symbol within a slot. With repetitions, this would result in an initial PUSCH transmission and each repetition starting within a slot, at a same symbol of plural consecutive slots.

In any case, such limited support may not be able to achieve stricter latency requirements in NR Rel. 15, e.g., up to 0.5 ms latency. This would require mini-slot repetitions. Additionally, the limited support of repetitions does also not exploit the benefits resulting from mini-slots, namely, transmission time intervals (TTIs) including a smaller number of symbols than a slot (a slot comprising fourteen symbols).

PUSCH Assignments

Another of the scopes for potential enhancements is related to the mini-slot assignments of PUSCH within a slot. In the following, a motivation for supporting assignments of different PUSCH transmissions within a slot is provided which may allow for potential enhancements to the uplink usage for further improving the latency while meeting the reliability requirements to further satisfy new requirements of NR URLLC.

To achieve the latency requirement for URLLC PUSCH transmission, again a one-shot transmission (e.g., single (TTI) assignment) is ideal, provided the reliability is satisfied. However, it is not always the case that the target user plane latency of 0.5 ms is achieved for concurrent PUSCH transmissions. Therefore, enhancements to the uplink assignments are required.

In NR Rel. 15, uplink scheduling is constrained to a single uplink grant per TTI. In case of a single PUSCH transmission, this scheduling constraint is not a restriction and the target user plane latency may be achieved through a one-shot transmission. However, for concurrent PUSCH transmissions, the scheduling constraint results in that one-shot transmissions may not be enough to meet the target user plane latency.

In particular, concurrent PUSCH transmissions demand for separate uplink grants which, however, due to the scheduling constraints must be signaled in consecutive TTIs. Thus, this scheduling constraint introduces unnecessary delay in case of concurrent PUSCH transmissions. Also, plural mini-slot assignments of PUSCH within a slot are also not possible.

In any case, due to such scheduling constraint, it may not be able to achieve stricter latency requirements in NR Rel. 15, e.g., up to 0.5 ms latency. This would require mini-slot assignments of PUSCH. Additionally, the limited support of repetitions does also not exploit the benefits resulting from mini-slots, namely, transmission time intervals (TTIs) including a smaller number of symbols than a slot (a slot comprising fourteen symbols).

Generic Scenario for Uplink

Considering the above, the authors of the present disclosure have recognized that there is a need for more flexible support of PUSCH transmissions, namely for a mechanism which is not restricted to PUSCH transmissions which require separate uplink grants.

At a same time, the more in flexibility shall not come at the expense of additional signaling overhead. In other words, the authors of the present disclosure have recognized that the flexible support of PUSCH transmissions shall not require modifications to the present uplink scheduling mechanism, namely the present format of the uplink grant. In other words, the signaling mechanism, e.g., in form of downlink control information (DCI) format 0-0 or 0-1 for conveying an uplink grant, shall stay the same, thereby avoiding any additional signaling overhead when scheduling the PUSCH transmissions.

It is therefore a proposal of the present disclosure that transport block (TB) transmissions shall be supported with flexible timings which do not necessarily create additional signaling overhead. The following disclosure has been presented with a focus on uplink transmissions. Nevertheless, this shall not be construed as a limitation since the concepts disclosed herein can equally be applied to downlink transmissions.

Figure 4:
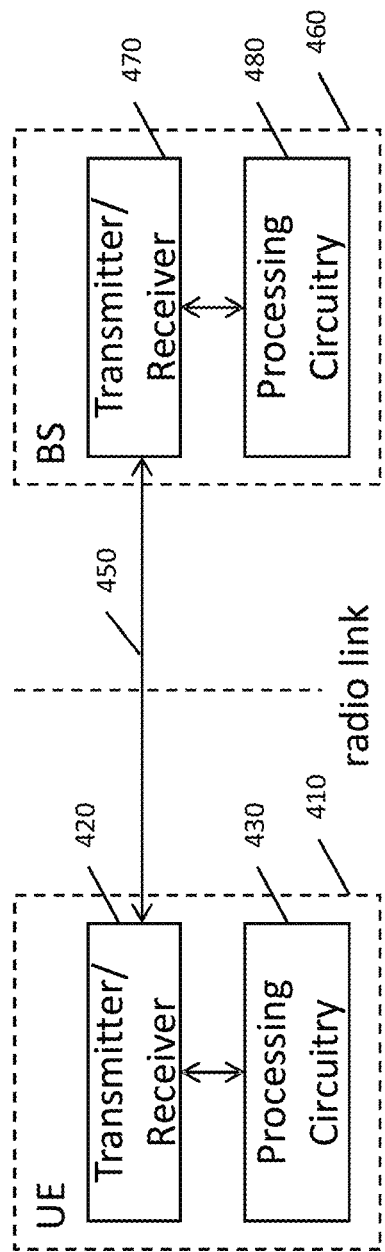
FIG. 4 shows a communication system in NR including a user equipment (UE) and a base station (BS) according to an exemplary scenario.

FIG. 4 shows an exemplary communication system including a user equipment (UE) 410 and a base station (BS) 460 in a wireless communication network. Such communication system may be a 3GPP system such as NR and/or LTE and/or UMTS. For example, as illustrated in the figure, the base station (BS) may be a gNB (gNodeB, e.g., an NR gNB) or an eNB (eNodeB, e.g., an LTE gNB). However, the present disclosure is not limited to these 3GPP systems or to any other systems.

Even though the embodiments and exemplary implementations are described using some terminology of 3GPP systems, the present disclosure is also applicable to any other communication systems, and in particular in any cellular, wireless and/or mobile systems.

Rather, it should be noted that many assumptions have been made herein so as to be able to explain the principles underlying the present disclosure in a clear and understandable manner. These assumptions are however to be understood as merely examples for illustration purposes and should not limit the scope of the disclosure. A skilled reader will be aware that the principles of the following disclosure and as laid out in the claims can be applied to different scenarios and in ways that are not explicitly described herein.

A mobile terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station (BS) forms at least part of a system of interconnected units, for instance a (central) baseband unit and different radio frequency units, interfacing different antenna panels or radio heads in the network for providing services to terminals. In other words, a base station provides wireless access to terminals.

Referring back to the figure, the user equipment 410 comprises processing circuitry (or processor) 430 and a transmitter/receiver (or transceiver) 420 which are indicated as separate building blocks in the diagram. Similarly, base station 460, comprises processing circuitry (or processor) 480 and a transmitter/receiver (or transceiver) 470, which are indicated as separate building blocks in the diagram. The transmitter/receiver 420 of the user equipment 410 is communicatively coupled via a radio link 450 with the transmitter/receiver 470 of the base station 460.

First Generic Uplink Scenario

FIGS. 5 and 6 depict exemplary implementations according to a first generic scenario of the building blocks of the user equipment 410 and of the base station 460, respectively. The user equipment 410 of the exemplary implementation comprises a PUSCH config IE receiver 520-*a*, a table configuring processing circuitry 530-*a*, a DCI receiver 520-*b*, a configured grant config IE receiver 520-*c*, an allocated resources determining processing circuitry 530-*b*, a transport block selecting transmitter 520-*d*, a PUSCH transmissions generating transmitter 520-*e*, and a PUSCH transmitter 520-*f*.

Similarly, the base station 460 of the exemplary implementation comprises a PUSCH config IE transmitter 570-*a*, a table configuring processing circuitry 580-*a*, a DCI transmitter 570-*b*, a configured grant config IE transmitter 570-*c*, a resource allocating processing circuitry 580-*b*, and PUSCH receiver 570-*d*.

In general, the present disclosure assumes that the user equipment 410 is in communication reach of the base station 460 and is configured with at least one bandwidth part in the downlink and at least one bandwidth part in the uplink. The bandwidth parts are located within the carrier bandwidth served by the base station 460.

Further, the present disclosure assumes that the user equipment 410 is operating in a radio resource control, RRC, connected state (termed: RRC_CONNECTED), thereby capable of receiving in the downlink data and/or control signals from the base station 460 and capable of transmitting in the uplink data and/or control signals to the base station 460.

Before performing plural PUSCH transmissions as suggested in the present disclosure, the user equipment 410 receives control messages as defined in the radio resource control, RRC, and the medium access control, MAC, protocol layer. In other words, the user equipment 410 employs signaling mechanism which is readily available in the different protocol layers of the various communication technologies.

In general, a substantial difference is made between control messages defined in RRC and those defined in MAC. This difference becomes already aware from the fact that RRC control messages are usually used for configuration of radio resources (e.g., radio link) on a semi-static basis whereas MAC control messages are used for dynamically defining each medium access (e.g., transmission) separately. From this, it directly follows that RRC control occurs less frequently than MAC control.

Accordingly, an excessive MAC control signaling overhead can substantially impair the communication system performance whereas the RRC control message has been treated more leniently in standardization. In other words, MAC control signaling overhead is a well-recognized constraint to the system performance.

Considering the above, the authors of the present disclosure propose a mechanism which overcomes the disadvantages of conventional mechanisms and permits flexible transport block (TB) transmissions in uplink or downlink, while—at a same time—avoiding MAC signaling overhead.

In the context of the disclosure, the term "transport block" is to be understood as data unit of an uplink and/or downlink transmission. For example, it is widely understood that the term "transport block" is equivalent to a MAC layer packed data unit, PDU. Thus, the transmission of transport block is equally understood as a physical uplink shared channel (PUSCH) and/or physical downlink shared channel (PDSCH) transmission.

Particularly, since PUSCH and/or PDSCH transmissions generally carry payload, the present disclosure shall refer to PUSCH and/or PDSCH transmissions carrying a MAC PDU. In other words, the terms "PUSCH and/or PDSCH transmissions" shall be understood as describing MAC PDU transmission on PUSCH and/or PDSCH.

Referring to FIG. 7, a generic scenario is described with regard to performing plural PUSCH transmissions based on a dynamic grant, namely a DCI carrying a time-domain resource assignment filed, such as, for example, a DCI of DCI format 0-0 or of DCI format 0-1.

This description shall, however, not be understood as a restriction to the present disclosure to only extend to PUSCH transmissions, for example to repetitions thereof. Rather, it will become apparent that the concepts disclosed herein can equally be applied to downlink transmissions The receiver 420 of the user equipment 410 receives (see, e.g., step 710—FIG. 7) a physical uplink shared channel, PUSCH, config information element, IE. This PUSCH config IE is received in form of radio resource control, RRC, signaling and applicable to a particular bandwidth part. The PUSCH config IE is received from the base station 460 serving the particular bandwidth part. For example, this reception operation may be performed by the PUSCH config IE receiver 520-*a* of FIG. 5.

The PUSCH config IE carries among others a list of parameters in form of an information element (IE) termed "PUSCH-TimeDomainResourceAllocationList," wherein each parameter of the list of parameters is termed "PUSCH-TimeDomainResourceAllocation."

Then, the processor 430 of the user equipment 410 configures (see, e.g., step 720—FIG. 7) a table which is defined by the PUSCH time domain resource allocation list IE carried in the received PUSCH config IE. The configured table includes at least one row comprising a first set of values related to allocated time-domain resources for plural PUSCH transmission.

For example, the table includes rows, each with a value indicating a PUSCH mapping type, a value $K_2$ indicating a slot offsets, and a value SLIV indicating a start and length indicator. For example, this configuration operation may be performed by the table configuring processing circuitry 530-*a* of FIG. 5.

In an exemplary implementation, each row of the RRC configure table corresponds to one of plural parameters termed "PUSCH-TimeDomainResourceAllocation" of the list of parameters termed "PUSCH-TimeDomainResourceAllocationList." This shall, however, not be understood as a limitation to the present disclosure, as apparent from the following alternative.

Also scenarios different from the exemplary implementation are conceivable, namely where some rows of the configured table correspond to respective parameters comprised in the IE with the list of parameters, and other rows are configured complying with a set of pre-specified rules readily applying the principles laid out PUSCH time domain resource allocation list IE.

This shall, however, not distract from the fact that the RRC configured table in its entirety is defined by the PUSCH time domain resource allocation list IE.

Subsequently, the receiver 420 of the user equipment 410 receives (see, e.g., step 730—FIG. 7) downlink control information, DCI, signaling. The DCI is carrying a time-domain resource assignment filed with value m, wherein the value m provides a row index m+1 to the configured table. For example, this reception operation may be performed by the DCI receiver 520-*b* of FIG. 5.

In the context of the present disclosure, this DCI is carrying an uplink grant since it serves the purpose of triggering PUSCH transmissions. In this respect, the received DCI is in DCI format 0-0 or in DCI format 0-1. Also, the described scenario refers to situation where the PUSCH repetitions are scheduled by a dynamic grant.

This shall, however, not be understood as limitation to the present disclosure, as the concepts disclosed herein are equally applicable to a configured grant or grant free scheduling technique. A detailed description of this grant free scheduling technique is given as an alternative to the mechanism depicted in FIG. 7.

Subsequently, the processor 430 of the user equipment 410 determines allocated resources for the plural PUSCH transmissions. For sake of clarity and brevity, the following description focusses on the allocation of resources in time domain. For example, this determination operation may be performed by the allocated resources determining processing circuitry 530-*b* of FIG. 5.

The time-domain resources to be used by the user equipment 410 for the plural PUSCH transmissions have been previously allocated by the base station 460. In this context, the processor 430 accordingly determines which of the previously allocated resource it shall use for the plural PUSCH transmissions. For easy reference, the plural PUSCH transmissions may be understood to include a first PUSCH transmission and at least one subsequent PUSCH transmission which are all being scheduled by a single DCI.

As part of this determination operation, the processor 430 determines (see, e.g., step 740—FIG. 7) the allocated time-domain resources for a first of the plural PUSCH transmission based on: (i) index of a slot carrying the received DCI, and (ii) the first set of values that is related to allocated time-domain resources and comprised in the indexed row of the RRC configured table.

For example, the processor 430 may determine the allocated time-domain resource for a first PUSCH transmission based on: (i) index of a slot carrying the received DCI, and (ii) the value $K_2$ indicating the slot offsets, and (iii) the value SLIV indicating the start and length indicator comprised in indexed row of the RRC configured table. This implies that the processor 430 has previously determined that the value indicating the PUSCH mapping type indicates a type B mapping (only when the PUSCH transmission is permitted to start at any symbol within a slot, then it is necessary to base the determination on the value SLIV).

Further to this example, let us assume the received DCI was carried in a slot which has the number k, and further the DCI has a time-domain resource assignment filed with value m. Then, the processor, for the first PUSCH transmission, reverts to the RRC configured table in row with row index m+1 and uses the respective values $K_2$ indicating the slot offsets, and SLIV indicating the start and length indicator. With these value, the processor determines that the allocated time-domain resources, for the first PUSCH transmission, are included in a slot with a number of $k+K_2$, and have a start and length in terms of symbols of this slot corresponding to the value SLIV.

When determining the allocated resources in this example, the processor 430 may also use the value indicating the PUSCH mapping type additionally comprised in the first set of values. Particularly, in case the value indicates a type A PUSCH mapping, the processor 430 only uses the length of the value SLIV indicating a start and length indicator. In case the value indicates a type B PUSCH mapping, the processor 430 uses both the start and the length of the value SLIV indicating the start and length indicator.

Then, the processor 430 proceeds with its operation for the subsequent PUSCH transmissions.

For this, the processor 430 checks (see, e.g., step 750—FIG. 7) a second parameter which indicates to the user equipment 410 whether the subsequent PUSCH transmissions are either different (or separate) PUSCH transmissions or whether they are repeated PUSCH transmissions. In other words, the second parameter instruct the processor 430 how the subsequent PUSCH transmissions are to be utilized, namely for carrying different or a same transport block(s).

In the mechanism depicted in FIG. 7, the first of the plural PUSCH transmissions is understood to always be a unique, e.g., different (or separate) PUSCH transmission. Thus, the second parameter is left to specify only in how far the subsequent PUSCH transmissions differ (or not) from this first (or any other preceding) PUSCH transmission. In this regard, the processor 430 may perform the checking of the second parameter after it has completed its operation for the first PUSCH transmission.

It shall be emphasized in this context that the second parameter is comprised in a row of the RRC configured table which is defined by the PUSCH time domain resource allocation list IE. In other words, since the (entire) RRC configure table is defined by the PUSCH time domain resource allocation list IE, then also the second parameter comprised therein is defined by the PUSCH time domain resource allocation list IE.

This shall, however, not be understood as a limitation to the present disclosure, as the concepts disclosed herein are equally applicable to a second parameter which uniformly specifies the difference (or not) among all of the plural PUSCH transmissions, namely whether all PUSCH transmissions are different or repeated PUSCH transmissions. Then, a different sequence of operation by the processor 430 is also possible.

Although discussed in further detail below, according to one exemplary implementation the processor 430 may, for checking the second parameter, revert to the row with row index m+1 of the RRC configured table and check whether or not this row, comprises the second parameter. However, according to other exemplary implementations, the processor 430 may also employ to the received DCI or to a physical layer configuration for checking whether the second parameter indicates either different or repeated PUSCH transmissions.

In case the check indicates different (or separate) PUSCH transmissions, then the sequence of operations of the mechanism depicted in FIG. 7 proceeds with the processor 430 determining (see, e.g., step 770—FIG. 7) allocated time-domain resources for the subsequent (not the first) transmissions in form of different (or separate) PUSCH transmissions.

In the mechanism depicted in FIG. 7, the processor 430 not necessarily determines the time-domain resources based on an explicit indication which is signaled from the base station 460 to the user equipment 410. Instead, the processor 430 may also rely on pre-specified (e.g., in the relevant standard fixedly prescribed) timing relations between the first PUSCH transmission and subsequent PUSCH transmissions for determining the time-domain resources for the different (or separate) PUSCH transmissions.

Also, the processor 430 may determine the time-domain resources by applying the same timing relations as specified in the first set of values to a consecutive number of slots for the subsequent PUSCH transmissions. This results in a first PUSCH transmission and each subsequent PUSCH transmission starting at a same symbol and having a same symbol length of plural consecutive slots This shall, however, not be understood as a limitation to the present disclosure, as apparent from the following alternative.

In case the check indicates repeated PUSCH transmissions, then the sequence of operations of the mechanism depicted in FIG. 7 proceeds with the processor 430 checking (see, e.g., step 755—FIG. 7) if there exists (explicit) time-domain resource assignments for the subsequent PUSCH transmissions in form of repeated transmissions of the first (or any other preceding) PUSCH transmission.

For this, the processor 430 checks (see, e.g., step 755—FIG. 7) if there exists a third set of values related to (explicit) time-domain resource assignments for the subsequent PUSCH transmissions. For this, the processor 430 reverts to the row with row index m+1 and checks whether or not this row comprises the third set of values (e.g., at least one value) which are specifying the allocated time-domain resource for the subsequent PUSCH transmissions in form of repeated PUSCH transmissions.

In case the check is negative, the processor 430 uses (see, e.g., step 760—FIG. 7) a conventional slot-based repetition mechanism for the repetition of the first PUSCH transmission, if configured. In other words, the processor 430 relies on pre-specified (e.g., in the relevant standard fixedly prescribed) timing relations between the first PUSCH transmission and the repetitions thereof. For example, this results in a first PUSCH transmission and each repetition starting at a same symbol and having a same symbol length of plural consecutive slots.

Referring back to the example, the processor 430, for the at least one subsequent PUSCH transmission, reverts to the row with row index m+1 of the RRC configured table, and determines that the allocated resources, for the first repetition of the first PUSCH transmission, are included in a slot with number $k+K_2+1$ (where 1 is a pre-defined constant fixed by standardization), and have a start and length in terms of symbols of this slot corresponding to the same value SLIV.

Should there be a second repetition, the processor 430 that the allocated resources, for the second repetition of the initial PUSCH transmission, are included in a slot with number $k+K_2+2$ (where 2 is again a pre-defined constant fixed by standardization), and have a start and length in terms of symbols of this slot corresponding to the same value SLIV as already the initial PUSCH transmission and the first repetition thereof. Further repetitions follow at contiguous slots.

Further to this example, when assuming that the PUSCH mapping type indicted in the row with row index m+1 is type B, and when assuming that the value SLIV indicates a start at symbol 4 and a length of 4 symbols, then the processor 430 determines that each one of the initial, the first repetition and the second repetition of the PUSCH transmission have resources corresponding to symbol 4, symbol 5, symbol 6 and symbol 7 in the slots with number $k+K_2$, number $k+K_2+1$, number $k+K_2+2$, respectively.

Evidently, these allocated resources as determined by the processor 430 cannot be flexibly configured. This is overcome by the alternative determination by the processor 430.

In case the check is positive, the processor 430 uses (see, e.g., step 770—FIG. 7) the third set of values (e.g., at least one value) comprised in the indexed row of the RRC configure table for determining allocated resources for the repetition of the first PUSCH transmission in its subsequent PUSCH transmissions. In other words, the comprised third set of values is specifying the allocated time domain resource for the repetition of the initial PUSCH transmission.

It shall be emphasized in this context that the third set of values (e.g., at least one value) is comprised in a row of the RRC configured table which is defined by the PUSCH time domain resource allocation list IE. In other words, since the (entire) RRC configure table is defined by the PUSCH time domain resource allocation list IE, then also the third set of values comprised therein is defined by the PUSCH time domain resource allocation list IE.

To meet this constrains, the third set of values could be (directly) prescribed by a parameter comprised in the PUSCH time domain resource allocation list IE, or alternatively the third set of values could be (indirectly) inferred from related parameters comprised in the PUSCH time domain resource allocation list IE. In any case, the third set of values specifies in time domain the repetition of the initial PUSCH transmission.

In one exemplary implementation, for the third set of values, a value SLIV' indicating another start and length indicator may be (indirectly) inferred by the processor 430 from modified SLIV parameters comprised in the PUSCH time domain resource allocation list IE. A modified SLIV parameter is provided, for example, with twice, three times, . . . the number of bits (e.g., 14 bits instead of 7 bits, or also 21 bits instead of 7 bits, or so on). Thereby, this modified SLIV parameter may be used by the processor 430 to (indirectly) infer, when configuring the table, the value SLIV included in the first set of values, and the value SLIV', included in the third set of values of the RRC configured table.

It is important to realize that the processor 430 of the user equipment 410 uses the third set of values from the indexed row of the RRC configured table for determining the allocated time-domain resources for the repetitions of the first PUSCH transmission. This approach substantially differs from the conventional slot-based repetition mechanism.

Although not depicted in FIG. 7, in an alternative mechanism the processor 430 may also use the third set of values from the indexed row of the RRC configured table for determining the allocated time-domain resource for subsequent PUSCH transmissions in form of different (or separate) PUSCH transmissions. Thus, the third set of values is not restricted in its use for repeated PUSCH transmission.

For this alternative mechanism, the processor 430 deviates from mechanism depicted in FIG. 7, after the check of the second parameter (see, e.g., step 750—FIG. 7) indicates different (or separate) PUSCH transmissions, namely by thereafter checking (similar to, e.g., step 755—FIG. 7) if there exists a third set of values related to (explicit) time-domain resource assignments.

With this check, the mechanism differs from what is depicted in FIG. 7. The difference applies only to the case that different (or separate) PUSCH transmissions are being indicated. If this check is positive, then processor 430 then uses the third set of values for determining the allocated time-domain resource also for subsequent PUSCH transmissions in form of different (or separate) PUSCH transmissions.

This is different for the following reasons:

Firstly, the third set of values comes from a row of the RRC configured table which is (actively) indexed by the row index m+1 derived from value m in the time-domain resource assignment field of the received DCI. In this respect, varying index values m in the in the time-domain resource assignment field of the received DCI permit a varying third set of values to be used for determining the allocated time-domain resources for the subsequent PUSCH transmissions. Thereby, the flexibility of such allocated resources is increased.

Secondly, the third set of values comes from a (same) row of the RRC configured table which is (already) indexed by the row index m+1 derived from value m in the time-domain resource assignment field of the received DCI. In this respect, no additional index value is required than then index value m in the in the time-domain resource assignment field of the received DCI when determining the allocated resources for the subsequent PUSCH transmission. Thereby, any additional signaling overhead is avoided.

Consequently, this permits increasing flexibility while avoiding signaling overhead, namely by the processor 430 of the user equipment 410 using the third set of values from the indexed row of the RRC configured table for determining the allocated resources for the repetitions.

Thereafter, the transmitter 420 of the user equipment 410 selects the transport blocks of data (see, e.g., step 780—FIG. 7) to be carried in the plural PUSCH transmissions including the first and subsequent PUSCH transmissions. This selection of transport blocks of data is based on the second parameter.

In the case that the second parameter indicates different (or separate) PUSCH transmissions, the transmitter 420 selects a different transport block of data for each of the plural PUSCH transmissions. In case that the second parameter indicates repeated PUSCH transmissions, the transmitter 420 selects a same transport block of data for all of the plural PUSCH transmissions. For example, this selection operation may be performed by the transport blocks selecting transmitter 520-*d* of FIG. 5.

Then, the transmitter 420 generates (see, e.g., step 790—FIG. 7) the plurality of PUSCH transmissions carrying the selected transport blocks of data. For example, this generation operation may be performed by the PUSCH transmissions generating transmitter 520-*e* of FIG. 5.

In exemplary implementations, this generation operation may be based on at least one fourth value in the indexed row of the RRC configured table which are related to the generation of the plurality of plural PUSCH transmissions as will be discussed in further detail below. Also the generation operation may adhere to at least one fifth parameter in the indexed row of the RRC configured table which are also related to the generation of the plurality of PUSCH transmissions as will again be discussed in further detail below.

Finally, the transmitter 420 of the user equipment 410 transmits (not depicted in FIG. 7) a PUSCH transmission using the respectively determined allocated resources for the first and subsequent PUSCH transmission, namely either in the form of different (or separate) PUSCH transmissions or in the form of repeated PUSCH transmissions. For example, this transmission operation may be performed by the PUSCH transmitter 520-*f* of FIG. 5.

In summary, a mechanism is disclosed which facilitates alleviating the uplink scheduling constraints resulting from one uplink grant per TTI. For this purpose, the RRC configure table permits the user equipment 410, despite having received only a single DCI with an uplink grant, to transmit plural PUSCH transmission, be it in the form of different (or separate) PUSCH transmissions, or be it in the form of repeated PUSCH transmissions.

Thereby, the present disclosure permits a more flexible support of PUSCH transmissions, namely enabling a mechanism which is not restricted to separate PUSCH transmissions which require separate uplink grants in consecutive TTIs.

This mechanism may be combined, as discussed before, with the possibility to indicate (explicit) time-domain resource assignments for the subsequent PUSCH transmissions. Consequently, an increasing flexibility is facilitated while avoiding signaling overhead, namely by the processor 430 of the user equipment 410 using the third set of values from the indexed row of the RRC configured table for determining the allocated resources for the repetitions.

The above description has been given from the perspective of the user equipment 410. This shall, however, not be understood as a limitation to the present disclosure. The base station 460 equally performs the generic scenario disclosed herein.

The transmitter 470 of the base station 460 transmits a physical uplink shared channel, PUSCH, config information element, IE, in form of radio resource control, RRC, signaling. The PUSCH config IE being applicable to a particular bandwidth part. For example, this transmission operation may be performed by the PUSCH config IE transmitter 670-*a* of FIG. 6.

Then, the processor 480 of the base station 460 configures a table which is defined by a PUSCH time domain resource allocation list IE carried in the received PUSCH config IE. The RRC configured table comprises rows, each with first set of values related to allocated time-domain resources for a plurality of PUSCH transmissions. For example, this configuration operation may be performed by the table configuring processing circuitry 680-*a* of FIG. 6.

Subsequently, the transmitter 470 of the base station 460 transmits downlink control information, DCI, signaling carrying a time-domain resource assignment filed with value m, wherein the value m provides a row index m+1 to the RRC configured table. For example, this transmission operation may be performed by the DCI transmitter 670-*b* of FIG. 6.

The processor 480 of the base station 460 allocates time-domain resources for the plurality of PUSCH transmissions based on: (i) index of a slot carrying the transmitted DCI, and (ii) the first set of values related to allocated time-domain resources comprised in the indexed row of the RRC configured table. For example, this resource allocation operation may be performed by the resource allocating processing circuitry 680-*b* of FIG. 6.

Then, the receiver 470 of the base station 460 receives the plurality of PUSCH transmissions using the respectively allocated time-domain resources. For example, this reception operation may be performed by the PUSCH receiver 670-*d* of FIG. 6.

Further, the receiver 470 of the base station 460 processes transport blocks of data which are carried in the plurality of received PUSCH transmissions. For example, this processing operation may be performed by the Transport block processing receiver 670-e of FIG. 6.

In particular, the transport blocks of data are processed based on at least one second parameter comprised in the indexed row of the RRC configured table which is indicating whether the plurality of PUSCH transmissions are either different PUSCH transmissions or repeated PUSCH transmissions.

Now, a generic scenario is described with regard to performing PUSCH repetitions based on a configured grant (or grant free), namely a configured grant config IE received in form of RRC signaling, and also comprising a PUSCH time domain resource allocation list IE.

The receiver 420 of the user equipment 410 receives a physical uplink shared channel, PUSCH, config information element, IE, in form of radio resource control, RRC, signaling. The PUSCH config IE is applicable to a particular bandwidth part. The PUSCH config IE is received from the base station 460 serving the particular bandwidth part. For example, the reception operation may be performed by the PUSCH config IE receiver 520-a of FIG. 5.

Then, the processor 430 of the user equipment 410 configures a table which is defined by a PUSCH time domain resource allocation list IE carried in the received PUSCH config IE. The RRC configured table comprises rows, each with a first set of values related to allocated time-domain resources for a plurality of PUSCH transmissions. For example, this configuration operation may be performed by the table configuring processing circuitry 530-a of FIG. 5.

Subsequently, the receiver 420 of the user equipment 410 receives a configured grant config IE in form of RRC signaling carrying a time domain allocation filed with value m, wherein the value m provides a row index m+1 to the configured table. For example, this reception operation may be performed by the configured grant config IE receiver 520-c of FIG. 5.

The processor 430 of the user equipment 410 determines allocated resources for the plurality of PUSCH transmissions based on: (i) a value of a time domain offset field additionally carried in the received configured grant config IE and associated with the time domain allocation filed, and (ii) the first set of values related to allocated time-domain resources comprised in the indexed row of the RRC configured table. For example, this determination operation may be performed by the allocated resources determining processing circuitry 530-b of FIG. 5.

Then, the transmitter 420 of the user equipment 410 selects transport blocks of data to be carried in the plurality of PUSCH transmissions. For example, this selection operation may be performed by the transport blocks selecting transmitter 520-d of FIG. 5.

In particular, the transport blocks of data are selected based on at least one second parameter comprised in the indexed row of the RRC configured table which is indicating whether the plurality of PUSCH transmissions are either different PUSCH transmissions or repeated PUSCH transmissions.

Finally, the transmitter 420 of the user equipment 410 transmits a PUSCH transmission using the respectively determined allocated resources. For example, this transmission operation may be performed by the PUSCH transmitter 520-f of FIG. 5.

The above description has been given from the perspective of the user equipment 410. This shall, however, not be understood as a limitation to the present disclosure. The base station 460 equally performs the generic scenario disclosed herein.

The transmitter 470 of the base station 460 transmits a physical uplink shared channel, PUSCH, config information element, IE, in form of radio resource control, RRC, signaling, the PUSCH config IE being applicable to a particular bandwidth part. For example, this transmission operation may be performed by the PUSCH config IE transmitter 670-a of FIG. 6

Then, the processor 480 of the base station 460 configures a table which is defined by a PUSCH time domain resource allocation list IE carried in the received PUSCH config IE. The RRC configured table comprises rows, each with a first set of values related to allocated time-domain resources for a plurality of PUSCH transmissions. For example, this configuration operation may be performed by the table configuring processing circuitry 680-a of FIG. 6.

Subsequently, the transmitter 470 of the base station 460 transmits a configured grant config IE in form of RRC signaling carrying a time domain allocation filed with value m, wherein the value m provides a row index m+1 to the RRC configured table. For example, this transmission operation may be performed by the configured grant config IE transmitter 670-c of FIG. 6.

The processor 480 of the base station 460 allocates resources for a plurality of PUSCH transmissions based on: (i) a value of time domain offset field additionally carried in the received configured grant config IE and associated with the time domain allocation filed, and (ii) the first set of values related to allocated time-domain resources comprised in the indexed row of the RRC configured table. For example, this resource allocation operation may be performed by the resource allocating processing circuitry 680-b of FIG. 6.

Then, the receiver 470 of the base station 460 receives the plurality of PUSCH transmissions using the respectively allocated time-domain resources. For example, this reception operation may be performed by the PUSCH receiver 670-d of FIG. 6.

Further, the receiver 470 of the base station 460 processes transport blocks of data which are carried in the plurality of received PUSCH transmissions. For example, this processing operation may be performed by the Transport block processing receiver 670-e of FIG. 6.

In particular, the transport blocks of data are processed based on at least one second parameter comprised in the indexed row of the RRC configured table which is indicating whether the plurality of PUSCH transmissions are either different PUSCH transmissions or repeated PUSCH transmissions.

Alternatives Complementing the Generic Scenarios

The above description has been made with the focus on an implementation where the base station 460 and/or user equipment 410 assumes that the second parameter is comprised in the indexed row of the RRC configure table. As stated before, this description shall however not be understood as limiting the present disclosure.

Rather, the description merely corresponds to one out of many alternative implementations of the present disclosure which all share the common concept of explicitly or implicitly signaling the second parameter between base station 460 and user equipment 410.

In more detail, for the subsequent PUSCH transmissions, the processor 430 of the above described implementation reverts to the row with row index m+1 of the RRC configured table in order to determine from the second parameter, comprised in this indexed row of the RRC configured table, whether these transmissions are either different (or separate) PUSCH transmissions or repeated PUSCH transmissions.

The skilled reader readily understands that the second parameter is comprised in a row of the RRC configured table which is defined by the PUSCH time domain resource allocation list IE. In other words, since the (entire) RRC configure table is defined by the PUSCH time domain resource allocation list IE, then also the second parameter comprised therein is defined by the PUSCH time domain resource allocation list IE.

In short, the second parameter in this one implementation is explicitly signaling between user equipment 410 and base station 460 in form of the PUSCH time domain resource allocation list IE.

Alternative implementations of the present disclosure focus on the received DCI which is scheduling the PUSCH transmission (or the PDSCH transmission) for conveying the second parameter to the user equipment 410 and/or to the base station 460. In such cases, the second parameter may be explicitly or implicitly signaled between base station 460 and user equipment 410.

In more detail, for the subsequent PUSCH transmission, the processor 430 of these alternative implementations reverts to the received DCI scheduling the plural PUSCH transmissions, in order to determine from a second parameter which is conveyed via the received DCI whether these transmissions are either different (or separate) PUSCH transmissions or repeated PUSCH transmissions.

First Example of the Alternative Implementations

In a first example of the alternative implementations, the second parameter may be conveyed via the received DCI in form of a separate (e.g., new) bit field comprised in the DCI transmitted between the base station 460 and the user equipment 410. This equally applies to a DCI of DCI format 0-0 or of DCI format 0-1. Accordingly, this separate (e.g., new) bit filed comprised in the DCI permits explicitly signaling the second parameter between user equipment 410 and base station 460.

For instance, the separate (e.g., new) bit field comprised in the DCI may be termed "TBrepeat" and may have a format of 1 bit only for indicating whether the plurality of PUSCH transmissions are either different or repeated PUSCH transmissions. Considering a bit field with a 1 bit format, then a bit value of '0' may indicate that the plural PUSCH transmissions are to be transmitted in the form of different (or separate) PUSCH transmissions, whereas a bit value of '1' may indicate that the plural PUSCH transmissions are to be used in the form of repeated PUSCH transmissions.

In this context, it should be noted that the DCI, which is being received by the receiver 420 of the user equipment 410, is uniformly scheduling (at least to the extent of their timing relations) all of the plural PUSCH transmissions which are then transmitted by the transmitter 420. Thus, it may appear artificial to distinguish for the second parameter in the separate (e.g., new) bit field of the DCI between the first and the subsequent PUSCH transmissions.

In order to avoid such artificial distinctions, the DCI as well as the second parameter comprised therein are both stated to uniformly characterize all of the plural PUSCH transmissions. This statement, however, merely simplifies what has been said before:

In case the second parameter indicates plural repeated PUSCH transmissions, then it is again the subsequent PUSCH transmissions which are repetitions of a first PUSCH transmission. In case the second parameter indicates plural different (or separate) PUSCH transmissions, then it is again the subsequent PUSCH transmissions which are different from a first PUSCH transmission.

In summary, with this first example of the alternative implementations, it is possible to achieve a good trade-off between RRC signaling overhead and MAC signaling overhead when transmitting the DCI. Additionally this first example facilitates provide a mechanism which has no impact on the RRC configuration for time-domain resource assignments since the second parameter is explicitly provided in the DCI.

Second Example of the Alternative Implementations

In a second example of the alternative implementations, the second parameter may be conveyed via the received DCI in form of a particular (e.g., new) radio network temporary identifier, RNTI, which is used for scrambling the cyclic redundancy check, CRC, bit field of the DCI transmitted between the base station 460 and the user equipment 410. This equally applies to a DCI of DCI format 0-0 or of DCI format 0-1. Accordingly, the particular (e.g., new) RNTI permits implicitly signaling the second parameter between user equipment 410 and base station 460.

For instance, the user equipment 410 may be configured with a particular (e.g., new) RNTI. After reception of the DCI, the receiver 420 of the user equipment 410 may attempt to decode the DCI at first without scrambling of the CRC filed of the DCI with the particular (e.g., new) RNTI. If the receiver 420 is successfully decoding the DCI, then the processor 430 infers a second parameter which indicates that the DCI is scheduling all of the plural PUSCH transmission in form of repeated PUSCH transmissions.

If the receiver 420 with its first attempt to decode the DCI fails, then it may attempt to decode the DCI with scrambling of the CRC field of the DCI with the particular (e.g., new) RNTI. If the receiver is then successfully decoding the DCI, then the processor 430 infers a second parameter which indicates that the DCI is scheduling all of the plural PUSCH transmissions in form of different (e.g., separate) PUSCH transmissions.

Again, it should be noted that the DCI, which is being received by the receiver 420 of the user equipment 410, is uniformly scheduling (at least to the extent of their timing relations) all of the plural PUSCH transmissions which are then transmitted by the transmitter 420. Thus, it may appear artificial to distinguish for the second parameter in the separate (e.g., new) bit field of the DCI between the first and the subsequent PUSCH transmissions.

In order to avoid such artificial distinctions, the DCI as well as the second parameter comprised therein are both stated to uniformly characterize all of the plural PUSCH transmissions. This statement, however, merely simplifies what has been said before:

In case the second parameter indicates plural repeated PUSCH transmissions, then it is again the subsequent PUSCH transmissions which are repetitions of a first PUSCH transmission. In case the second parameter indicates plural different (or separate) PUSCH transmissions, then it is again the subsequent PUSCH transmissions which are different from a first PUSCH transmission.

In summary, with this second example of the alternative implementations, it is possible to avoid any RRC signaling overhead and avoid any additional MAC signaling overhead when transmitting the DCI. Additionally this second example facilitates providing a mechanism which has no impact on the RRC configuration for time-domain resource assignments since the second parameter is implicitly provided in the DCI.

Further alternative implementations of the present disclosure focus on a physical layer configuration of the user equipment 410 which is being received from the base station 460, for instance, upon initial access to the cell broadcasting the particular bandwidth part for which the PUSCH config IE is applicable. This physical layer configuration may alternatively also be referred to as "physical layer identification of the transmission/reception scenario or service type."

In more detail, the physical layer configuration being signaled between base station 460 and user equipment 410 is conveying the second parameter. Thus, for the subsequent PUSCH transmission, the processor 430 of these alternative implementations revert to the received physical layer configuration in order to determine from the second parameter, which is conveyed via the physical layer configuration whether these transmissions are either different (or separate) PUSCH transmissions or repeated PUSCH transmissions.

Third Example of the Alternative Implementations

In a third example of the alternative implementations, the second parameter may be conveyed via the physical layer configuration in form of a separate (e.g., new) parameter comprised in a physical, Phy-, parameter IE.

This Phy-Parameter IE is received by the receiver 420 of the user equipment 410 in form of RRC signaling. After having received the Phy-Parameter IE, the processor 430 infers from same received second parameter, whether or not it is indicating different or repeated PUSCH transmissions for all of the plurality of PUSCH transmissions. Accordingly, this separate (e.g., new) parameter comprised in the Phy-Parameter IE permits explicitly signaling the second parameter between user equipment 410 and base station 460.

For instance, the separate (e.g., new) parameter comprised in the Phy-Parameter IE may be termed "pusch-MultipleTransmissions" and may be of format "ENUMERATED {repeatTB, differentTB}." This parameter may only be considered when a single DCI is configured to schedule plural PUSCH transmissions as in the focus of the present disclosure. If the single DCI is not configured to schedule multiple PUSCH transmissions, then this parameter is not considered by the user equipment 410. Such distinction can be either applied to all DCIs or can be restricted to particular DCIs.

Fourth Example of the Alternative Implementations

In a third example of the alternative implementations, the second parameter may be conveyed via the physical layer configuration in form of particular radio spectrum configuration for a particular bandwidth part.

The radio spectrum configuration is received by the receiver 420 of the user equipment 410 in form of RRC signaling. After having received the radio spectrum configuration of the particular bandwidth part to which the PUSCH config IE is applicable, then the processor 430 infers the second parameter by checking whether or not the radio spectrum configuration indicates specific radio bands which can only be used in an unlicensed mode of operation.

For instance, industrial, scientific and medical (ISM) radio bands are radio bands (portions of the radio spectrum) reserved internationally for the use of radio frequency (RF) energy for industrial, scientific and medical purposes other than telecommunications. Due to this dedicated purpose, they may only be used in an unlicensed mode of operation.

In case the check for specific radio bands is positive, the processor 430 infers a second parameter which indicates that all of the plural PUSCH transmissions are to be carried out in the form of repeated PUSCH transmissions. In case the check for specific radio bands is negative, the processor 430 infers a second parameter which indicates that all of the plural PUSCH transmissions are to be carried out in the form of different (or separate) PUSCH transmissions.

Accordingly, the radio spectrum configuration permits implicitly signaling the second parameter between user equipment 410 and base station 460. In more detail, due to the fact that the radio spectrum configuration pertains to the same particular bandwidth part to which also the PUSCH config IE is applicable, the user equipment 410 can implicitly establish a relationship between an unlicensed mode of operation and a necessity (or requirement) for an enhanced reliability of the PUSCH transmissions on the particular bandwidth part.

In summary, with this fourth example of the alternative implementations, it is possible to avoid any RRC signaling overhead and avoid any additional MAC signaling overhead when transmitting the DCI. Further this fourth example facilitates providing a mechanism which may consistently ensure repeated PUSCH transmission in unlicensed spectrum.

Fifth Example of the Alternative Implementations

In a fifth example of the alternative implementations, the second parameter may be conveyed via the physical layer configuration in form of a service type configuration having specific reliability and/or latency requirements.

This service type configuration is received by the receiver 420 of the user equipment 410 in form of RRC signaling. After having received the service configuration, then the processor 430 infers the second parameter by determining whether or not the specific reliability and/or latency requirements of the service type configuration exceeds particular target values.

For instance, in case the processor 430 determines that the specific reliability and/or latency requirements of the service type configuration are below (are more lenient than) respective target values, then the processor 430 infers a second value which indicates that the plural PUSCH transmissions are to be carried out in form of different (or separate) PUSCH transmissions. In case the processor 430 determines that the specific reliability and/or latency requirements are above (are more strict than) respective target values, then the processor infers a second value which indicates that the plural PUSCH transmissions are to be carried out in form of repeated PUSCH transmissions.

Accordingly, the service type configuration having specific reliability and/or latency requirements permits implicitly signaling the second parameter between user equipment 410 and base station 460.

Generic Scenario for Downlink

As already mentioned above, the present disclosure is not limited to transport block (TB) transmissions in the uplink but can equally be applied to downlink transmissions, namely to achieve a flexible support of TB transmissions in the downlink. Also here, transport block (TB) transmissions are supported with flexible timings which do not create additional signaling overhead.

In other words, the benefit of an improved flexibility when scheduling transport block transmissions are not only achievable for physical uplink shared channel (PUSCH) transmissions, but are equally achievable for physical downlink shared channel (PDSCH) transmissions. This directly follows from the high degree of similarity between the PUSCH-Time Domain Resource Allocation List information element (IE), and the PDSCH-Time Domain Resource Allocation List IE.

Also, no additional signaling overhead is created since the scheduling described henceforth relies on the PDSCH-Time Domain resource allocation field in DCI Format 1-0 or 1-1, which is highly similar to the on the PUSCH-Time Domain Resource Allocation field in DCI format 0-0 or 0-1 discussed before.

In general, the receiver 420 of the user equipment 410 receives a physical downlink shared channel, PDSCH, config information element, IE, in form of radio resource control, RRC, signaling. The PDSCH config IE is applicable to a particular bandwidth part which is served by the base station 460.

Then, the processor 430 of the user equipment 410 configures a table which is defined by a PDSCH time domain resource allocation list IE carried in the received PDSCH config IE. The RRC configured table comprising rows, each with a first set of values related to allocated time-domain resources for a plurality of PDSCH transmissions.

Subsequently, the receiver 420 of the user equipment 410 receives downlink control information, DCI, signaling carrying a time-domain resource assignment filed with value m, wherein the value m provides a row index m+1 to the RRC configured table.

The processor 430 of the user equipment 410 determines allocated resources for the plurality of PDSCH transmissions based on: (i) index of a slot carrying the received DCI, and (ii) the first set of values related to allocated time-domain resources comprised in the indexed row of the RRC configured table.

Thereafter, the receiver 420 of the user equipment 410 receives the plurality of PDSCH transmissions using the respectively determined allocated time-domain resources, and processes transport blocks of data which are carried in the plurality of received PDSCH transmissions; and In particular, the transport blocks of data are processed based on at least one second parameter comprised in the indexed row of the RRC configured table which is indicating whether the plurality of PDSCH transmissions are either different PDSCH transmissions or repeated PDSCH transmissions.

First Exemplary Implementation

The following first exemplary implementation is conceived with the understanding that the indexed row of the RRC configured table comprises (exactly) one second parameter which has one of a value 'Different' indicating that the subsequent PUSCH transmissions are different (e.g., separate) PUSCH transmissions, or a value 'Repeat' indicating that the subsequent PUSCH transmissions are repeated PUSCH transmissions.

Since the first PUSCH transmission from the plurality of PUSCH transmissions is always a different PUSCH transmission it may seem artificial to distinguish in case of (exactly) one second parameter between this first PUSCH transmission and the subsequent PUSCH transmissions. In this regard, it may be stated that the (exactly) one second parameter pertains to all of the PUSCH transmissions.

In other words, the indexed row of the RRC configured table comprises a same one of the at least one second parameter which is indicating different or repeated PUSCH transmissions for all of the plurality of PUSCH transmissions.

The processor 430, 480 of the user equipment 410, or of the base station 460, configures this table in accordance with the parameters comprised in a PUSCH time domain resource allocation list IE.

An example of such a PUSCH time domain resource allocation list IE is reproduced herein below, namely as example 1. As the terminology may change in the future, this example shall be more broadly understood with regard to its functions and concepts of signaling the additional parameters comprised in a PUSCH time domain resource allocation list IE.

Example 1

ASN.1 Notation of
"Pusch-Timedomainresourceallocationlist IE"

EXAMPLE 1:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : :=    SEQUENCE {
    k2                              INTEGER (0..32)          OPTIONAL,    --
Need S
    mappingType                     ENUMERATED {typeA, typeB},
    startSymbolAndLength            INTEGER (0..127),
    TBtype                          ENUMERATED {Different, Repeat},
    multiplePUSCHTransmissions      SEQUENCE {
        . . . .
        . . . .
    }
}
-- TAG-PUSCH-TIMEDOMAINRESOURCEALLOCATIONLIST-STOP
-- ASN1STOP
```

Second Exemplary Implementation

The following second exemplary implementation is conceived with the understanding that the indexed row of the RRC configured table comprises separate second parameters for the subsequent PUSCH transmissions. Each of the second parameters has one of a value 'Different' indicating that the respective subsequent PUSCH transmission is a different (e.g., separate) PUSCH transmission compared to the preceding PUSCH transmission, or a value 'Repeat' indicating that the respective subsequent PUSCH transmission is a repeated PUSCH transmissions compared to the preceding PUSCH transmission.

In other words, the indexed row of the RRC configured table comprises a different one of the at least one second parameter which is indicating different or repeated PUSCH transmissions for each of the plurality of PUSCH transmissions excluding a first of the plurality of PUSCH transmissions.

The processor 430, 480 of the user equipment 410, or of the base station 460, configures this table in accordance with the parameters comprised in a PUSCH time domain resource allocation list IE.

An example of such a PUSCH time domain resource allocation list IE is reproduced herein below, namely as example 2. As the terminology may change in the future, this example shall be more broadly understood with regard to its functions and concepts of signaling the additional parameters comprised in a PUSCH time domain resource allocation list IE.

Example 2

ASN.1 Notation of
"Pusch-Timedomainresourceallocationlist IE"

Third Exemplary Implementation

The following third exemplary implementation is conceived with the understanding that at least one of the third set of values, comprised in the indexed row of the RRC configured table, is at least one of a value K 2 ' indicating another slot offset for at least one subsequent PUSCH transmission(s), a value SLIV' indicating another start and length indicator value for the at least one subsequent PUSCH transmission(s), and/or a value indicating the number of the at least one subsequent PUSCH transmission(s).

In particular, the other start and length indicator value SLIV' comprises: a value S' indicating a symbol number specifying the start of the allocated time-domain resources for the at least one subsequent PUSCH transmission(s), and a value L' indicating a number of symbols specifying the length of the allocated time-domain resources for the at least one subsequent PUSCH transmission(s).

With this understanding, the RRC configured table comprises not only values from the first set of values which are specifying allocated time-domain resources for the first PUSCH transmission. Rather the RRC configured table comprises a third set of values including values $K_2$' and/or SLIV' which are specifying allocated time-domain resources for the at least one subsequent PUSCH transmission(s). In addition, the third set of values includes a value indicating the number of the at least one subsequent PUSCH transmission(s) further complements the RRC configured table in that it permits a more flexible determination as to which of the specified allocated time-domain resource are to be used for subsequent PUSCH transmissions.

In particular, the processor 430, 480 of the user equipment 410, or of the base station 460, configures this table in accordance with the parameters comprised in a PUSCH time domain resource allocation list IE.

An example of such a PUSCH time domain resource allocation list IE is reproduced herein below, namely as example 3. As the terminology may change in the future, this example shall be more broadly understood with regard to its functions and concepts of signaling the additional parameters comprised in a PUSCH time domain resource allocation list IE.

EXAMPLE 2:
ASN.1 NOTATION OF "PUSCH-
TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : := SEQUENCE (SIZE (1 . . .
maxNrofUL-Allocations)) OF PUSCH-TimeDomainResourceAllocation
PUSCH-TimeDomainResourceAllocation : := SEQUENCE {
    k2                         INTEGER (0 . . . 32)      OPTIONAL,
    -- Need S
    mappingType                ENUMERATED {typeA, typeB},
    startSymbolAndLength       INTEGER (0 . . . 127),
    multiplePUSCHTransmissions  SEQUENCE {
      TBtype                   ENUMERATED {Different, Repeat},
      . . .
      . . .
    }
}
-- TAG-PUSCH-TIMEDOMAINRESOURCEALLOCATIONLIST-STOP
-- ASN1STOP
```

EXAMPLE 3:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
    k2                              INTEGER (0..32)             OPTIONAL,  --
Need S
    mappingType                     ENUMERATED {typeA, typeB},
    start SymbolAndLength           INTEGER (0..127) ,
    numberOfTransmissions           INTEGER (0..8),
    multiplePUSCHTransmissions      SEQUENCE {
        k2'                         INTEGER (0..32),
        startSymbolAndLength'       INTEGER (0..127),
        . . . .
        . . . .
    }
}
-- TAG-PUSCH-TIMEDOMAINRESOURCEALLOCATIONLIST-STOP
-- ASN1STOP
```

Fourth Exemplary Implementation

The following fourth exemplary implementation is conceived with the understanding that the indexed row of the RRC configured table comprises at least one fourth value related to the generation of the plurality of PUSCH transmissions. The at least one fourth value assists the user equipment when generating the plurality of PUSCH transmissions carrying the selected transport blocks of data.

In other words, the transmitter 420 of the user equipment 410 generates the plurality of PUSCH transmission carrying the selected transport blocks of data based on at least one fourth value related to the generation of the plurality of PUSCH transmissions. The at least one fourth value is also comprised in the indexed row of the RRC configured table.

One example of a fourth value is a different modulation and coding scheme, MCS, index value for each of the plurality of PUSCH transmissions excluding a first of the plurality of PUSCH transmissions. In other words, the indexed row of the RRC configured table comprises a different modulation and coding scheme, MCS, index value for each of the subsequent PUSCH transmissions.

In particular, the processor 430, 480 of the user equipment 410, or of the base station 460, configures this table in accordance with the parameters comprised in a PUSCH time domain resource allocation list IE.

An example of such a PUSCH time domain resource allocation list IE is reproduced herein below, namely as example 4-1. As the terminology may change in the future, this example shall be more broadly understood with regard to its functions and concepts of signaling the additional parameters comprised in a PUSCH time domain resource allocation list IE.

EXAMPLE 4-1:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
    k2                              INTEGER (0..32)             OPTIONAL,  --
Need S
    mappingType                     ENUMERATED {typeA, typeB},
    startSymbolAndLength            INTEGER (0..127),
    multiplePUSCHTransmissions      SEQUENCE {
        MCSindex                    INTEGER (0..32),
        . . . .
        . . . .
    }
}
-- TAG-PUSCH-TIMEDOMAINRESOURCEALLOCATIONLIST-STOP
-- ASN1STOP
```

With such a different MCS index value for each of the subsequent PUSCH transmission, the present disclosure facilitates a more accurate match of the MCS index to the condition of the channel for each transmission.

Another example of a fourth value is a same modulation and coding scheme, MCS, index value (e.g., with maximum robustness) for all of the plurality of PUSCH transmissions. In other words, the indexed row of the RRC configured table comprises a same modulation and coding scheme, MCS, index value for all of the plurality of PUSCH transmissions.

In particular, the processor 430, 480 of the user equipment 410, or of the base station 460, configures this table in accordance with the parameters comprised in a PUSCH time domain resource allocation list IE.

An example of such a PUSCH time domain resource allocation list IE is reproduced herein below, namely as example 4-2. As the terminology may change in the future, this example shall be more broadly understood with regard to its functions and concepts of signaling the additional parameters comprised in a PUSCH time domain resource allocation list IE.

---

EXAMPLE 4-2:
ASN.1 NOTATION OF "PUSCH-TIMEDOMAINRESOURCEALLOCATIONLIST IE"

---

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
   k2                              INTEGER (0..32)          OPTIONAL,   --
Need S
   mappingType                     ENUMERATED {typeA, typeB},
   startSymbolAndLength            INTEGER (0..127),
   multiplePUSCHTransmissions      SEQUENCE {
      MCSindex                     INTEGER (0..32),
      ....
      ....
   }
}
-- TAG-PUSCH-TIMEDOMAINRESOURCEALLOCATIONLIST-STOP
-- ASN1STOP
```

---

A further example of a fourth value is a different redundancy version, RV, offset value for each of the plurality of PUSCH transmissions excluding a first of the plurality of PUSCH transmissions. In other words, the indexed row of the RRC configured table comprises different redundancy version, RV, offset values for each of the subsequent PUSCH transmissions.

For example, let us assume that the DCI was received by the receiver 420 of the user equipment 410 with an RV field comprising the value of '1', then the transmitter 420 generates the first of the plurality of PUSCH transmissions with RV of value '1' which is determined by the RV field with value '1' of the DCI. Also the transmitter generates the subsequent of the plurality of PUSCH transmissions with a RV of value '1' adding from the indexed row of the RRC configured table the respective value RV offset for each of the subsequent PUSCH transmissions.

In particular, the processor 430, 480 of the user equipment 410, or of the base station 460, configures this table in accordance with the parameters comprised in a PUSCH time domain resource allocation list IE.

An example of such a PUSCH time domain resource allocation list IE is reproduced herein below, namely as example 4-3. As the terminology may change in the future, this example shall be more broadly understood with regard to its functions and concepts of signaling the additional parameters comprised in a PUSCH time domain resource allocation list IE.

---

EXAMPLE 4-3:
ASN.1 NOTATION OF "PUSCH-TIMEDOMAINRESOURCEALLOCATIONLIST IE"

---

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
   k2                              INTEGER (0..32)          OPTIONAL,   --
Need S
   mappingType                     ENUMERATED {typeA, typeB},
   startSymbolAndLength            INTEGER (0..127),
   multiplePUSCHTransmissions      SEQUENCE {
      RVoffset                     ENUMERATED (0..3),
      ....
      ....
   }
}
-- TAG-PUSCH-TIMEDOMAINRESOURCEALLOCATIONLIST-STOP
-- ASN1STOP
```

---

With such a different RV offset value for each of the subsequent PUSCH transmission, the present disclosure facilitates enabling more flexibility when scheduling different PUSCH transmissions. In other words, independent RV offsets are allowed for each PUSCH transmissions.

An even further example of a fourth value is a same redundancy version, RV, offset value for each of the plurality of PUSCH transmissions excluding a first of the plurality of PUSCH transmissions. In other words, the indexed row of the RRC configured table comprises a same redundancy version, RV, offset value for each of the subsequent PUSCH transmissions.

For example, let us assume that the DCI is received by the receiver 420 of the user equipment 410 with an RV field comprising the value of '1', then the transmitter 420 generates not only for the first but also the subsequent of the plurality of PUSCH transmissions with a RV value '1' adding from the indexed row of the RRC configured table the same value RV offset for all of the plurality of PUSCH transmissions.

In particular, the processor 430, 480 of the user equipment 410, or of the base station 460, configures this table in accordance with the parameters comprised in a PUSCH time domain resource allocation list IE.

An example of such a PUSCH time domain resource allocation list IE is reproduced herein below, namely as example 4-4. As the terminology may change in the future, this example shall be more broadly understood with regard to its functions and concepts of signaling the additional parameters comprised in a PUSCH time domain resource allocation list IE.

block size, TBS, is calculated for each of the plurality of PUSCH transmission separately, or whether a combined transport block size is calculated for all PUSCH transmissions.

For example, let us assume that the DCI is received by the receiver 420 of the user equipment 410 with a transport block size, TBS, for the plural PUSCH transmissions. Then the transmitter 420 needs to know whether this TBS is calculated for each of the PUSCH transmissions separately, or is calculated as a combined TBS for all PUSCH transmissions.

In the first case, the transmitter 420 generates PUSCH transmissions which each have the same TBS from the DCI. In the second case, the transmitter generates PUSCH transmissions which each have a TBS which corresponds to the combined TBS from the DCI divided by the total number of PUSCH transmissions. In both cases, the transmitter 420 adhering to principles prescribed by the at least one fifth parameter can generate the plural PUSCH transmissions.

Another example of a fifth parameter prescribing principles related to the generation of the plurality of PUSCH transmissions is a parameter indicating whether a modula-

EXAMPLE 4-4:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
  k2                              INTEGER (0..32)             OPTIONAL,   --
Need S
  mappingType                     ENUMERATED {typeA, typeB},
  startSymbolAndLength            INTEGER (0..127),
  RVoffset                        ENUMERATED {0..3},
  multiplePUSCHTransmissions      SEQUENCE {
    ....
    ....
  }
}
-- TAG-PUSCH-TIMEDOMAINRESOURCEALLOCATIONLIST-STOP
-- ASN1STOP
```

Fifth Exemplary Implementation

The following fifth exemplary implementation is conceived with the understanding that the indexed row of the RRC configured table comprises at least one fifth parameter related to the generation of the plurality of PUSCH transmissions. The at least one fifth parameter assists the user equipment when generating the plurality of PUSCH transmissions carrying the selected transport blocks of data.

The at least one fifth parameter related to the generation of the plurality of PUSCH transmissions is additionally comprised in the PUSCH time domain resource allocation list IE which defines the table that is created by the processor 430, 480 of the user equipment 410, or of the base station 460.

In other words, the transmitter 420 of the user equipment 410 generates the plurality of PUSCH transmission carrying the selected transport blocks of data adhering to principles prescribed by the at least one fifth parameter related to the generation of the plurality of PUSCH transmissions. The at least one fifth parameter is also comprised in the indexed row of the RRC configured table.

One example of a fifth parameter prescribing principles related to the generation of the plurality of PUSCH transmissions is a parameter indicating whether the transport tion and coding scheme, MCS, index is determined for each of the plurality of PUSCH transmission separately, or whether the same MCS index is determined for all PUSCH transmissions.

In other words, with this parameter indicating the determination principle of the modulation and coding scheme, MCS, index the transmitter 420 generates the subsequent PUSCH transmissions either by following the same MCS as the first transmission or calculates the MCS for each subsequent transmission based on transport block size and the available resources for each of the subsequent transmission.

When it is indicated to use same MCS for each transmission, then the length of each transmission could possibly be different if the TB size is different. In this case, the transmitter determines the MCS following the same principles as for the first PUSCH transmission.

When the MCS needs to be determined for each subsequent PUSCH transmission after the first PUSCH transmission, then depending on the TB size and resource, the closest MCS value is calculated compared to that of first transmission.

An example of such a PUSCH time domain resource allocation list IE with a parameter indicating the determination principle of the modulation and coding scheme, MCS, index is reproduced herein below, namely as example 5. As the terminology may change in the future, this example shall be more broadly understood with regard to its functions and concepts of signaling the additional parameters comprised in a PUSCH time domain resource allocation list IE.

EXAMPLE 5:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
   k2                              INTEGER (0..32)              OPTIONAL,   --
Need S
     mappingType                   ENUMERATED {typeA, typeB},
     startSymbolAndLength          INTEGER (0..127),
     MCSdetermination              ENUMERATED {Same, Calculate},
     multiplePUSCHTransmissions    SEQUENCE {
       . . . .
       . . . .
   }
}
-- TAG-PUSCH-TIMEDOMAINRESOURCEALLOCATIONLIST-STOP
-- ASN1STOP
```

A further example of a fifth parameter prescribing principles related to the generation of the plurality of PUSCH transmissions is a parameter indicating whether or not a same redundancy version, RV, is determined for all of the plurality of PUSCH transmissions based on a RV field in the received DCI.

Alternatively, no additional parameter may be introduced to indicate the RV for the subsequent PUSCH transmissions of the plurality of PUSCH transmissions. Then the transmitter 420 of the user equipment 410 re-uses the same RV as for the first PUSCH transmission which is explicitly determined by the RV field of the DCI received by the receiver 420.

An even further example of a fifth parameter prescribing principles related to the generation of the plurality of PUSCH transmissions is a parameter indicating whether or not demodulation reference symbols, DMRS, are present in at least a first or in all of the plurality of PUSCH transmission.

Comprehensive Example of First Generic Uplink Scenario

Figure 8:
FIGS. 8-9 show a schematic illustration of a RRC configured table for plural PUSCH transmissions and corresponding time domain resource allocations for plural PUSCH transmissions.
Figure 9:
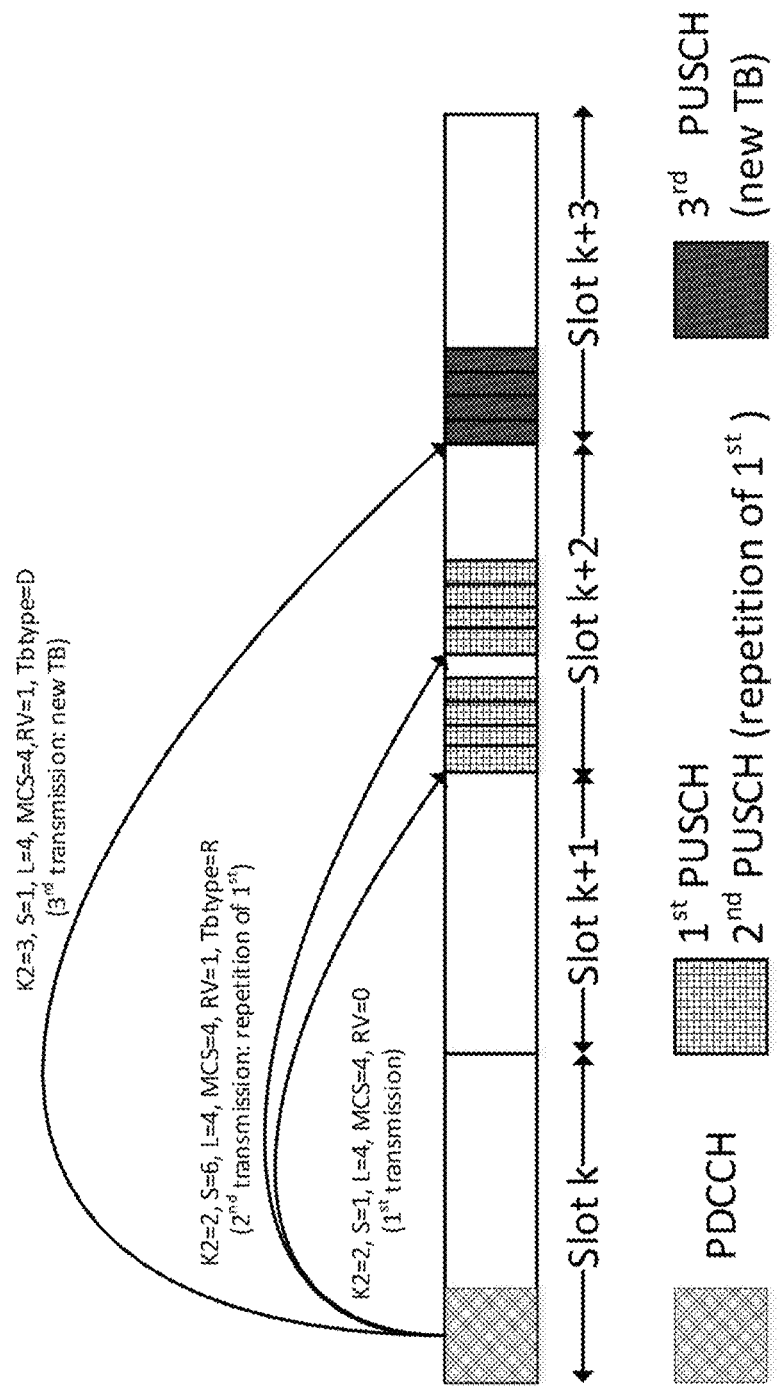

Referring now to FIGS. 8 and 9, a comprehensive example is given which combines the effects discussed for the first generic scenario with those of the numerous exemplary implementations. This example shall, however, not be understood as a restriction to the present disclosure since alternative combinations are also conceivable.

In particular, this example is presented in form of a RRC configured table for plural PUSCH transmissions and corresponding time domain resource allocations for plural PUSCH transmissions.

The RRC configured table is, also in this example, configured by the processor 430 of the user equipment 410, namely in accordance with the parameters comprised in a PUSCH time domain resource allocation list IE. This has been described before. Rather, focus is laid with this description on explaining how the processor 430 and the transmitter 420 jointly operate, with the help of the RRC configured table, to cause the plural PUSCH transmissions.

In this table as shown in FIG. 8, numerous values/parameters are combined which are referenced as first set of values, second parameters, third set of values, fourth values, and fifth parameters. The numbers do not follow any particular reason, e.g., they do not distinguish the level of importance, and also do not characterize the sequence of usage. Rather, they are given as a unique reference leading to a clear separation thereof.

For example, the value $K_2$ cannot be confused with the value $K_2'$ since the former value is included in (and belongs to) the first set of values whereas the latter value is included in (and belongs to) the third set of values. Nevertheless, the numerous values/parameters have been grouped functionally such that they are related to similar operations to be performed by processor 430 and transmitter 430 before the plural PUSCH transmissions are caused.

In the example, it is assumed that the processor 430 has configured a table which is defined by a PUSCH time domain allocation resource list IE as shown in FIG. 8 and the receiver has received a DCI scheduling in total three PUSCH transmissions, and carrying a time-domain resource assignment filed with value m of 2, thereby providing a row index m+1 of 3 to the table.

The scheduled three PUSCH transmissions can be individually referenced as PUSCH transmission #1, #2 and #3 or can be understood as a first PUSCH transmission (#1) and subsequent PUSCH transmissions (#2 and #3).

For determining the allocated time-domain resources for the first PUSCH transmission (#1), the processor 430 reverts to the first set of parameters in the indexed row with row index 3 of the RRC configured table.

From the value indicating the PUSCH mapping type, the processor 430 infers that the PUSCH mapping type is type b, meaning that resource allocations may start within the slot and are not necessarily starting at the beginning of the slot. This type b is not only applicable to the first but also to the subsequent PUSCH transmissions.

Further, from the value $K_2$, the processor 430 infers that allocated time-domain resources for the first PUSCH transmission are included in the slot with slot number k+2. Additionally, from the values S and L the processor 430 infers that the allocated resources for the initial PUSCH transmission start in the slot with slot number k+2 at the symbol with symbol number 1 and have a length of 4 symbols.

For determining the allocated time-domain resource for the subsequent PUSCH transmissions (#2 and #3), the processor 430 reverts to the third set of parameters in the indexed row with row index 3

From the value $K_2'$ the processor 430 infers that the allocated time-domain resources for the subsequent PUSCH transmission #2 and #3 are included in slots relative to the value k corresponding to the slot index carrying the received DCI.

Thus, the allocated time-domain resources for the subsequent PUSCH transmission #2 and #3 are included in the slots with slot numbers k+2 and k+3, respectively. Additionally two values S' and two values L' are comprised indicating that the allocated resources for subsequent PUSCH transmission #2 and #3 start in the respective slot with slot number k+2 and k+3 at the symbol with symbol numbers 6 and 1, respectively. The respective resource allocations in time domain are also shown.

For selecting the transport blocks of data to transmit in the scheduled PUSCH transmissions, the processor 430 reverts to the second parameters in the indexed row with row index 3 of the RRC configured table.

From the values {R,D} included as second parameters in the table, the processor 430 infers whether the subsequent PUSCH transmissions #2 and #3 are either different PUSCH transmissions or repeated PUSCH transmissions.

For the subsequent PUSCH transmission #2, the second parameter with value R, meaning a repetition of the preceding PUSCH transmission, indicates that the same transport block of data is to be selected which is repeating that of the preceding PUSCH transmission #1. For the subsequent PUSCH transmission #3, the second parameter with value D, meaning a difference over the preceding PUSCH transmission, indicates that a new transport block of data is to be selected which is different from that of the preceding PUSCH transmission #2.

In other words, the second parameters define the repetition or difference for a subsequent PUSCH transmission with respect to the preceding PUSCH transmission.

For more efficient selection of the transport blocks of data, the processor 430 reverts to the TBS determination parameter of the fifth parameters in the indexed row with row index 3 of the RRC configured table.

From the TBS determination parameter with value C, meaning a calculated TBS determination, the processor 430 infers that the transport block size is to be calculated for each of the PUSCH transmissions separately. This calculation requires further information to be obtained by the processor 430.

In particular, the processor 430 additionally reverts to the MCS determination parameter of the fifth parameters also in the indexed row with row index 3 of the RRC configured table.

From the MCS determination parameter with value S, meaning a same MCS determination, the processor 430 infers that the same modulation and coding scheme, MCS, index is determined for all PUSCH transmissions. In this regard, the processor 430 determines that the transmitter 420 can generate the first as well as the subsequent PUSCH transmissions #1, #2 and #3 with a same MCS corresponding to the MCS field in the scheduling DCI.

For the actual (MCS) MCS index to be used, the transmitter 420 reverts to MCS field in the scheduling DCI and to the MCS index value of the fourth values also included in the indexed row of the RRC configured table.

In more particular, the transmitter 420 reverts to the indexed row of the RRC configured table and checks if the MCS index value is among the fourth values included in same table. Here the transmitter 420 finds the MCS index value of 4. Having found a MCS index value and knowing that a same MCS value is to be used for all of the PUSCH transmissions #1, #2 and #3, the transmitter uses this MCS index value of 4 when generating the PUSCH transmissions instead of referring to the MCS field in the scheduling DCI.

That said, the processor 430 is now also capable of calculating the TBS for each of the plural PUSCH transmission separately.

In particular, the processor 430 determines from the fact that all PUSCH transmissions have a same length of symbols (L=4), and from the fact that all PUSCH transmissions are to be generated with a same MCS that the transport block size, TBS, for each of the PUSCH transmissions is also calculated same. In other words, despite the MCS determining parameter indicating a separate calculation of the MCS, the processor 430 infers from the same amount of time-domain resources (all PUSCH have a same length of L=4) and from the same MCS that the separate calculation will result in a same TBS for all PUSCH transmissions #1, #2 and #3.

For the actual TBS values to be used, the transmitter 420 reverts to the TBS value included in the DCI scheduling the plural PUSCH transmissions and calculates each TBS value by divides the TBS value from the DCI by the total number of PUSCH.

Further, from the RV parameter N of the fifth parameters, meaning not a same RV index, the processor 430 infers that the redundancy version, RV, index to be used when generating all of the PUSCH transmissions is not same for all the PUSCH transmissions. Since it is not same, the transmitter 420 reverts to the fourth parameters, namely to the RV offset value, and uses this RV offset value to determine the RV indices for the subsequent PUSCH transmissions. Due to the For the actual RV to be used, the transmitter 420 reverts to the RV field included in the DCI scheduling the plural PUSCH transmissions and reverts to the RV offset value of the fourth values included in the indexed row of the RRC configured table.

In more particular, the transmitter 420 when generating the PUSCH transmissions, determines the RV of 0 for the first PUSCH transmission #1 based on the RV field of the DCI, and determines the RV of 1 for the subsequent PUSCH transmissions #2 and #3 based on the RV field of the DCI adding the RV offset of 1 corresponding to the fourth parameter in the indexed row with row index 3 of the RRC configured table.

Finally, the processor 430 reverts to the DMRS parameter of the fifth parameters included in the indexed row of the table and from the DRMS parameter F, meaning only first DMRS, infers that demodulation reference symbols, DMRS, are present only in a first of the plurality of PUSCH transmission.

Finally the PUSCH transmissions #1, #2 and #3 are being generated and then the PUSCH transmitter transmits same using the allocate time-domain resources. This is shown in FIG. 9

Second Generic Uplink Scenario

FIGS. 10 and 11 depict another exemplary implementations according to a second generic scenario of the building blocks of the user equipment 410 and of the base station 460, respectively. The user equipment 410 of the exemplary implementation comprises a PUSCH config IE receiver 1020-*a*, a table configuring processing circuitry 1030-*a*, a DCI receiver 1020-*b*, a configured grant config IE receiver 1020-*c*, an allocated resources determining processing circuitry 1030-*b*, and a PUSCH transmitter 1020-*d*.

Similarly, the base station 460 of the exemplary implementation comprises a PUSCH config IE transmitter 1170-*a*, a table configuring processing circuitry 1180-*a*, a DCI transmitter 1170-*b*, a configured grant config IE transmitter 1170-*c*, a resource allocating processing circuitry 1180-*b*, and PUSCH receiver 1170-*d*.

In general, the present disclosure assumes that the user equipment 410 is in communication reach of the base station 460 and is configured with at least one bandwidth part in the downlink and at least one bandwidth part in the uplink. The bandwidth parts are located within the carrier bandwidth served by the base station 460.

Further, the present disclosure assumes that the user equipment 410 is operating in a radio resource control, RRC, connected state (termed: RRC_CONNECTED), thereby capable of receiving in the downlink data and/or control signals from the base station 460 and capable of transmitting in the uplink data and/or control signals to the base station 460.

Before performing PUSCH repetitions as suggested in the present disclosure, the user equipment 410 receives control messages as defined in the radio resource control, RRC, and the medium access control, MAC, protocol layer. In other words, the user equipment 410 employs signaling mechanism which is readily available in the different protocol layers of the various communication technologies.

In general, a substantial difference is made between control messages defined in RRC and those defined in MAC. This difference becomes already aware from the fact that RRC control messages are usually used for configuration of radio resources (e.g., radio link) on a semi-static basis whereas MAC control messages are used for dynamically defining each medium access (e.g., transmission) separately. From this, it directly follows that RRC control occurs less frequently than MAC control.

Accordingly, an excessive MAC control signaling overhead can substantially impair the communication system performance whereas the RRC control message have been treated more leniently in standardization. In other words, MAC control signaling overhead is a well-recognized constraint to the system performance.

For this reason the conventional mechanisms of PUSCH repetitions relies on pre-specified (e.g., in the relevant standard fixedly prescribed) timing relations between the initial PUSCH transmission and the repetitions thereof. In other words, the risk of an impaired system performance was found to outbalance the benefits from a more flexible use of PUSCH repetitions.

Considering the above, the authors of the present disclosure propose a mechanism which overcomes the disadvantages of conventional mechanisms and permits flexible transport block (TB) repetitions, while—at a same time— avoiding signaling overhead.

In the context of the disclosure, the term "transport block" is to be understood as data unit of an uplink and/or downlink transmission. For example, it is widely understood that the term "transport block" is equivalent to a MAC layer packed data unit, PDU. Thus, the transmission of transport block is equally understood as a physical uplink shared channel (PUSCH) and/or physical downlink shared channel (PDSCH) transmission.

Particularly, since PUSCH and/or PDSCH transmissions generally carry payload, the present disclosure shall refer to PUSCH and/or PDSCH transmissions carrying a MAC PDU. In other words, the terms "PUSCH and/or PDSCH transmissions" shall be understood as describing MAC PDU transmission on PUSCH and/or PDSCH.

Figure 12:
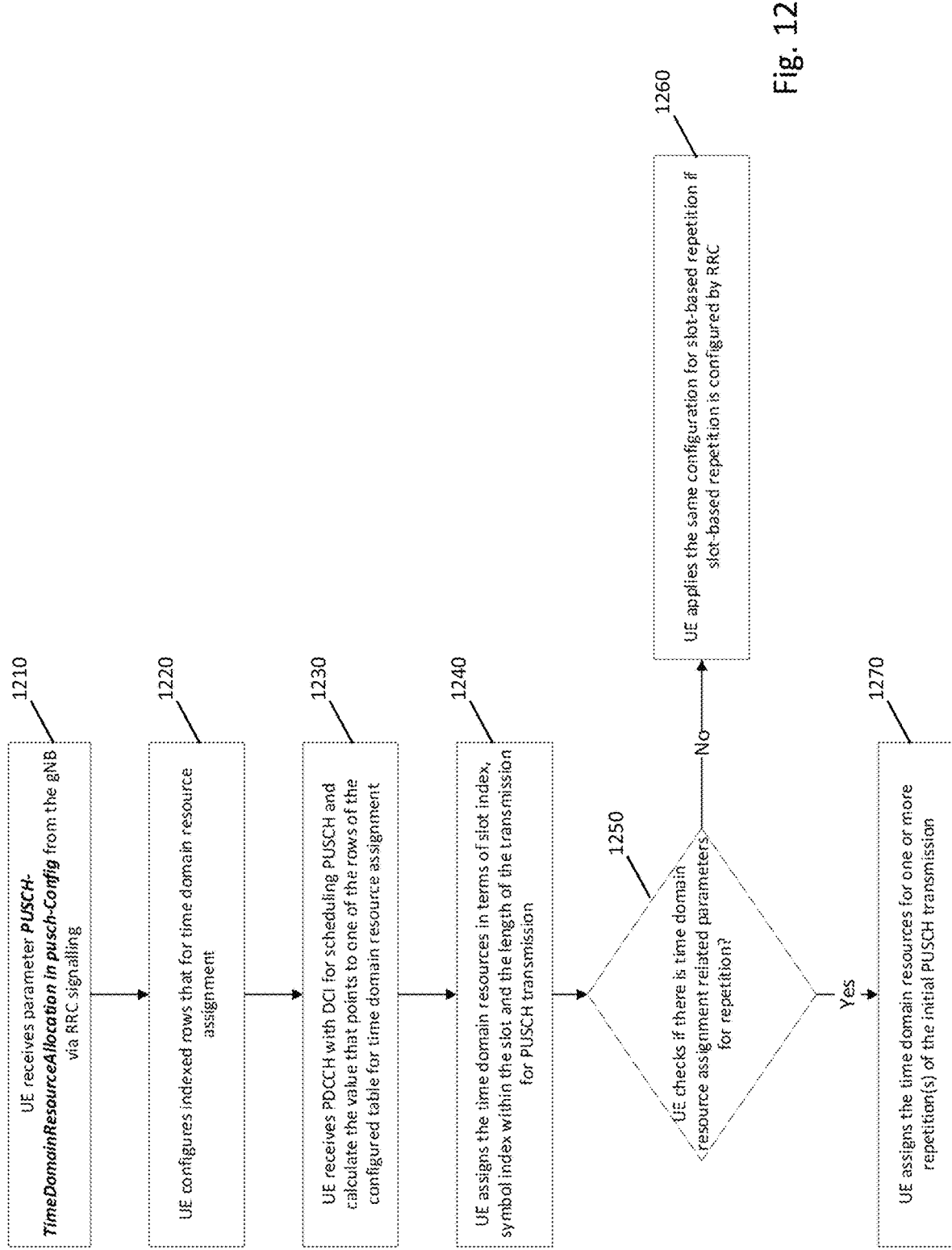
FIG. 12 illustrates a sequence diagram of a user equipment performing PUSCH repetitions according to an exemplary mechanism.

Referring to FIG. 12, a generic scenario is described with regard to performing PUSCH repetitions based on a dynamic grant, namely a DCI carrying a time-domain resource assignment filed, such as, for example, a DCI of DCI format 0-0 or of DCI format 0-1.

This description shall, however, not be understood as a restriction to the present disclosure to only extend to PUSCH transmissions, more specifically to repetitions thereof. Rather, it will become apparent that the concepts disclosed herein can equally be applied to downlink transmissions The receiver 420 of the user equipment 410 receives (see e.g., step 1210—FIG. 12) a physical uplink shared channel, PUSCH, config information element, IE. This PUSCH config IE is received in form of radio resource control, RRC, signaling and applicable to a particular bandwidth part. The PUSCH config IE is received from the base station 410 serving the particular bandwidth part. For example, this reception operation may be performed by the PUSCH config IE receiver 1020-*a* of FIG. 10.

The PUSCH config IE carries among others a list of parameters in form of an information element (IE) termed "PUSCH-TimeDomainResourceAllocationList," wherein each parameter of the list of parameters is termed "PUSCH-TimeDomainResourceAllocation."

Then, the processor 430 of the user equipment 410 configures (see, e.g., step 1220—FIG. 12) a table which is defined by the PUSCH time domain resource allocation list IE carried in the received PUSCH config IE. The table comprises rows, each with a value indicating a PUSCH mapping type, a value $K_2$ indicating a slot offsets, and a value SLIV indicating a start and length indicator. For example, this configuration operation may be performed by the table configuring processing circuitry 1030-*a* of FIG. 10.

In an exemplary implementation, each row of the RRC configure table corresponds to one of plural parameters termed "PUSCH-TimeDomainResourceAllocation" of the list of parameters termed "PUSCH-TimeDomainResourceAllocationList." This shall, however, not be understood as a limitation to the present disclosure, as apparent from the following alternative.

Also scenarios different from the exemplary implementation are conceivable, namely where some rows of the configured table correspond to respective parameters comprised in the IE with the list of parameters, and other rows are configured complying with a set of pre-specified rules readily applying the principles laid out PUSCH time domain resource allocation list IE.

This shall, however, not distract from the fact that the RRC configured table in its entirety is defined by the PUSCH time domain resource allocation list IE.

Subsequently, the receiver 420 of the user equipment 410 receives (see, e.g., step 1230—FIG. 12) downlink control information, DCI, signaling. The DCI is carrying a time-domain resource assignment filed with value m, wherein the value m provides a row index m+1 to the configured table. For example, this reception operation may be performed by the DCI receiver 1020-*b* of FIG. 10.

In the context of the present disclosure, this DCI is carrying an uplink grant since it serves the purpose of triggering PUSCH repetitions. In this respect, the received DCI is in DCI format 0-0 or in DCI format 0-1. In this respect, the described scenario refers to situation where the PUSCH repetitions are scheduled by a dynamic grant.

This shall, however, not be understood as limitation to the present disclosure, as the concepts disclosed herein are equally applicable to a configure grant or grant free scheduling technique. A detailed description of this grant free scheduling technique is given as an alternative to the mechanism depicted in FIG. 12.

Subsequently, the processor 430 of the user equipment 410 determines allocated resources for an initial PUSCH transmission and also allocated resources for at least one repetition of the initial PUSCH transmission. For sake of clarity and brevity, the following description focusses on the allocation of resources in time domain. For example, this determination operation may be performed by the allocated resources determining processing circuitry 1030-*b* of FIG. 10.

The resources to be used by the user equipment 410 for the initial PUSCH transmission and the repetition(s) thereof have been previously allocated by the base station 460. In this context, the processor 430 accordingly determines which of the previously allocated resource it shall use for the PUSCH transmission and the repetition(s) thereof.

As part of this determination operation, the processor 430 at first determines (see, e.g., step 1240—FIG. 12) the allocated resources for the initial PUSCH transmission based on: (i) index of a slot carrying the received DCI, and (ii) the value $K_2$ indicating the slot offsets, and (iii) the value SLIV indicating the start and length indicator comprised in indexed row of the RRC configured table. This implies that the processor 430 has previously determined that the value indicating the PUSCH mapping type indicates a type B mapping.

For example, let us assume the received DCI was carried in a slot which has the number k, and further the DCI has a time-domain resource assignment filed with value m. Then, the processor, for the initial PUSCH transmission, reverts to the RRC configured table in row with row index m+1 and uses the respective values $K_2$ indicating the slot offsets, and SLIV indicating the start and length indicator. With these value, the processor determines that the allocated resources, for the initial PUSCH transmission, are included in a slot with a number of $k+K_2$, and have a start and length in terms of symbols of this slot corresponding to the value SLIV.

When determining the allocated resources, the processor 430 also uses the value indicating the PUSCH mapping type additionally comprised in the row of the RRC configured table with row index m+1. Particularly, in case the value indicates a type A PUSCH mapping, the processor 430 only uses the length of the value SLIV indicating a start and length indicator. In case the value indicates a type B PUSCH mapping, the processor 430 uses both the start and the length of the value SLIV indicating the start and length indicator.

As part of this determination operation, the processor 430 then determines allocated resources for the at least one repetition of the initial PUSCH transmission. For this, the processor 430 checks (see, e.g., step 1250—FIG. 12) if there is an (explicit) time domain resource assignment related to parameters (e.g., the timing) for the repetition. For this, the processor 430 reverts to the row with row index m+1 and checks whether or not this row comprises additional values (e.g., at least one value) which are specifying the allocated resource in time domain for the at least one repetition of the initial PUSCH transmission.

In case the check is negative, the processor 430 uses (see, e.g., step 1260—FIG. 12) a conventional slot-based repetition mechanism for the repetition of the initial PUSCH transmission. In other words, the processor 430 relies on pre-specified (e.g., in the relevant standard fixedly pre-scribed) timing relations between the initial PUSCH transmission and the repetitions thereof. For example, this results in an initial PUSCH transmission and each repetition starting at a same symbol and having a same symbol length of plural consecutive slots.

Referring back to the example, the processor 430, for the at least one repetition, reverts to the row with row index m+1 of the RRC configured table, and determines that the allocated resources, for the first repetition of the initial PUSCH transmission, are included in a slot with number $k+K_2+1$ (where 1 is a pre-defined constant fixed by standardization), and have a start and length in terms of symbols of this slot corresponding to the same value SLIV.

Should there be a second repetition, the processor 430 that the allocated resources, for the second repetition of the initial PUSCH transmission, are included in a slot with number $k+K_2+2$ (where 2 is again a pre-defined constant fixed by standardization), and have a start and length in terms of symbols of this slot corresponding to the same value SLIV as already the initial PUSCH transmission and the first repetition thereof. Further repetitions follow at contiguous slots.

Further to this example, when assuming that the PUSCH mapping type indicted in the row with row index m+1 is type B, and when assuming that the value SLIV indicates a start at symbol 4 and a length of 4 symbols, then the processor 430 determines that each one of the initial, the first repetition and the second repetition of the PUSCH transmission have resources corresponding to symbol 4, symbol 5, symbol 6 and symbol 7 in the slots with number $k+K_2$, number $k+K_2+1$, number $k+K_2+2$, respectively.

Evidently, these allocated resources as determined by the processor 430 cannot be flexibly configured. This is overcome by the alternative determination by the processor 430.

In case the check is positive, the processor 430 uses (see, e.g., step 1270—FIG. 12) the additional values (e.g., at least one value) comprised in the indexed row of the RRC configure table for determining allocated resources for the repetition of the initial PUSCH transmission. In other words, the comprised at least one additional value is specifying the allocated resource in time domain for the repetition of the initial PUSCH transmission.

It shall be emphasized in this context that the at least one additional value is comprised in a row of the RRC configured table which is defined by the PUSCH time domain resource allocation list IE. In other words, since the (entire) RRC configure table is defined by the PUSCH time domain resource allocation list IE, then also the at least one additional value comprised therein is defined by the PUSCH time domain resource allocation list IE.

To meet this constrains, the at least one additional value could be (directly) prescribed by a parameter comprised in the PUSCH time domain resource allocation list IE, or alternatively the at least one additional value could be (indirectly) inferred from related parameters comprised in the PUSCH time domain resource allocation list IE. In any case, the at least one additional value specifies in time domain the repetition of the initial PUSCH transmission.

It is important to realize that the processor 430 of the user equipment 410 uses additional values from the indexed row of the RRC configured table for determining the allocated resources for the repetitions. This approach substantially differs from the conventional slot-based repetition mechanism for the following reasons:

Firstly, the at least one additional value comes from a row of the RRC configured table which is (actively) indexed by the row index m+1 derived from value m in the time-domain resource assignment field of the received DCI. In this respect, a varying index values m in the in the time-domain resource assignment field of the received DCI permit a varying at least one additional values to be used for determining the allocated resources for the at least one repetition of the initial PUSCH transmission. Thereby, the flexibility of such allocated resources is increased.

Secondly, the at least one additional value comes from a (same) row of the RRC configured table which is (already) indexed by the row index m+1 derived from value m in the time-domain resource assignment field of the received DCI. In this respect, no additional index value is required than then index value m in the in the time-domain resource assignment field of the received DCI when determining the allocated resources for the repetition of the at least one repetition of the initial PUSCH transmission. Thereby, any additional signaling overhead is avoided.

Consequently, this permits increasing flexibility while avoiding signaling overhead, namely by the processor 430 of the user equipment 410 using the at least one additional value from the indexed row of the RRC configured table for determining the allocated resources for the repetitions.

Finally, the transmitter 420 of the user equipment 410 transmits (not depicted in FIG. 12) a PUSCH transmission using the respectively determined allocated resources for the initial PUSCH transmission and for the at least one repetition thereof. For example, this transmission operation may be performed by the PUSCH transmitter 520-e of FIG. 5.

The above description has been given from the perspective of the user equipment 410. This shall, however, not be understood as a limitation to the present disclosure. The base station 460 equally performs the generic scenario disclosed herein.

The transmitter 470 of the base station 460 transmits a physical uplink shared channel, PUSCH, config information element, IE, in form of radio resource control, RRC, signaling. The PUSCH config IE being applicable to a particular bandwidth part. For example, this transmission operation may be performed by the PUSCH config IE transmitter 1170-a of FIG. 11.

Then, the processor 480 of the base station 460 configures a table which is defined by a PUSCH time domain resource allocation list IE carried in the received PUSCH config IE. The RRC configured table comprises rows, each with a value indicating a PUSCH mapping type, a value $K_2$ indicating a slot offsets, and a value SLIV indicating a start and length indicator. For example, this configuration operation may be performed by the table configuring processing circuitry 1180-a of FIG. 11.

Subsequently, the transmitter 470 of the base station 460 transmits downlink control information, DCI, signaling carrying a time-domain resource assignment filed with value m, wherein the value m provides a row index m+1 to the RRC configured table. For example, this transmission operation may be performed by the DCI transmitter 1170-b of FIG. 11.

The processor 480 of the base station 460 allocates resources for an initial PUSCH transmission and allocates resources for at least one repetition thereof based on: (i) index of a slot carrying the transmitted DCI, and (ii) the value $K_2$ indicating the slot offsets, and (iii) the value SLIV indicating the start and length indicator comprised in indexed row of the RRC configured table.

In particular, the determination of allocated resources is based on at least one additional value comprised in the indexed row of the RRC configured table which is specifying the allocated resources in time domain for the at least one repetition of the initial PUSCH transmission. For example, this resource allocation operation may be performed by the resource allocating processing circuitry 1180-b of FIG. 11.

Finally, a receiver 470 of the base station 460 receives a PUSCH transmission using the respectively allocated resources for the initial PUSCH transmission and for the at least one repetition thereof. For example, this reception operation may be performed by the PUSCH receiver 1170-d of FIG. 11.

Now, a generic scenario is described with regard to performing PUSCH repetitions based on a configured grant (or grant free), namely a configured grant config IE received in form of RRC signaling, and also comprising a PUSCH time domain resource allocation list IE.

The receiver 420 of the user equipment 410 receives a physical uplink shared channel, PUSCH, config information element, IE, in form of radio resource control, RRC, signaling. The PUSCH config IE is applicable to a particular bandwidth part. The PUSCH config IE is received from the base station 460 serving the particular bandwidth part. For example, the reception operation may be performed by the PUSCH config IE receiver 1020-a of FIG. 10.

Then, the processor 430 of the user equipment 410 configures a table which is defined by a PUSCH time domain resource allocation list IE carried in the received PUSCH config IE. The RRC configured table comprises rows, each with a value indicating a PUSCH mapping type, a value $K_2$ indicating a slot offset, and a value SLIV indicating a start and length indicator. For example, this configuration operation may be performed by the table configuring processing circuitry 1030-a of FIG. 10.

Subsequently, the receiver 420 of the user equipment 410 receives a configured grant config IE in form of RRC signaling carrying a time domain allocation filed with value m, wherein the value m provides a row index m+1 to the configured table. For example, this reception operation may be performed by the configured grant config IE receiver 1020-c of FIG. 10.

The processor 430 of the user equipment 410 determines allocated resources for an initial PUSCH transmission and allocated resources for at least one repetition thereof based on: (i) a value of time domain offset field additionally carried in the received configured grant config IE and associated with the time domain allocation filed, and (ii) the value $K_2$ indicating the slot offsets, and (iii) the value SLIV indicating the start and length indicator comprised in indexed row of the RRC configured table.

In particular, the determination of allocated resources is based on at least one additional value comprised in the indexed row of the RRC configured table which is specifying the allocated resources in time domain for the at least one repetition of the initial PUSCH transmission. For example, this determination operation may be performed by the allocated resources determining processing circuitry 1030-b of FIG. 10.

Finally, the transmitter 420 of the user equipment 410 transmits a PUSCH transmission using the respectively determined allocated resources for the initial PUSCH transmission and for the at least one repetition thereof. For example, this transmission operation may be performed by the PUSCH transmitter 1030-d of FIG. 10.

The above description has been given from the perspective of the user equipment 410. This shall, however, not be understood as a limitation to the present disclosure. The base station 460 equally performs the generic scenario disclosed herein.

The transmitter 470 of the base station 460 transmits a physical uplink shared channel, PUSCH, config information element, IE, in form of radio resource control, RRC, signaling, the PUSCH config IE being applicable to a particular bandwidth part. For example, this transmission operation may be performed by the PUSCH config IE transmitter 1170-a of FIG. 11.

Then, the processor 480 of the base station 460 configures a table which is defined by a PUSCH time domain resource allocation list IE carried in the received PUSCH config IE. The RRC configured table comprises rows, each with a value indicating a PUSCH mapping type, a value $K_2$ indicating a slot offsets, and a value SLIV indicating a start and length indicator. For example, this configuration operation may be performed by the table configuring processing circuitry 1180-a of FIG. 11.

Subsequently, the transmitter 470 of the base station 460 transmits a configured grant config IE in form of RRC signaling carrying a time domain allocation filed with value m, wherein the value m provides a row index m+1 to the RRC configured table. For example, this transmission operation may be performed by the configured grant config IE transmitter 1170-c of FIG. 11.

The processor 480 of the base station 460 allocates resources for an initial PUSCH transmission and allocates resources for at least one repetition thereof based on: (i) a value of time domain offset field additionally carried in the received configured grant config IE and associated with the time domain allocation filed, and (ii) the value $K_2$ indicating the slot offsets, and (iii) the value SLIV indicating the start and length indicator comprised in indexed row of the RRC configured table.

In particular, the determination of allocated resources is based on at least one additional value comprised in the indexed row of the RRC configured table which is specifying the allocated resources in time domain for the at least one repetition of the initial PUSCH transmission. For example, this resource allocation operation may be performed by the resource allocating processing circuitry 1180-b of FIG. 11.

Finally, the receiver 470 of the base station 460 receives a PUSCH transmission using the respectively determined allocated resources for the initial PUSCH transmission and for the at least one repetition thereof. For example, this reception operation may be performed by the PUSCH receiver 1170-d of FIG. 11.

Generic Scenario for Downlink

As already mentioned above, the present disclosure is not limited to transport block (TB) repetitions in the uplink but can equally be applied to downlink transmissions, namely to achieve a flexible support of repetitions in the downlink. Also here, transport block (TB) repetitions are supported with flexible timings which do not create additional signaling overhead.

In other words, the benefit of an improved flexibility when scheduling transport block repetitions are not only achievable for physical uplink shared channel (PUSCH) transmissions, but are equally achievable for physical downlink shared channel (PDSCH) transmissions. This directly follows from the high degree of similarity between the PUSCH-Time Domain Resource Allocation List information element (IE), and the PDSCH-Time Domain Resource Allocation List IE.

Also, no additional signaling overhead is created since the scheduling described henceforth relies on the PDSCH-Time Domain resource allocation field in DCI Format 1-0 or 1-1, which is highly similar to the on the PUSCH-Time Domain Resource Allocation field in DCI format 0-0 or 0-1 discussed before.

In general, the receiver 420 of the user equipment 410 receives a physical downlink shared channel, PDSCH, config information element, IE, in form of radio resource control, RRC, signaling. The PDSCH config IE is applicable to a particular bandwidth part which is served by the base station 460.

Then, the processor 430 of the user equipment 410 configures a table which is defined by a PDSCH time domain resource allocation list IE carried in the received PDSCH config IE. The RRC configured table comprising rows, each with a value indicating a PDSCH mapping type, a value $K_2$ indicating a slot offsets, and a value SLIV indicating a start and length indicator.

Subsequently, the receiver 420 of the user equipment 410 receives downlink control information, DCI, signaling carrying a time-domain resource assignment filed with value m, wherein the value m provides a row index m+1 to the RRC configured table.

The processor 430 of the user equipment 410 determines allocated resources for an initial PDSCH transmission and allocated resources for at least one repetition thereof based on: (i) index of a slot carrying the received DCI, and (ii) the value $K_2$ indicating the slot offsets, and (iii) the value SLIV indicating the start and length indicator comprised in indexed row of the RRC configured table.

In particular, the determination of allocated resources is based on at least one additional value comprised in the indexed row of the RRC configured table which is specifying the allocated resources in time domain for the at least one repetition of the initial PDSCH transmission.

Finally, the receiver 420 of the user equipment 410 receives a PDSCH transmission using the respectively determined allocated resources for the initial PDSCH transmission and for the at least one repetition thereof.

Sixth Exemplary Implementation

The following sixth exemplary implementation is conceived with the understanding that the at least one additional value, comprised in the indexed row of the RRC configured table, is at least one of a value $K_2'$ indicating a second slot offset for the at least one repetition, a value SLIV' indicating a second start and length indicator value for the at least one repetition, and optionally a value indicating the number of the at least one repetition.

In particular, the second start and length indicator value SLIV' comprises: a value S' indicating a symbol number specifying the start of the allocated resources for the at least one repetition, and a value L' indicating a number of symbols specifying the length of the allocated resources for the at least one repetition.

With this understanding, the RRC configured table comprises not only values which are specifying allocated resources for the initial PUSCH transmission. Rather the RRC configured table comprises additional values $K_2'$ and/or SLIV' which are specifying allocated resources for the repetition of the initial PUSCH transmission. In addition, the optional additional value indicating the number of the least one repetition further complements the RRC configured table in that it permits a more flexible determination as to which of the specified allocated resource are to be used for repetitions.

In particular, in the sixth exemplary implementation, the RRC configured table comprises rows, each with a value indicating a PUSCH mapping type, a value $K_2$ indicating a slot offsets for the initial PUSCH transmission, a value SLIV indicating a start and length indicator for the initial PUSCH transmission, as additional values, a value $K_2'$ indicating a second slot offset for the at least one repetition, a value SLIV' indicating a second start and length indicator value for the at least one repetition.

An example of such a RRC configured table is reproduced herein below, namely as Table 1:

TABLE 1

| DCI Row index | PUSCH mapping type | K2 | S | L | {K2'}, {S'}, {L'} |
|---|---|---|---|---|---|
| 1 | Type A | K2_1 | S_1 | L_1 | {K2'_1_1, K2'_1_2, ... K2'_1_n}, {S2'_1_1, S2'_1_2, ... S2'_1_n}, {L2'_1_1, L2'_1_2, ... L2'_1_n} |
| 2 | Type B | K2_2 | S_2 | L_2 | {K2'_2_1, K2'_2_2, ... K2'_2_n}, {S2'_2_1, S2'_2_2, ... S2'_2_n}, {L2'_2_1, L2'_2_2, ... L2'_2_n} |
| ... | ... | ... | ... | ... | ... |
| 16 | ... | ... | ... | ... | ... |

In this exemplary table 1, the values SLIV and SLIV' are each shown to comprise: a value S and S' indicating a symbol number specifying the start of the allocated resources, and a value L and L' indicating a number of symbols specifying the length of the allocated resources.

In particular, the RRC configured table not only comprises one set of additional values $K_2'$ and SLIV', or better $K_2'$, S' and L', but instead comprises such a set of additional values for each of the PUSCH repetitions to be transmitted by the user equipment 410. This achieves a high degree of flexibility for each of the PUSCH repetitions without creating additional signaling overhead.

In particular, the processor 430, 480 of the user equipment 410, or of the base station 460, configures this table in accordance with the parameters comprised in a PUSCH time domain resource allocation list IE, namely with the list of parameters termed PUSCH time domain resource allocation. In other words, the table is defined by the PUSCH time domain resource allocation list IE as carried in the PUSCH config IE received in form of RRC signaling.

An example of such a PUSCH time domain resource allocation list IE is reproduced herein below, namely as example 6. As the terminology may change in the future, this example shall be more broadly understood with regard to its functions and concepts of signaling the additional parameters comprised in a PUSCH time domain resource allocation list IE.

| EXAMPLE 6: |
| --- |
| ASN.1 NOTATION OF "PUSCH-TIMEDOMAINRESOURCEALLOCATIONLIST IE" |

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
   k2                                  INTEGER (0..32)                OPTIONAL,   --
Need S
   mappingType                         ENUMERATED {typeA, typeB},
   startSymbolAndLength                INTEGER (0..127)
   numberOfRIVassignments              INTEGER (0..n)
   RIVassignment                       SEQUENCE {
     k2'                               INTEGER (0..32)
     startSymbolAndLength'             INTEGER (0..127)
   }
 }
}
-- TAG-PUSCH-TIMEDOMAINRESOURCEALLOCATIONLIST-STOP
-- ASN1STOP
```

As can be seen from this example 6, the PUSCH time domain resource allocation parameter includes not only values indicating a PUSCH mapping type, a value $K_2$ indicating a slot offsets for the initial PUSCH transmission, a value SLIV indicating a start and length indicator for the initial PUSCH transmission, but also a value indicating the number of repetitions (termed number of resource indicator value, RIV, assignments), and for each of the repetitions (termed RIV assignments), a value $K_2'$ indicating a second slot offset for the at least one repetition, a value SLIV' indicating a second start and length indicator value for the at least one repetition.

When comparing the PUSCH time domain resource allocation list IE of example 6 with the RRC configure table of table 1, it can be seen that the value indicating the number of repetitions (termed number of RIV assignments) of the IE is only indirectly reflected in the RRC configured table, namely in form of the total number of each of the values $K_2'$, S' and L'. This value may, however, also be directly included in the RRC configured table.

The additional values shall be explained in further detail with respect to the different usages of the first exemplary implementation as depicted in FIGS. 13-18.

One Usage of the Sixth Exemplary Implementation

One usage of the RRC configured table of the sixth exemplary implementation is depicted in FIGS. 13-14 where an exemplary RRC configured table for PUSCH repetitions is given and corresponding resource allocations in time domain are shown according to a usage of a sixth exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional values $K_2'$ indicating that the allocated resources for the first and second repetition of the initial PUSCH transmission are included in slots relative to the value k corresponding to the number of the slot carrying the received DCI, or corresponding to the value of time domain offset field additionally carried in the received configured grant config IE.

Thus, the allocated resources for the first and second repetition are included in the slots with slot numbers k+2 and k+3, respectively. Additionally two values S' and two values L' are comprised indicating that the allocated resources for the first and second repetition of the initial PUSCH transmission start in the respective slot with slot number k+2 and k+3 at the symbol with symbol numbers 6 and 1, respectively. The respective resource allocations in time domain are also shown.

Another Usage of the Sixth Exemplary Implementation

Figures 15, 16:
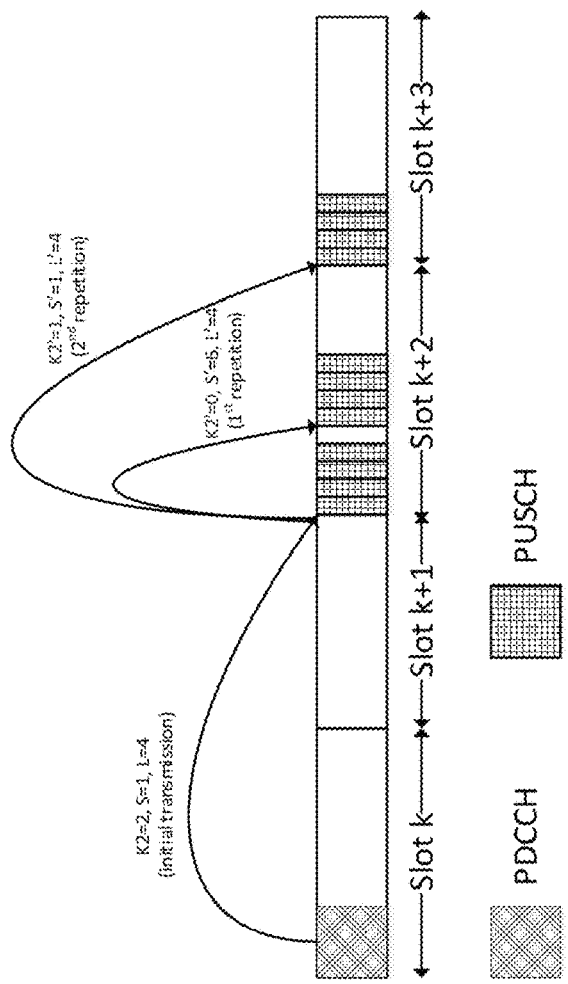
FIGS. 15-16 show a schematic illustration of a RRC configured table for PUSCH repetitions and corresponding resource allocations in time domain according to another usage of the first exemplary implementation.

Another usage of the RRC configured table of the sixth exemplary implementation is depicted in FIGS. 15-16 where an exemplary RRC configured table for PUSCH repetitions is given and corresponding resource allocations in time domain are shown according to a usage of a sixth exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional values $K_2'$ indicating that the allocated resources for both, the first and second repetition of the initial PUSCH transmission are included in slots relative to the number of the slot k+2 with the allocated resources for the initial PUSCH transmission.

Thus, the allocated resources for the first and second repetition are included in the slots with slot numbers (k+2)+0 and (k+2)+1, respectively. Additionally two values S' and two values L' are comprised indicating that the allocated resources for the first and second repetition of the initial PUSCH transmission start in the respective slot with slot number (k+2)+0 and (k+2)+1 at the symbol with symbol numbers 6 and 1, respectively. The respective resource allocations in time domain are also shown.

A Further Usage of the Sixth Exemplary Implementation

Figures 17, 18:
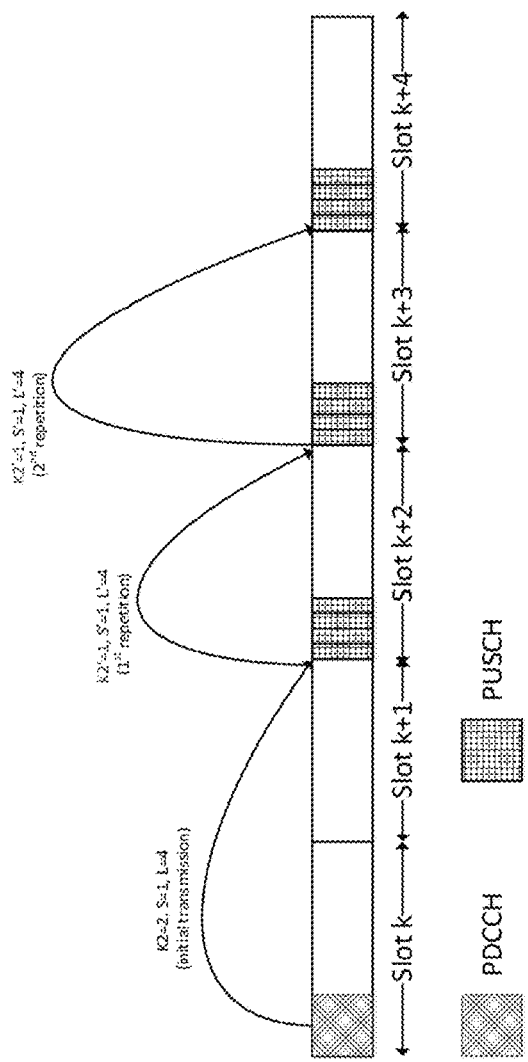
FIGS. 17-18 show a schematic illustration of a RRC configured table for PUSCH repetitions and corresponding resource allocations in time domain according to a further usage of the first exemplary implementation.

Another usage of the RRC configured table of the first exemplary implementation is depicted in FIGS. 17-18 where an exemplary RRC configured table for PUSCH repetitions is given and corresponding resource allocations in time domain are shown according to a usage of a first exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional values $K_2'$ indicating that the allocated resources for the first repetition of the initial PUSCH transmission is included in the slots relative to the number of the slot k+2 with the allocated resources for the initial PUSCH transmission, and the second repetition is included in the slot relative to the number of the slot (k+2)+0 with the allocated resources for the first repetition.

Thus, the allocated resources for the first and second repetition are included in the slots with slot numbers (k+2)+0 and ((k+2)+0)+1, respectively. Additionally two values S' and two values L' are comprised indicating that the allocated resources for the first and second repetition of the initial PUSCH transmission start in the respective slot with slot number (k+2)+0 and ((k+2)+0)+1 at the symbol with symbol numbers 6 and 1, respectively. The respective resource allocations in time domain are also shown.

In other words, the second slot offset specifies the allocated resources for a subsequent one of the at least one repetition relative to index of a slot with the allocated resources for a preceding one of the at least one repetition.

Seventh Exemplary Implementation

The following seventh exemplary implementation is conceived with the understanding that the at least one additional value, comprised in the indexed row of the RRC configured table, is at least one of a value G' indicating a number of symbols of a gap before the allocated resources for the at least one repetition, a value L' indicating a number of symbols specifying the length of the allocated resources for the at least one repetition, and optionally a value indicating the number of the at least one repetition.

With this understanding, the RRC configured table comprises not only values which are specifying allocated resources for the initial PUSCH transmission. Rather the RRC configured table comprises additional values G' and/or L' which are specifying allocated resources for the repetition of the initial PUSCH transmission. In addition, the optional additional value indicating the number of the least one repetition may further complement the RRC configured table in that it permits a more flexible determination which of the specified allocated resource are to be used for repetitions.

An example of such a RRC configured table is reproduced herein below, namely as Table 2:

TABLE 2

| DCI Row index | PUSCH mapping type | K2 | S | L | L' | {G} |
|---|---|---|---|---|---|---|
| 1 | Type A | K2_1 | S_1 | L_1 | L_1' | {G_1_1, G_1_2 ... G_1_n1} |
| 2 | Type B | K2_2 | S_2 | L_2 | L_2' | {G_2_1, G_2_2 ... G_2_n2} |
| ... | ... | ... | ... | ... | ... | ... |
| 16 | ... | ... | ... | ... | ... | ... |

In particular, the RRC configured table not only comprises one set of additional values G' and L' but instead comprises one additional value L' which is applicable to all repetitions, and a set of additional values G' for each of the PUSCH repetitions to be transmitted by the user equipment 410. This achieves a high degree of flexibility for each of the PUSCH repetitions without creating additional signaling overhead.

In particular, the processor 430, 480 of the user equipment 410, or of the base station 460, configures this table in accordance with the parameters comprised in a PUSCH time domain resource allocation list IE, namely with the list of parameters termed PUSCH time domain resource allocation. In other words, the table is defined by the PUSCH time domain resource allocation list IE as carried in the PUSCH config IE received in form of RRC signaling.

An example of such a PUSCH time domain resource allocation list IE is reproduced herein below, namely as example 7. As the terminology may change in the future, this example shall be more broadly understood with regard to its functions and concepts of signaling the additional parameters comprised in a PUSCH time domain resource allocation list IE.

EXAMPLE 7:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
    k2                                  INTEGER (0..32)              OPTIONAL,   --
Need S
    mappingType                         ENUMERATED {typeA, typeB} ,
    startSymbolAndLength                INTEGER (0..127)
```

EXAMPLE 7:
ASN.1 NOTATION OF "PUSCH-TIMEDOMAINRESOURCEALLOCATIONLIST IE"

```
LengthOfEachRepetition         INTEGER (0..32)
numberOfRepetitions            INTEGER (0..n)
RepetitionGap                  SEQUENCE {
   G                           INTEGER (0..32)
   }
}
}
-- TAG-PUSCH-TIMEDOMAINRESOURCEALLOCATIONLIST-STOP
-- ASN1STOP
```

As can be seen from this example 7, the PUSCH time domain resource allocation parameter includes not only values indicating a PUSCH mapping type, a value $K_2$ indicating a slot offsets for the initial PUSCH transmission, a value SLIV indicating a start and length indicator for the initial PUSCH transmission, but also a value L' (termed length of each repetition) indicating the length in number of symbols of each repetition, a value indicating the number of repetitions (termed number of repetitions), and for each of the repetitions (termed repetition gap), a value G' indicating a number of symbols of a gap before the allocated resources for the at least one repetition.

When comparing the PUSCH time domain resource allocation list IE of example 7 with the RRC configure table in table 2, it can be seen that the value indicating the number of repetitions (termed number of repetitions) of the IE is only indirectly reflected in the RRC configured table, namely in form of the total number of the values G'. This value may, however, also be directly included in the RRC configured table.

The additional values shall be explained in further detail with respect to the different usages of the second exemplary implementation as depicted in FIGS. 19-22.

One Usage of the Seventh Exemplary Implementation

Figures 19, 20:
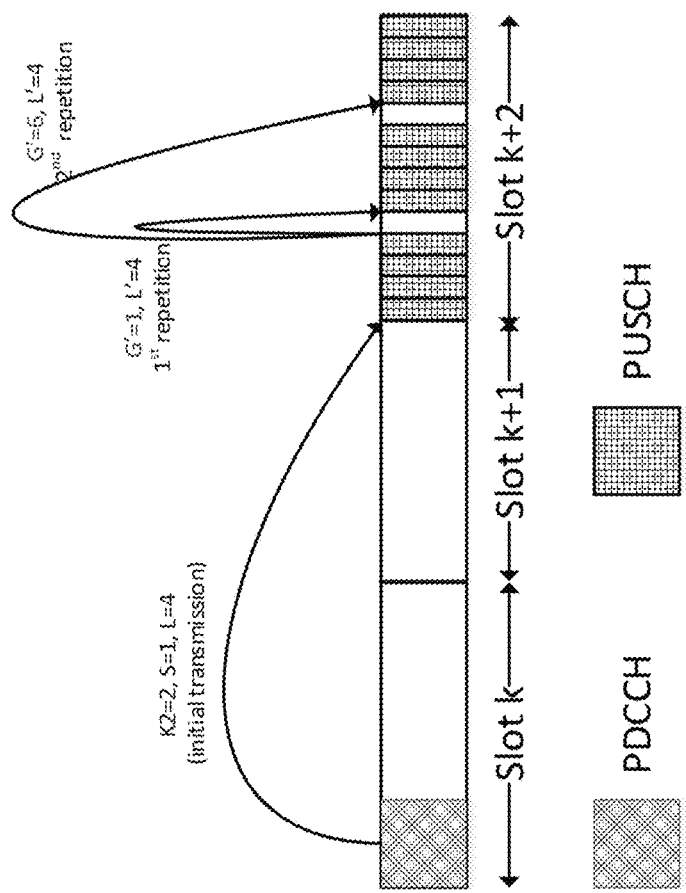
FIGS. 19-20 show a schematic illustration of a RRC configured table for PUSCH repetitions and corresponding resource allocations in time domain according to a usage of a second exemplary implementation.

One usage of the RRC configured table of the second exemplary implementation is depicted in FIGS. 19-20 where an exemplary RRC configured table for PUSCH repetitions is given and corresponding resource allocations in time domain are shown according to a usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises one additional value L' indicating the length in number of symbols is 4 for the allocated resources of each of the first and second repetition, and two additional values G' indicating that the allocated resources for the first and second repetition of the initial PUSCH transmission start at a symbol with a gap G' of a number of symbols 1, 6 before the allocated resources.

For the first and the second repetition, the number of symbols of the gap indicated by value G' is relative to a number 4 of a last symbol within slot k+2 of the allocated resources for the initial PUSCH transmission.

Thus, the allocated resources for the first and second repetition are included in the slots with slot numbers k+2. In particular, the number of the last symbol of the allocated resources of the initial PUSCH transmission is 4. Thereby, a gap of 1 symbol determines the allocated resources for the first repetition to start at symbol number 4+1 and to end at symbol number 4+1+4. A gap of 6 symbols determines the allocated resources for the second repetition to start at symbol 4+6 and to end at symbol number 4+6+4. The respective resource allocations in time domain are also shown.

Another Usage of the Seventh Exemplary Implementation

Figures 21, 22:
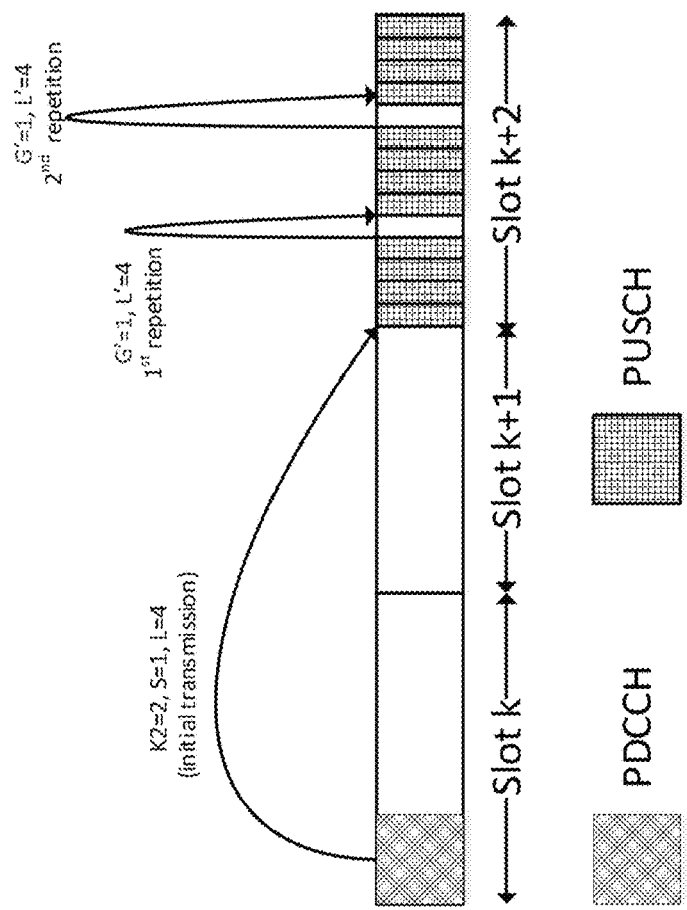
FIGS. 21-22 show a schematic illustration of a RRC configured table for PUSCH repetitions and corresponding resource allocations in time domain according to another usage of the second exemplary implementation.

Another usage of the RRC configured table of the seventh exemplary implementation is depicted in FIGS. 21-22 where an exemplary RRC configured table for PUSCH repetitions is given and corresponding resource allocations in time domain are shown according to another usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises one additional value L' indicating the length in number of symbols is 4 for the allocated resources of each of the first and second repetition, and two additional values G' indicating that the allocated resources for the first and second repetition of the initial PUSCH transmission start at a symbol with a gap of a number of symbols 1, 6 before the allocated resources.

For the first repetition, the number of symbols of the gap indicated by value G' is relative to a number 4 of a last symbol within slot k+2 of the allocated resources for the initial PUSCH transmission. For the second repetition, the number of the symbols of the gap indicated by value G' is relative to the number 4+1+4 of a last symbol of the slot k+2 of the allocated resource for the first repetition.

Thus, the allocated resources for the first and second repetition are included in the slots with slot numbers k+2. In particular, the number of the last symbol of the allocated resources of the initial PUSCH transmission is 4. Thereby, a gap of 1 symbol determines the allocated resources for the first repetition to start at symbol number 4+1 and to end at symbol number 4+1+4. A gap of 1 symbols determines the allocated resources for the second repetition to start at symbol 4+1+4+1 and to end at symbol number 4+1+4+1+4.

In other words, the number of symbols of the gap specifies the allocated resources for a subsequent one of the at least one repetition relative to a number of a last symbol of the allocated resources for a preceding one of the at least one repetition.

Eighth Exemplary Implementation

The following eighth exemplary implementation is conceived with the understanding that the at least one additional value, comprised in the indexed row of the RRC configured table, is at least one of a value G' indicating a number of symbols of a gap before the allocated resources for the at least one repetition, a value L' indicating a number of symbols specifying the length of the allocated resources for the at least one repetition, and optionally a value indicating the number of the at least one repetition.

With this understanding, the RRC configured table comprises not only values which are specifying allocated resources for the initial PUSCH transmission. Rather the RRC configured table comprises additional values G' and/or L' which are specifying allocated resources for the repetition of the initial PUSCH transmission. In addition, the optional additional value indicating the number of the least one repetition may further complement the RRC configured table in that it permits a more flexible determination as to which of the specified allocated resource are to be used for repetitions.

An example of such a RRC configured table is reproduced herein below, namely as Table 3:

TABLE 3

| DCI Row index | PUSCH mapping type | K2 | S | L | {L'}, {G} |
|---|---|---|---|---|---|
| 1 | Type A | K2_1 | S_1 | L_1 | {L'_1_1, L'_1_2 ... L'_1_n1}, {G_1_1, G_1_2 ... G_1_n1} |
| 2 | Type B | K2_2 | S_2 | L_2 | {L'_2_1, L'_2_2 ... L'_2_n2}, {G_2_1, G_2_2 ... G_2_n2} |
| ... | ... | ... | ... | ... | ... |
| 16 | ... | ... | ... | ... | ... |

In particular, the RRC configured table not only comprises one set of additional values G' and L' but instead comprises a set of additional values G' and L' for each of the PUSCH repetitions to be transmitted by the user equipment 410. This achieves a high degree of flexibility for each of the PUSCH repetitions without creating additional signaling overhead.

In particular, the processor 430, 480 of the user equipment 410, or of the base station 460, configures this table in accordance with the parameters comprised in a PUSCH time domain resource allocation list IE, namely with the list of parameters termed PUSCH time domain resource allocation. In other words, the table is defined by the PUSCH time domain resource allocation list IE as carried in the PUSCH config IE received in form of RRC signaling.

An example of such a PUSCH time domain resource allocation list IE is reproduced herein below, namely as example 8. As the terminology may change in the future, this example shall be more broadly understood with regard to its functions and concepts of signaling the additional parameters comprised in a PUSCH time domain resource allocation list IE.

EXAMPLE 8:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : := SEQUENCE (SIZE(1..maxNrofUL-
Allocations) ) OF PUSCH-TimeDomainResourceAllocation
PUSCH-TimeDomainResourceAllocation : := SEQUENCE {
    k2                              INTEGER (0..32)            OPTIONAL,  --
Need S
```

-continued

EXAMPLE 8:
ASN.1 NOTATION OF "PUSCH-TIMEDOMAINRESOURCEALLOCATIONLIST IE"

```
mappingType                      ENUMERATED {typeA, typeB},
startSymbolAndLength             INTEGER (0..127)
numberOfRepetitions              INTEGER (0..n)
EachRepetition                   SEQUENCE {
  LengthOfEachRepetition           INTEGER (0..32)
  G                                INTEGER (0..32)
  }
}
-- TAG-PUSCH-TIMEDOMAINRESOURCEALLOCATIONLIST-STOP
-- ASNISTOP
```

As can be seen from this example 8, the PUSCH time domain resource allocation parameter includes not only values indicating a PUSCH mapping type, a value $K_2$ indicating a slot offsets for the initial PUSCH transmission, a value SLIV indicating a start and length indicator for the initial PUSCH transmission, but also a value indicating the number of repetitions (termed number of repetitions), and for each of the repetitions (termed repetition gap), a value L' (termed length of each repetition) indicating the length in number of symbols of each repetition, and a value G' indicating a number of symbols of a gap before the allocated resources for the at least one repetition.

When comparing the PUSCH time domain resource allocation list IE of example 8 with the RRC configure table in table 3, it can be seen that the value indicating the number of repetitions (termed number of repetitions) of the IE is only indirectly reflected in the RRC configured table, namely in form of the total number of each of the values G' and L'. This value may, however, also be directly included in the RRC configured table.

The additional values shall be explained in further detail with respect to the different usages of the eighth exemplary implementation as depicted in FIGS. 23-26.

One Usage of the Eighth Exemplary Implementation

Figures 23, 24:
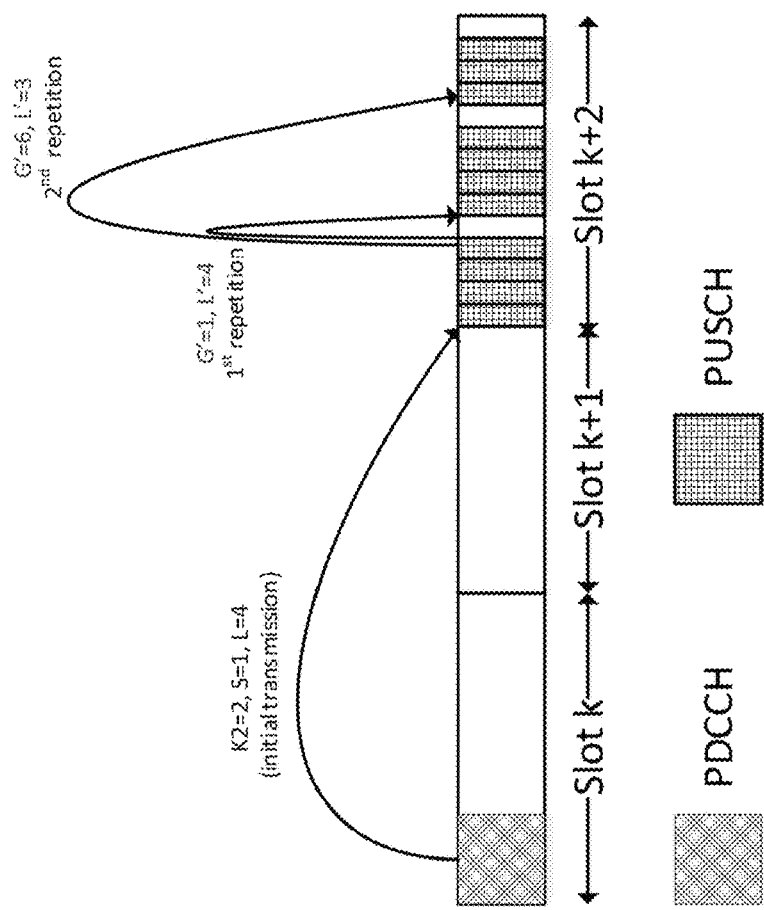
FIGS. 23-24 show a schematic illustration of a RRC configured table for PUSCH repetitions and corresponding resource allocations in time domain according to a usage of a third exemplary implementation.

One usage of the RRC configured table of the eighth exemplary implementation is depicted in FIGS. 23-24 where an exemplary RRC configured table for PUSCH repetitions is given and corresponding resource allocations in time domain are shown according to a usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional value L' indicating the length in number of symbols 4, 3 for the allocated resources of the first and second repetition, and two additional values G' indicating that the allocated resources, for the first and second repetition of the initial PUSCH transmission, start at a symbol with a gap G' of a number of symbols 1, 6 before the allocated resources.

For the first and the second repetition, the number of symbols of the gap indicated by value G' is relative to a number 4 of a last symbol within slot k+2 of the allocated resources for the initial PUSCH transmission.

Thus, the allocated resources for the first and second repetition are included in the slots with slot numbers k+2. In particular, the number of the last symbol of the allocated resources of the initial PUSCH transmission is 4. Thereby, a gap of 1 symbol determines the allocated resources for the first repetition to start at symbol number 4+1 and to end at symbol number 4+1+4. A gap of 6 symbols determines the allocated resources for the second repetition to start at symbol 4+6 and to end at symbol number 4+6+3. The respective resource allocations in time domain are also shown.

Another Usage of the Eighth Exemplary Implementation

Figures 25, 26:
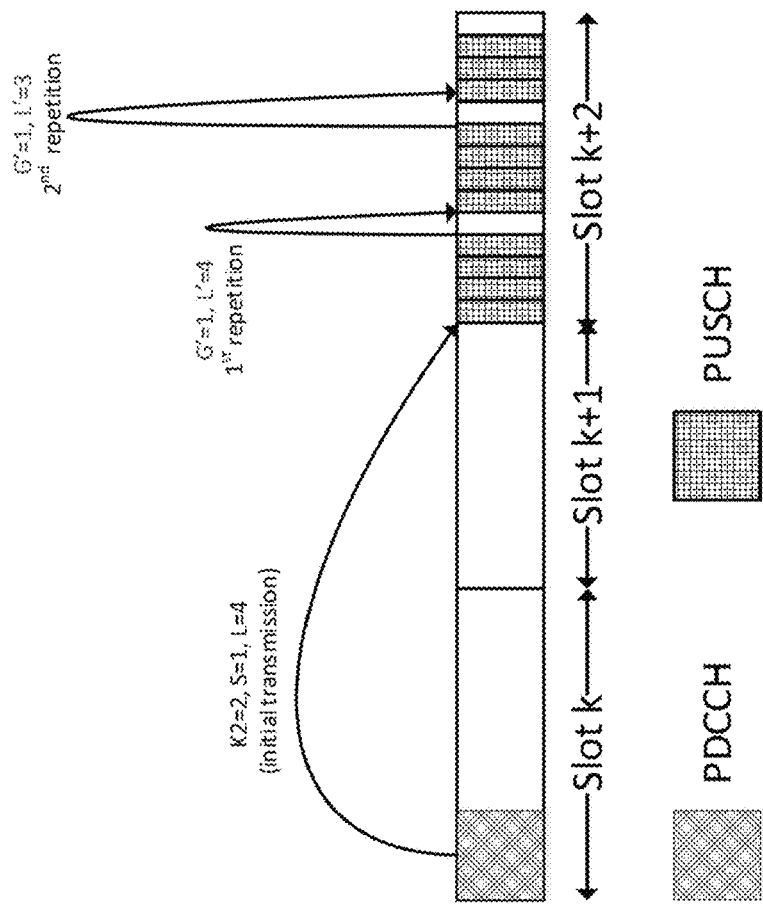
FIGS. 25-26 show a schematic illustration of a RRC configured table for PUSCH repetitions and corresponding resource allocations in time domain according to another usage of a third exemplary implementation.

Another usage of the RRC configured table of the eighth exemplary implementation is depicted in FIGS. 25-26 where an exemplary RRC configured table for PUSCH repetitions is given and corresponding resource allocations in time domain are shown according to another usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional value L' indicating the length in number of symbols 4, 3 for the allocated resources of the first and second repetition, and two additional values G' indicating that the allocated resources, for the first and second repetition of the initial PUSCH transmission, start at a symbol with a gap G' of a number of symbols 1, 6 before the allocated resources.

For the first repetition, the number of symbols of the gap indicated by value G' is relative to a number 4 of a last symbol within slot k+2 of the allocated resources for the initial PUSCH transmission. For the second repetition, the number of the symbols of the gap indicated by value G' is relative to the number 4+1+4 of a last symbol of the slot k+2 of the allocated resource for the first repetition.

Thus, the allocated resources for the first and second repetition are included in the slots with slot numbers k+2. In particular, the number of the last symbol of the allocated resources of the initial PUSCH transmission is 4. Thereby, a gap of 1 symbol determines the allocated resources for the first repetition to start at symbol number 4+1 and to end at symbol number 4+1+4. A gap of 1 symbols determines the allocated resources for the second repetition to start at symbol 4+1+4+1 and to end at symbol number 4+1+4+1+3.

In other words, the number of symbols of the gap specifies the allocated resources for a subsequent one of the at least one repetition relative to a number of a last symbol of the allocated resources for a preceding one of the at least one repetition.

Ninth Exemplary Implementation

The following ninth exemplary implementation is conceived with the understanding that the at least one additional value, comprised in the indexed row of the RRC configured table, is at least one of a value L' indicating a number of symbols specifying the length of the allocated resources for the at least one repetition, and optionally a value indicating the number of the at least one repetition.

With this understanding, the RRC configured table comprises not only values which are specifying allocated resources for the initial PUSCH transmission. Rather the RRC configured table comprises additional values which are specifying allocated resources for the repetition of the initial PUSCH transmission. In addition, the optional additional value indicating the number of the least one repetition may further complement the RRC configured table in that it permits a more flexible determination as to which of the specified allocated resource are to be used for repetitions.

An example of such a RRC configured table is reproduced herein below, namely as table 4:

TABLE 4

| DCI Row index | PUSCH mapping type | K2 | S | L | {L'} |
|---|---|---|---|---|---|
| 1 | Type A | K2_1 | S_1 | L_1 | {L'_1_1, L'_1_2 ... L'_1_n1} |
| 2 | Type B | K2_2 | S_2 | L_2 | {L'_2_1, L'_2_2 ... L'_2_n2} |
| ... | ... | ... | ... | ... | ... |
| 16 | ... | ... | ... | ... | ... |

In particular, the RRC configured table not only comprises one additional value L' but instead comprises a set of additional values L' for each of the PUSCH repetitions to be transmitted by the user equipment 410. This achieves a high degree of flexibility for each of the PUSCH repetitions without creating additional signaling overhead.

In particular, the processor 430, 480 of the user equipment 410, or of the base station 460, configures this table in accordance with the parameters comprised in a PUSCH time domain resource allocation list IE, namely with the list of parameters termed PUSCH time domain resource allocation. In other words, the table is defined by the PUSCH time domain resource allocation list IE as carried in the PUSCH config IE received in form of RRC signaling.

An example of such a PUSCH time domain resource allocation list IE is reproduced herein below, namely as example 9. As the terminology may change in the future, this example shall be more broadly understood with regard to its functions and concepts of signaling the additional parameters comprised in a PUSCH time domain resource allocation list IE.

EXAMPLE 9:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList ::=    SEQUENCE (SIZE(1..maxNrofUL-
Allocations) ) OF PUSCH-TimeDomainResourceAllocation
PUSCH-TimeDomainResourceAllocation ::= SEQUENCE {
    k2                           INTEGER (0..32)             OPTIONAL,    --
Need S
    mappingType                  ENUMERATED {typeA, typeB},
    startSymbolAndLength         INTEGER (0..127)
    numberOfRepetitions          INTEGER (0..n)
    Repetitionlength             SEQUENCE {
       LengthOfEachRepetition           INTEGER (0..32)
    }
}
-- TAG-PUSCH-TIMEDOMAINRESOURCEALLOCATIONLIST-STOP
-- ASN1STOP
```

As can be seen from this example 9, the PUSCH time domain resource allocation parameter includes not only values indicating a PUSCH mapping type, a value $K_2$ indicating a slot offsets for the initial PUSCH transmission, a value SLIV indicating a start and length indicator for the initial PUSCH transmission, but also a value indicating the number of repetitions (termed number of repetitions), and for each of the repetitions (termed repetition length), a value L' (termed length of each repetition) indicating the length in number of symbols of each repetition for the at least one repetition.

When comparing the PUSCH time domain resource allocation list IE of example 9 with the RRC configure table in table 4, it can be seen that the value indicating the number of repetitions (termed number of repetitions) of the IE is only indirectly reflected in the RRC configured table, namely in form of the total number of the values L'. This value may, however, also be directly included in the RRC configured table.

Figures 27, 28:
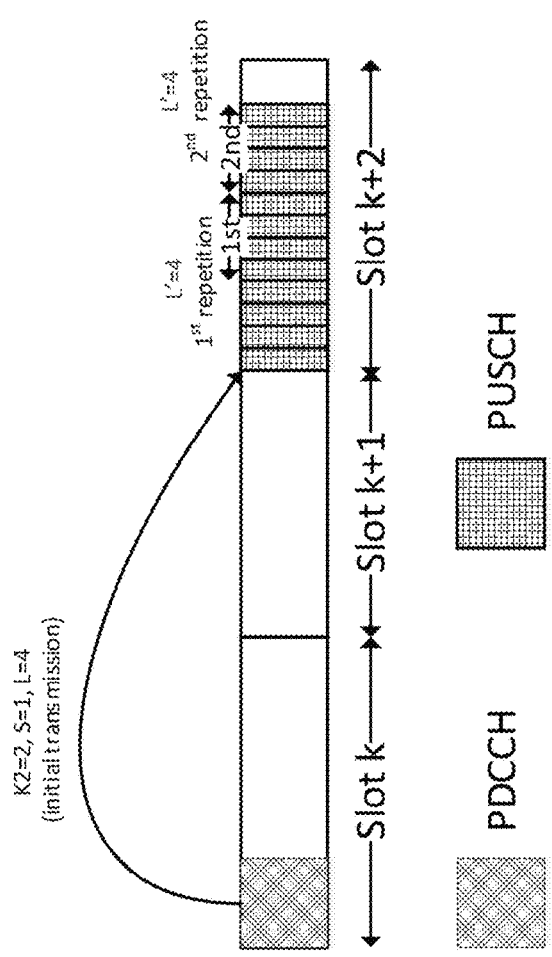
FIGS. 27-28 show a schematic illustration of a RRC configured table for PUSCH repetitions and corresponding resource allocations in time domain according to a usage of a fourth exemplary implementation.

The additional values shall be explained in further detail with respect to the different usage of the fourth exemplary implementation as depicted in FIGS. 27-28.

One Usage of the Ninth Exemplary Implementation

One usage of the RRC configured table of the fourth exemplary implementation is depicted in FIGS. 27-28 where an exemplary RRC configured table for PUSCH repetitions is given and corresponding resource allocations in time domain are shown according to a usage of a second exemplary implementation.

According to the exemplary RRC configured table, in a row with row index 3, values are given for which corresponding resource allocations in time domain are shown. The RRC configured table, comprises, in the row with the row index 3, a value indicating the PUSCH mapping type to be type b, meaning that resource allocations may start within the slot and are not necessarily starting at the beginning of the slot.

Further, this row comprises a value $K_2$ indicating that allocated resources for the initial PUSCH transmission is included in the slot with slot number k+2. Additionally, values S and L are comprised indicating that the allocated resources for the initial PUSCH transmission start in the slot with slot number k+2 at the symbol with symbol number 1 and have a length of 4 symbols.

Additionally, this row comprises two additional value L' indicating the length in number of symbols 4, 4 for the allocated resources of the first and second repetition.

For the first and the second repetition, the start of the allocated resources is contiguously following the last symbol of the allocated resources for the respective one of the initial PUSCH transmission and of the first repetition thereof.

Thus, the allocated resources for the first and second repetition are included in the slots with slot numbers k+2. In particular, the number of the last symbol of the allocated resources of the initial PUSCH transmission is 4. Thereby, the allocated resources for the first repetition is determined to start at symbol number 4 and to end at symbol number 4+4. And the allocated resources for the second repetition is determined to start at symbol 4+4 and to end at symbol number 4+4+4. The respective resource allocations in time domain are also shown.

Further Exemplary Implementation

Referring now to a further exemplary implementation, according to which the behavior of the either first or the second exemplary implementation can be configured at the base station 460. For this purpose, an exemplary PUSCH time domain resource allocation list IE can be specified is reproduced herein below, namely as in example 10. As the terminology may change in the future, this example shall be more broadly understood with regard to its functions and concepts of signaling the additional parameters comprised in a PUSCH time domain resource allocation list IE.

EXAMPLE 10:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
    k2                              INTEGER (0..32)            OPTIONAL,   --
Need S
    mappingType                     ENUMERATED {typeA, typeB},
    startSymbolAndLength            INTEGER (0..127)
    choice of                       {
       numberOfRIVassignments          INTEGER (0..n)
       RIVassignment                   SEQUENCE {
       k2'                             INTEGER (0..32)
       startSymbolAndLength'           INTEGER (0..127)
       }
    }
    or
                                    {
       numberOfRepetitions             INTEGER (0..n)
       EachRepetition                  SEQUENCE {
       LengthOfEachRepetition          INTEGER (0..32)
       G                               INTEGER (0..32)
       }
    }
}
-- TAG-PUSCH-TIMEDOMAINRESOURCEALLOCATIONLIST-STOP
-- ASN1STOP
```

In an even further exemplary implementation, the PUSCH time domain resource allocation list IE additionally comprises a parameter indicating whether the transport block size is calculated for each PUSCH transmission separately, or whether a combined transport block size is calculated for all PUSCH transmissions, including the initial PUSCH transmission and the at least one repetition thereof.

This further exemplary implementation may be combined with any one of the sixth to ninth exemplary implementations. If combined with the sixth exemplary implementation, an exemplary PUSCH time domain resource allocation list IE can be specified as reproduced herein below, namely as in example 11. As the terminology may change in the future, this example shall be more broadly understood with regard to its functions and concepts of signaling the additional parameters comprised in a PUSCH time domain resource allocation list IE.

EXAMPLE 11:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
   k2                              INTEGER (0..32)          OPTIONAL,   --
Need S
      mappingType                  ENUMERATED {typeA, typeB},
      startSymbolAndLength         INTEGER (0..127)
      numberOfRIVassignments       INTEGER (0..n)
      RIVassignment                SEQUENCE {
         k2'                       INTEGER (0..32)
         startSymbolAndLength'     INTEGER (0..127)
      }
      TBSMethod                    ENUMERATED {single, combined}
}
-- TAG-PUSCH-TIMEDOMAINRESOURCEALLOCATIONLIST-STOP
-- ASN1STOP
```

Importantly, the example 11 refers to two different calculation mechanism for calculating the transport block size (TBS), namely a combined and a separate TBS calculation. This shall, however not be construed as limitation to the present disclosure. Rather, should an agreement be reached that three or even more different calculation mechanisms are to be used, then a skilled person will readily understand that also the applicable one of the tree or even more different calculation mechanisms can be indicated via the PUSCH time domain resource allocation list IE.

In a further exemplary implementation, the PUSCH time domain resource allocation list IE additionally comprises a parameter indicating whether frequency hopping is applied for each PUSCH transmission separately, or whether continuous frequency hopping is applied for all PUSCH transmissions, including the initial PUSCH transmission and the at least one repetition thereof.

This further exemplary implementation may be combined with any one of the sixth to ninth exemplary implementations. If combined with the sixth exemplary implementation, an exemplary PUSCH time domain resource allocation list IE can be specified as reproduced herein below, namely as in example 12. As the terminology may change in the future, this example shall be more broadly understood with regard to its functions and concepts of signaling the additional parameters comprised in a PUSCH time domain resource allocation list IE.

EXAMPLE 12:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
    k2                              INTEGER (0..32)         OPTIONAL,  --
Need S
    mappingType                     ENUMERATED {typeA, typeB},
    startSymbolAndLength            INTEGER (0..127)
    numberOfRIVassignments          INTEGER (0..n)
    RIVassignment                   SEQUENCE {
       k2'                          INTEGER (0..32)
       startSymbolAndLength'        INTEGER (0..127)
    }
    FrequencyHoppingMethod          ENUMERATED {full, half}
}
-- TAG-PUSCH-TIMEDOMAINRESOURCEALLOCATIONLIST-STOP
-- ASN1STOP
```

Importantly, the example 12 refers to two different frequency hopping mechanism, namely a mechanism where frequency hopping is applied either separately or to all of the PUSCH transmissions. This shall, however not be construed as limitation to the present disclosure. Rather, should an agreement be reached that three or even more different frequency hopping mechanisms are to be used, then a skilled person will readily understand that also the applicable one of the tree or even more different frequency hopping mechanism can be indicated via the PUSCH time domain resource allocation list IE.

In an even further exemplary implementation, the PUSCH time domain resource allocation list IE additionally comprises a parameter indicating whether or not demodulation reference symbols, DMRS, are present in all or each individual one of the at least one repetition of the initial PUSCH transmission.

This further exemplary implementation may be combined with any one of the sixth to ninth exemplary implementations. If combined with the sixth exemplary implementation, an exemplary PUSCH time domain resource allocation list IE can be specified as reproduced herein below, namely as in example 13. As the terminology may change in the future, this example shall be more broadly understood with regard to its functions and concepts of signaling the additional parameters comprised in a PUSCH time domain resource allocation list IE.

EXAMPLE 13:
ASN.1 NOTATION OF "PUSCH-TIMEDOMAINRESOURCEALLOCATIONLIST IE"

```
-- ASN1START
-- TAG-PUSCH-TIMEDOMAINRESOURCEALLOCATIONLIST-START
PUSCH-TimeDomainResourceAllocationList : :=    SEQUENCE (SIZE(1..maxNrofUL-
Allocations) ) OF PUSCH-TimeDomainResourceAllocation
PUSCH-TimeDomainResourceAllocation : := SEQUENCE {
    k2                              INTEGER (0..32)         OPTIONAL,  --
Need S
    mappingType                     ENUMERATED {typeA, typeB},
    startSymbolAndLength            INTEGER (0..127)
    numberOfRIVassignments          INTEGER (0..n)
    RIVassignment                   SEQUENCE {
       k2'                          INTEGER (0..32)
       start SymbolAndLength'       INTEGER (0..127)
       DMRSPresent                  ENUMERATED {yes, no}
    }
}
-- TAG-PUSCH-TIMEDOMAINRESOURCEALLOCATIONLIST-STOP
-- ASN1STOP
```

According to a first aspect, a user equipment, UE, is provided comprising: a receiver, which in operation, receives a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; the receiver, in operation, receives downlink control information, DCI, in form of medium access control, MAC, signaling carrying a time-domain resource assignment filed with value m, wherein the value m provides a row index m+1 to the RRC configured table, the processor, in operation, determines allocated resources for an initial PUSCH transmission and allocated resources for at least one repetition thereof based on: a number of a slot carrying the received DCI, and the value $K_2$ indicating the slot offsets, and the value SLIV indicating the start and length indicator comprised in indexed row of the RRC configured table; and a transmitter, which in operation, transmits a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a second aspect, a user equipment, UE, is provided comprising: a receiver, which in operation, receives a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; the receiver, in operation, receives a configured grant config IE in form of RRC signaling carrying a time domain allocation filed with value m, wherein the value m provides a row index m+1 to the RRC configured table, the processor, in operation, determines allocated resources for an initial PUSCH transmission and allocated resources for at least one repetition thereof based on: a value of time domain offset field additionally carried in the received configured grant config IE and associated with the time domain allocation filed, and the value $K_2$ indicating the slot offsets, and the value SLIV indicating the start and length indicator comprised in indexed row of the RRC configured table; and a transmitter, which in operation, transmits a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a third aspect, which is provided in addition to a first or second aspect, the at least one additional value is one of: a value $K_2'$ indicating a second slot offset for the at least one repetition, a value SLIV' indicating a second start and length indicator value for the at least one repetition, and a value indicating the number of the at least one repetition, and/or wherein the second start and length indicator value SLIV' comprises: a value S' indicating a symbol number specifying the start of the allocated resources for the at least one repetition, and a value L' indicating a number of symbols specifying the length of the allocated resources for the at least one repetition.

According to a fourth aspect, which is provided in addition to a third or fourth aspect, in case the at least one additional value is the value $K_2'$ indicating the second slot offset, the second slot offset specifies the allocated resources for all of the at least one repetition relative to: the number of the slot carrying the received DCI, or the value of time domain offset field additionally carried in the received configured grant config IE.

According to a fifth aspect, which is provided in addition to a third or fourth aspect, in case the at least one additional value is the value $K_2'$ indicating the second slot offset, the second slot offset specifies the allocated resources for all of the at least one repetition relative to a number of a slot with the allocated resources for the initial PUSCH transmission.

According to a sixth aspect, which is provided in addition to a third or fourth aspect, in case the at least one additional value is the value $K_2'$ indicating the second slot offset, the second slot offset specifies the allocated resources for a first of the at least one repetition relative to a number of a slot with the allocated resources for the initial PUSCH transmission, or the second slot offset specifies the allocated resources for a subsequent one of the at least one repetition relative to a number of a slot with the allocated resources for a preceding one of the at least one repetition.

According to a seventh aspect, which is provided in addition to a first or second aspect, the at least one value is one of: a value G' indicating a number of symbols of a gap before the allocated resources for the at least one repetition, a value L' indicating a number of symbols specifying the length of the allocated resources for the at least one repetition, and a value indicating the number of the at least one repetition.

According to an eighth aspect, which is provided in addition to a seventh aspect, in case the at least one additional value is the value G' indicating the number of symbols of the gap, the number of symbols of the gap specifies the allocated resources for all of the at least one repetition relative to a number of a last symbol of the allocated resources for the initial PUSCH transmission.

According to a ninth aspect, which is provided in addition to an eighth aspect, in case the at least one additional value is the value G' indicating the number of symbols of the gap, the number of symbols of the gap specifies the allocated resources for a first of the at least one repetition relative to a number of a last symbol of the allocated resources for the initial PUSCH transmission, or the number of symbols of the gap specifies the allocated resources for a subsequent one of the at least one repetition relative to a number of a last symbol of the allocated resources for a preceding one of the at least one repetition.

According to a tenth aspect, which is provided in addition to a third or eighth aspect, in case the at least one additional value is the value L' indicating the number of symbols specifying the length of the allocated resources, the number of symbols specifies the length of the allocated resources for all of the at least one repetition, or the number of symbols specifies the length of the allocated resources for an individual one of the at least one repetition.

According to an eleventh aspect, which is provided in addition to one of the first to tenth aspects, the PUSCH time domain resource allocation list IE additionally comprises at least one of: a parameter indicating whether the transport block size is calculated for each PUSCH transmission separately, or whether a combined transport block size is calculated for all PUSCH transmissions, including the initial PUSCH transmission and the at least one repetition thereof, a parameter indicating whether frequency hopping is applied for each PUSCH transmission separately, or whether continuous frequency hopping is applied for all PUSCH transmissions, including the initial PUSCH transmission and the at least one repetition thereof, and a parameter indicating whether or not demodulation reference symbols, DMRS, are present in all or each individual one of the at least one repetition of the initial PUSCH transmission.

According to a twelfth aspect, a method for a UE, is provided comprising: receiving a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; receiving downlink control information, DCI, in form of medium access control, MAC, signaling carrying a time-domain resource assignment filed with value m, wherein the value m provides a row index m+1 to the RRC configured table, determining allocated resources for an initial PUSCH transmission and allocated resources for at least one repetition thereof based on: a number of a slot carrying the received DCI, and the value $K_2$ indicating the slot offsets, and the value SLIV indicating the start and length indicator comprised in indexed row of the RRC configured table; and transmitting a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a thirteenth aspect, a method for a UE, is provided comprising: receiving a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; receiving configured grant config IE in form of RRC signaling carrying a time domain allocation filed with value m, wherein the value m provides a row index m+1 to the RRC configured table, determining allocated resources for an initial PUSCH transmission and allocated resources for at least one repetition thereof based on: a value of time domain offset field additionally carried in the received configured grant config IE and associated with the time domain allocation filed, and the value $K_2$ indicating the slot offsets, and the value SLIV indicating the start and length indicator comprised in indexed row of the RRC configured table; and transmitting a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a fourteenth aspect, a base station, BS, is provided comprising: a transmitter, which in operation, transmits a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; the transmitter, in operation, transmits downlink control information, DCI, in form of medium access control, MAC, signaling carrying a time-domain resource assignment filed with value m, wherein the value m provides a row index m+1 to the RRC configured table, the processor, in operation, allocates resources for an initial PUSCH transmission and allocates resources for at least one repetition thereof based on: a number of a slot carrying the transmitted DCI, and the value $K_2$ indicating the slot offsets, and the value SLIV indicating the start and length indicator comprised in indexed row of the RRC configured table; and a receiver, which in operation, receives a PUSCH transmission using the respectively allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a fifteenth aspect, a base station, BS, is provided comprising: a transmitter, which in operation, transmits a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; the transmitter, in operation, transmits a configured grant config IE in form of RRC signaling carrying a time domain allocation filed with value m, wherein the value m provides a row index m+1 to the RRC configured table, the processor, in operation, allocates resources for an initial PUSCH transmission and allocates resources for at least one repetition thereof based on: a value of time domain offset field additionally carried in the received configured grant config IE and associated with the time domain allocation filed, and the value $K_2$ indicating the slot offsets, and the value SLIV indicating the start and length indicator comprised in indexed row of the RRC configured table; and a receiver, in operation, receives a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a sixteenth aspect, a method for a base station, BS, is provided comprising: transmitting a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; transmitting downlink control information, DCI, in form of medium access control, MAC, signaling carrying a time-domain resource assignment filed with value m, wherein the value m provides a row index m+1 to the RRC configured table, allocating resources for an initial PUSCH transmission and allocating resources for at least one repetition thereof based on: a number of a slot carrying the transmitted DCI, and the value $K_2$ indicating the slot offsets, and the value SLIV indicating the start and length indicator comprised in indexed row of the RRC configured table; receiving a PUSCH transmission using the respectively allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to a seventeenth aspect, a method for a base station, BS, is provided comprising: transmitting a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, each with a value indicating a PUSCH mapping type, a value $K_2$ indicating a slot offsets, and a value SLIV indicating a start and length indicator; transmitting a configured grant config IE in form of RRC signaling carrying a time domain allocation filed with value m, wherein the value m provides a row index m+1 to the RRC configured table, allocating resources for an initial PUSCH transmission and allocating resources for at least one repetition thereof based on: a value of time domain offset field additionally carried in the received configured grant config IE and associated with the time domain allocation filed, and the value $K_2$ indicating the slot offsets, and the value SLIV indicating the start and length indicator comprised in indexed row of the RRC configured table; receiving a PUSCH transmission using the respectively determined allocated resources for the initial PUSCH transmission and for the at least one repetition thereof; and wherein the determination of allocated resources is based on at least one additional value comprised in the indexed row of the RRC configured table which is specifying the allocated resources in time domain for the at least one repetition of the initial PUSCH transmission.

According to an eighteenth aspect, a user equipment, UE, is provided comprising a receiver, which in operation, receives a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions; the receiver, in operation, receives downlink control information, DCI, signaling carrying a time-domain resource assignment filed with value m, wherein the value m provides a row index m+1 to the RRC configured table, the processor, in operation, determines allocated time-domain resources for the plurality of PUSCH transmissions based on the index of the slot carrying the received DCI, and the first set of values related to allocated time-domain resources comprised in the indexed row of the RRC configured table; a transmitter, which in operation, selects transport blocks of data to be carried in the plurality of PUSCH transmissions, and transmits the plurality of PUSCH transmissions using the respectively determined allocated time-domain resources; and wherein the transport blocks of data are selected based on at least one second parameter comprised in the indexed row of the RRC configured table which is indicating whether the plurality of PUSCH transmissions are either different PUSCH transmissions or repeated PUSCH transmissions.

According to a nineteenth aspect, which is provided in addition to the eighteenth aspect, a same one of the at least one second parameter comprised in the indexed row of the RRC configured table is indicating different or repeated PUSCH transmissions for all of the plurality of PUSCH transmissions.

According to a twentieth aspect, which is provided in addition to the eighteenth aspect, a different one of the at least one second parameter comprised in the indexed row of the RRC configured table is indicating different or repeated PUSCH transmissions for each of the plurality of PUSCH transmissions excluding a first of the plurality of PUSCH transmissions According to a twenty-first aspect, which is provide in the eighteenth to twentieth aspect, the at least one second parameter is comprised in the PUSCH time domain resource allocation list IE.

According to a twenty-second aspect, a user equipment, UE, is provided, comprising a receiver, which in operation, receives a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions; the receiver, in operation, receives downlink control information, DCI, signaling carrying a time-domain resource assignment filed with value m, wherein the value m provides a row index m+1 to the RRC configured table, the processor, in operation, determines allocated time-domain resources for the plurality of PUSCH transmissions based on the index of the slot carrying the received DCI, and the first set of values related to allocated time-domain resources comprised in the indexed row of the RRC configured table; a transmitter, which in operation, selects transport blocks of data to be carried in the plurality of PUSCH transmissions, and transmits the plurality of PUSCH transmissions using the respectively determined allocated time-domain resources; and wherein the transport blocks of data are selected based on at least one second parameter conveyed via signaling the received DCI which is indicating whether the plurality of PUSCH transmissions are either different PUSCH transmissions or repeated PUSCH transmissions.

According to a twenty-third aspect, which is provided in addition to the twenty-second aspect, the at least one second parameter is comprised in a dedicated bit field of the received DCI, and a same one of the at least one second parameter is indicating different or repeated PUSCH transmissions for all of the plurality of PUSCH transmissions.

According to a twenty-fourth aspect, which is provided in addition to the twenty-second aspect, the receiver, in operation, infers the at least one second parameter from a particular radio network temporary identifier, RNTI, used for scrambling the cyclic redundancy check, CRC, bit field of the received DCI, and same inferred at least one second parameter is indicating different or repeated PUSCH transmissions for all of the plurality of PUSCH transmissions.

According to a twenty-fifth aspect, a user equipment, UE, provided comprising a receiver, which in operation, receives a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions; the receiver, in operation, receives downlink control information, DCI, signaling carrying a time-domain resource assignment filed with value m, wherein the value m provides a row index m+1 to the RRC configured table, the processor, in operation, determines allocated time-domain resources for the plurality of PUSCH transmissions based on the index of slot carrying the received DCI, and the first set of values related to allocated time-domain resources comprised in the indexed row of the RRC configured table; and a transmitter, which in operation, selects transport blocks of data to be carried in the plurality of PUSCH transmissions, and transmits the plurality of PUSCH transmissions using the respectively determined allocated time-domain resources; and wherein the transport blocks of data are selected based on at least one second parameter conveyed via signaling of a physical layer configuration which is indicating whether the plurality of PUSCH transmissions are either different PUSCH transmissions or repeated PUSCH transmissions.

According to a twenty-sixth aspect, which is provided in addition to the twenty-fifth aspect, the receiver, in operation, receives the at least one second parameter comprised in a physical, Phy-, parameter IE in form of RRC signaling, and same received at least one second parameter is indicating different or repeated PUSCH transmissions for all of the plurality of PUSCH transmissions.

According to a twenty-seventh aspect, which is provided in addition to the twenty-fifth aspect, the receiver, in operation, infers the at least one second parameter from a radio spectrum configuration of the particular bandwidth part, and same inferred at least one second value is indicating different or repeated PUSCH transmissions for all of the plurality of PUSCH transmissions.

According to a twenty-eighth aspect, which is provided in addition to the twenty-fifth aspect, the receiver, in operation, infers the at least one second parameter from a service type configuration having specific reliability and/or latency requirements, and same inferred at least one second value is indicating different or repeated PUSCH transmissions for all of the plurality of PUSCH transmissions.

According to a twenty-ninth aspect, which is provided in addition to the eighteenth to twenty-eighth aspect, the determination of allocated time-domain resources is based on the first set of values related to allocated time-domain resources and comprised in each row of the RRC configured table including: a value indicating a PUSCH mapping type for at least a first one of the plurality of PUSCH transmissions, a value $K_2$ indicating a slot offsets for at least a first one of the plurality of PUSCH transmissions, and a value SLIV indicating a start and length indicator for at least a first one of the plurality of PUSCH transmissions.

According to a thirtieth aspect, which is provided in addition to the eighteenth to twenty-ninth aspect, the determination of allocated time-domain resources is further based on at least one third value related to allocated time-domain resources and comprised in the indexed row of the RRC configured table, including at least one of: a value $K_2'$ indicating another slot offset for a subsequent one of the plurality of PUSCH transmissions, a value SLIV' indicating another start and length indicator value for a subsequent one of the plurality of PUSCH transmissions, and a value indicating the total number of the plurality of PUSCH transmissions excluding a first of the plurality of PUSCH transmissions.

According to a thirty-first aspect, which is provided in addition to the thirtieth aspect, the other start and length indicator value SLIV' comprises: a value S' indicating a symbol number specifying the start of the allocated resources for a subsequent one of the plurality of PUSCH transmissions, and a value L' indicating a number of symbols specifying the length of the allocated resources for a subsequent one of the plurality of PUSCH transmissions.

According to a thirty-second aspect, which is provided in addition to the eighteenth to thirty-first aspect, the transmitter, in operation, further generates the plurality of PUSCH transmission carrying the selected transport blocks of data based on at least one fourth value related to the generation of the plurality of PUSCH transmissions, and also comprised in the indexed row of the RRC configured table, including at least one of: a different modulation and coding scheme, MCS, index value for each of the plurality of PUSCH transmissions excluding a first of the plurality of PUSCH transmissions, or a same modulation and coding scheme, MCS, index value for all of the plurality of PUSCH transmissions, and a different redundancy version, RV, offset value for each of the plurality of PUSCH transmissions excluding a first of the plurality of PUSCH transmissions, or a same redundancy version, RV, offset value for all of the plurality of PUSCH transmission.

According to thirty-third aspect, which is provided in addition to the eighteenth to thirty-second aspect, the PUSCH time domain resource allocation list IE additionally comprises at least one fifth parameter related to the generation of the plurality of PUSCH transmissions, including at least one of: a parameter indicating whether the transport block size is calculated for each of the plurality of PUSCH transmission separately, or whether a combined transport block size is calculated for all PUSCH transmissions, a parameter indicating whether a modulation and coding scheme, MCS, index is determined for each of the plurality of PUSCH transmission separately, or whether the same MCS index is determined for all PUSCH transmissions, a parameter indicating whether or not a same redundancy version, RV, is determined for all of the plurality of PUSCH transmissions based on a RV field in the received DCI, and a parameter indicating whether or not demodulation reference symbols, DMRS, are present in at least a first or in all of the plurality of PUSCH transmission.

According to a thirty-fourth aspect, a method for a UE is provided comprising the steps of: receiving a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, at least one row comprising a first set of values related to allocated time-domain resources for a plurality of PUSCH transmissions; receiving downlink control information, DCI, signaling carrying a time-domain resource assignment filed with value m, wherein the value m provides a row index m+1 to the RRC configured table, determining allocated time-domain resources for the plurality of PUSCH transmissions based on the index of slot carrying the received DCI, and the first set of values related to allocated time-domain resources comprised in the indexed row of the RRC configured table; selecting transport blocks of data to be carried in the plurality of PUSCH transmissions, and transmits the plurality of PUSCH transmissions using the respectively determined allocated time-domain resources; and wherein the transport blocks of data are selected based on at least one second parameter comprised in the indexed row of the RRC configured table which is indicating whether the plurality of PUSCH transmissions are either different PUSCH transmissions or repeated PUSCH transmissions.

According to a thirty-fifth aspect, a method for a UE is provided comprising the steps of: receiving a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, at least one row comprising a first set of values related to allocated time-domain resources for a plurality of PUSCH transmissions; receiving downlink control information, DCI, signaling carrying a time-domain resource assignment filed with value m, wherein the value m provides a row index m+1 to the RRC configured table, determining allocated time-domain resources for the plurality of PUSCH transmissions based on the index of slot carrying the received DCI, and the first set of values related to allocated time-domain resources comprised in the indexed row of the RRC configured table; selecting transport blocks of data to be carried in the plurality of PUSCH transmissions, and transmits the plurality of PUSCH transmissions using the respectively determined allocated time-domain resources; and wherein the transport blocks of data are selected based on at least one second parameter conveyed via signaling the received DCI which is indicating whether the plurality of PUSCH transmissions are either different PUSCH transmissions or repeated PUSCH transmissions.

According to a thirty-sixth aspect, a method for a UE is provided comprising the steps of: receiving a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, at least one row comprising a first set of values related to allocated time-domain resources for a plurality of PUSCH transmissions; receiving downlink control information, DCI, signaling carrying a time-domain resource assignment filed with value m, wherein the value m provides a row index m+1 to the RRC configured table, determining allocated time-domain resources for the plurality of PUSCH transmissions based on the index of slot carrying the received DCI, and the first set of values related to allocated time-domain resources comprised in the indexed row of the RRC configured table; and selecting transport blocks of data to be carried in the plurality of PUSCH transmissions, and transmits the plurality of PUSCH transmissions using the respectively determined allocated time-domain resources; and wherein the transport blocks of data are selected based on at least one second parameter conveyed via signaling of a physical layer configuration which is indicating whether the plurality of PUSCH transmissions are either different PUSCH transmissions or repeated PUSCH transmissions.

According to a thirty-seventh aspect, a base station, BS, is provided comprising: a transmitter, which in operation, transmits a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions; the transmitter, in operation, transmits downlink control information, DCI, signaling carrying a time-domain resource assignment filed with value m, wherein the value m provides a row index m+1 to the RRC configured table, the processor, in operation, allocates time-domain resources for the plurality of PUSCH transmissions based on the index of slot carrying the received DCI, and the first set of values related to allocated time-domain resources comprised in the indexed row of the RRC configured table; a receiver, which in operation, receives the plurality of PUSCH transmissions using the respectively allocated time-domain resources, and processes transport blocks of data which are carried in the plurality of received PUSCH transmissions; and wherein the transport blocks of data are processed based on at least one second parameter comprised in the indexed row of the RRC configured table which is indicating whether the plurality of PUSCH transmissions are either different PUSCH transmissions or repeated PUSCH transmissions.

According to a thirty-eighth aspect, a base station, BS, is provided comprising: a transmitter, which in operation, transmits a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions; the transmitter, in operation, transmits downlink control information, DCI, signaling carrying a time-domain resource assignment filed with value m, wherein the value m provides a row index m+1 to the RRC configured table, the processor, in operation, allocates time-domain resources for the plurality of PUSCH transmissions based on the index of slot carrying the received DCI, and the first set of values related to allocated time-domain resources comprised in the indexed row of the RRC configured table; a receiver, which in operation, receives the plurality of PUSCH transmissions using the respectively allocated time-domain resources, and processes transport blocks of data which are carried in the plurality of received PUSCH transmissions; and wherein the transport blocks of data are processed based on at least one second parameter conveyed via signaling the received DCI which is indicating whether the plurality of PUSCH transmissions are either different PUSCH transmissions or repeated PUSCH transmissions.

According to thirty-ninth aspect, a base station, BS, is provided comprising: a transmitter, which in operation, transmits a physical uplink shared channel, PUSCH, config information element, IE, in form of radio resource control, RRC, signaling, the PUSCH config IE being applicable to a particular bandwidth part; a processor, which in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions; the transmitter, in operation, transmits downlink control information, DCI, signaling carrying a time-domain resource assignment filed with value m, wherein the value m provides a row index m+1 to the RRC configured table, the processor, in operation, allocates time-domain resources for the plurality of PUSCH transmissions based on the index of slot carrying the received DCI, and the first set of values related to allocated time-domain resources comprised in the indexed row of the RRC configured table; and a receiver, which in operation, receives the plurality of PUSCH transmissions using the respectively allocated time-domain resources, and processes transport blocks of data which are carried in the plurality of received PUSCH transmissions; and wherein the transport blocks of data are processed based on at least one second parameter conveyed via signaling of a physical layer configuration which is indicating whether the plurality of PUSCH transmissions are either different PUSCH transmissions or repeated PUSCH transmissions.

According to a fortieth aspect, a method for a BS is provided comprising the steps of: transmitting a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, at least one row comprising a first set of values related to allocated time-domain resources for a plurality of PUSCH transmissions; transmitting downlink control information, DCI, signaling carrying a time-domain resource assignment filed with value m, wherein the value m provides a row index m+1 to the RRC configured table, allocating time-domain resources for the plurality of PUSCH transmissions based on the index of slot carrying the received DCI, and the first set of values related to allocated time-domain resources comprised in the indexed row of the RRC configured table; receiving the plurality of PUSCH transmissions using the respectively allocated time-domain resources, and processes transport blocks of data which are carried in the plurality of received PUSCH transmissions; and wherein the transport blocks of data are processed based on at least one second parameter comprised in the indexed row of the RRC configured table which is indicating whether the plurality of PUSCH transmissions are either different PUSCH transmissions or repeated PUSCH transmissions.

According to a forty-first aspect, a method for a BS is provided comprising the steps of: transmitting a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, at least one row comprising a first set of values related to allocated time-domain resources for a plurality of PUSCH transmissions; transmitting downlink control information, DCI, signaling carrying a time-domain resource assignment filed with value m, wherein the value m provides a row index m+1 to the RRC configured table, allocating time-domain resources for the plurality of PUSCH transmissions based on the index of slot carrying the received DCI, and the first set of values related to allocated time-domain resources comprised in the indexed row of the RRC configured table; receiving the plurality of PUSCH transmissions using the respectively allocated time-domain resources, and processes transport blocks of data which are carried in the plurality of received PUSCH transmissions; and wherein the transport blocks of data are processed based on at least one second parameter conveyed via signaling the received DCI which is indicating whether the plurality of PUSCH transmissions are either different PUSCH transmissions or repeated PUSCH transmissions.

According to a forty-second aspect, a method for a BS, is provided comprising the steps of: transmitting a physical uplink shared channel, PUSCH, config information element, IE, in form of radio resource control, RRC, signaling, the PUSCH config IE being applicable to a particular bandwidth part; configuring a table which is defined by a PUSCH time domain resource allocation list IE carried in the received PUSCH config IE, the table comprising rows, at least one row comprising a first set of values related to allocated time-domain resources for a plurality of PUSCH transmissions; transmitting downlink control information, DCI, signaling carrying a time-domain resource assignment filed with value m, wherein the value m provides a row index m+1 to the RRC configured table, allocating time-domain resources for the plurality of PUSCH transmissions based on the index of slot carrying the received DCI, and the first set of values related to allocated time-domain resources comprised in the indexed row of the RRC configured table; and receiving the plurality of PUSCH transmissions using the respectively allocated time-domain resources, and processes transport blocks of data which are carried in the plurality of received PUSCH transmissions; and wherein the transport blocks of data are processed based on at least one second parameter conveyed via signaling of a physical layer configuration which is indicating whether the plurality of PUSCH transmissions are either different PUSCH transmissions or repeated PUSCH transmissions.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs.

The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor.

In addition, a FPGA (Field Programmable Gate Array) that can be programmed after the manufacture of the LSI or a reconfigurable processor in which the connections and the settings of circuit cells disposed inside the LSI can be reconfigured may be used.

The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The invention claimed is:

1. A user equipment (UE), comprising:
  a receiver, which in operation, receives a physical uplink shared channel (PUSCH) config information element (IE) in form of radio resource control (RRC) signaling, the PUSCH config IE being applicable to a particular bandwidth part;
  a processor, which in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions;
  the receiver, in operation, receives downlink control information (DCI) signaling carrying a time-domain resource assignment filed with value m, wherein the value m provides a row index m+1 to the RRC configured table, and
  the processor, in operation, determines allocated time-domain resources for the plurality of PUSCH transmissions based on the index of a slot carrying the received DCI, and the first set of values related to allocated time-domain resources comprised in the indexed row of the RRC configured table; and
  a transmitter, which in operation, selects transport blocks of data to be carried in the plurality of PUSCH transmissions, and transmits the plurality of PUSCH transmissions using the respectively determined allocated time-domain resources.

2. The UE according to claim 1, wherein the transport blocks of data are selected based on at least one second parameter comprised in the indexed row of the RRC configured table which is indicating whether the plurality of PUSCH transmissions are either different PUSCH transmissions or repeated PUSCH transmissions.

3. The UE according to claim 2, wherein a same one of the at least one second parameter comprised in the indexed row of the RRC configured table is indicating different or repeated PUSCH transmissions for all of the plurality of PUSCH transmissions,
  or
  a different one of the at least one second parameter comprised in the indexed row of the RRC configured table is indicating different or repeated PUSCH transmissions for each of the plurality of PUSCH transmissions excluding a first of the plurality of PUSCH transmissions,
  and/or
  wherein the at least one second parameter is comprised in the PUSCH time domain resource allocation list IE.

4. The UE according to claim 1,
  wherein the transport blocks of data are selected based on at least one second parameter conveyed via signaling the received DCI which is indicating whether the plurality of PUSCH transmissions are either different PUSCH transmissions or repeated PUSCH transmissions.

5. The UE according to claim 4, wherein the at least one second parameter is comprised in a dedicated bit field of the received DCI, and a same one of the at least one second parameter is indicating different or repeated PUSCH transmissions for all of the plurality of PUSCH transmissions,
  or
  the receiver, in operation, infers the at least one second parameter from a particular radio network temporary identifier, RNTI, used for scrambling the cyclic redundancy check, CRC, bit field of the received DCI, and same inferred at least one second parameter is indicating different or repeated PUSCH transmissions for all of the plurality of PUSCH transmissions.

6. The UE according to claim 1,
  wherein the transport blocks of data are selected based on at least one second parameter conveyed via signaling of a physical layer configuration which is indicating whether the plurality of PUSCH transmissions are either different PUSCH transmissions or repeated PUSCH transmissions.

7. The UE according to claim 6, wherein, the receiver, in operation, receives the at least one second parameter comprised in a physical (Phy-) parameter IE in form of RRC signaling, and same received at least one second parameter is indicating different or repeated PUSCH transmissions for all of the plurality of PUSCH transmissions
  or
  the receiver, in operation, infers the at least one second parameter from a radio spectrum configuration of the particular bandwidth part, and same inferred at least one second value is indicating different or repeated PUSCH transmissions for all of the plurality of PUSCH transmissions
  or
  the receiver, in operation, infers the at least one second parameter from a service type configuration having specific reliability and/or latency requirements, and same inferred at least one second value is indicating different or repeated PUSCH transmissions for all of the plurality of PUSCH transmissions.

8. The UE according to claim 1, wherein the determination of allocated time-domain resources is based on the first set of values related to allocated time-domain resources and comprised in each row of the RRC configured table including:
  a value indicating a PUSCH mapping type for at least a first one of the plurality of PUSCH transmissions,
  a value $K_2$ indicating a slot offsets for at least a first one of the plurality of PUSCH transmissions, and
  a value SLIV indicating a start and length indicator for at least a first one of the plurality of PUSCH transmissions;
  and/or
  wherein the determination of allocated time-domain resources is further based on at least one third value related to allocated time-domain resources and comprised in the indexed row of the RRC configured table, including at least one of:
    a value $K_2'$ indicating another slot offset for a subsequent one of the plurality of PUSCH transmissions,
    a value SLIV' indicating another start and length indicator value for a subsequent one of the plurality of PUSCH transmissions, and
    a value indicating the total number of the plurality of PUSCH transmissions excluding a first of the plurality of PUSCH transmissions,
  and/or
  wherein the other start and length indicator value SLIV' comprises:
    a value S' indicating a symbol number specifying the start of the allocated resources for a subsequent one of the plurality of PUSCH transmissions, and
    a value L' indicating a number of symbols specifying the length of the allocated resources for a subsequent one of the plurality of PUSCH transmissions.

9. The UE according to claim 1, wherein the transmitter, in operation, further generates the plurality of PUSCH transmission carrying the selected transport blocks of data based on at least one fourth value related to the generation of the plurality of PUSCH transmissions, and also comprised in the indexed row of the RRC configured table, including at least one of:
  a different modulation and coding scheme (MCS) index value for each of the plurality of PUSCH transmissions excluding a first of the plurality of PUSCH transmissions, or
  a same modulation and coding scheme (MCS) index value for all of the plurality of PUSCH transmissions, and
  a different redundancy version (RV) offset value for each of the plurality of PUSCH transmissions excluding a first of the plurality of PUSCH transmissions, or
  a same redundancy version (RV) offset value for all of the plurality of PUSCH transmission.

10. The UE according to claim 1, wherein the PUSCH time domain resource allocation list IE additionally comprises at least one fifth parameter related to the generation of the plurality of PUSCH transmissions, including at least one of:
  a parameter indicating whether the transport block size is calculated for each of the plurality of PUSCH transmission separately, or whether a combined transport block size is calculated for all PUSCH transmissions,
  a parameter indicating whether a modulation and coding scheme (MCS) index is determined for each of the plurality of PUSCH transmission separately, or whether the same MCS index is determined for all PUSCH transmissions,
  a parameter indicating whether or not a same redundancy version (RV) is determined for all of the plurality of PUSCH transmissions based on a RV field in the received DCI, and
  a parameter indicating whether or not demodulation reference symbols (DMRS) are present in at least a first or in all of the plurality of PUSCH transmission.

11. A method for a UE comprising:
  receiving a physical uplink shared channel, PUSCH, config information element, IE, in form of radio resource control, RRC, signalling, the PUSCH config IE being applicable to a particular bandwidth part;
  configuring a table which is defined by a PUSCH time domain resource allocation list IE carried in the received PUSCH config IE, the table comprising rows, at least one row comprising a first set of values related to allocated time-domain resources for a plurality of PUSCH transmissions;
  receiving downlink control information, DCI, signalling carrying a time-domain resource assignment filed with value m, wherein the value m provides a row index m+1 to the RRC configured table,
  determining allocated time-domain resources for the plurality of PUSCH transmissions based on the index of a slot carrying the received DCI, and the first set of values related to allocated time-domain resources comprised in the indexed row of the RRC configured table;
  selecting transport blocks of data to be carried in the plurality of PUSCH transmissions, and transmits the plurality of PUSCH transmissions using the respectively determined allocated time-domain resources.

12. The method according to claim 11,
  wherein the transport blocks of data are selected based on at least one second parameter comprised in the indexed row of the RRC configured table which is indicating whether the plurality of PUSCH transmissions are either different PUSCH transmissions or repeated PUSCH transmissions.

13. The method according to claim 12,
  wherein the transport blocks of data are selected based on at least one second parameter conveyed via signalling the received DCI which is indicating whether the plurality of PUSCH transmissions are either different PUSCH transmissions or repeated PUSCH transmissions.

14. The method according to claim 11,
  wherein the transport blocks of data are selected based on at least one second parameter conveyed via signalling of a physical layer configuration which is indicating whether the plurality of PUSCH transmissions are either different PUSCH transmissions or repeated PUSCH transmissions.

15. A base station, BS, comprising:
  a transmitter, which in operation, transmits a physical uplink shared channel, PUSCH, config information element, IE, in form of radio resource control, RRC, signalling, the PUSCH config IE being applicable to a particular bandwidth part;
  a processor, which in operation, configures a table which is defined by a PUSCH time domain resource allocation list IE carried in the received PUSCH config IE, the table comprising rows, at least one row comprising a first set of values related to allocated time-domain resources for a plurality of PUSCH transmissions;

the transmitter, in operation, transmits downlink control information, DCI, signalling carrying a time-domain resource assignment filed with value m, wherein the value m provides a row index m+1 to the RRC configured table, the processor, in operation, allocates time-domain resources for the plurality of PUSCH transmissions based on the index of a slot carrying the received DCI, and the first set of values related to allocated time-domain resources comprised in the indexed row of the RRC configured table;

a receiver, which in operation, receives the plurality of PUSCH transmissions using the respectively allocated time-domain resources, and processes transport blocks of data which are carried in the plurality of received PUSCH transmissions.

16. The BS according to claim 15,
wherein the transport blocks of data are processed based on at least one second parameter comprised in the indexed row of the RRC configured table which is indicating whether the plurality of PUSCH transmissions are either different PUSCH transmissions or repeated PUSCH transmissions.

17. The BS according to claim 15,
wherein the transport blocks of data are processed based on at least one second parameter conveyed via signalling the received DCI which is indicating whether the plurality of PUSCH transmissions are either different PUSCH transmissions or repeated PUSCH transmissions.

18. The BS according to claim 15
wherein the transport blocks of data are processed based on at least one second parameter conveyed via signalling of a physical layer configuration which is indicating whether the plurality of PUSCH transmissions are either different PUSCH transmissions or repeated PUSCH transmissions.

19. A method for a base station, BS, comprising:
transmitting a physical uplink shared channel, PUSCH, config information element, IE, in form of radio resource control, RRC, signalling, the PUSCH config IE being applicable to a particular bandwidth part;

configuring a table which is defined by a PUSCH time domain resource allocation list IE carried in the received PUSCH config IE, the table comprising rows, at least one row comprising a first set of values related to allocated time-domain resources for a plurality of PUSCH transmissions;

transmitting downlink control information, DCI, signalling carrying a time-domain resource assignment filed with value m, wherein the value m provides a row index m+1 to the RRC configured table, allocating time-domain resources for the plurality of PUSCH transmissions based on the index of a slot carrying the received DCI, and the first set of values related to allocated time-domain resources comprised in the indexed row of the RRC configured table;

receiving the plurality of PUSCH transmissions using the respectively allocated time-domain resources, and processes transport blocks of data which are carried in the plurality of received PUSCH transmissions.

* * * * *